US 012112286B2

(12) United States Patent
Bellini, III et al.

(10) Patent No.: US 12,112,286 B2
(45) Date of Patent: *Oct. 8, 2024

(54) SYSTEMS AND METHODS FOR INTERFACING BETWEEN A SALES MANAGEMENT SYSTEM AND A PROJECT PLANNING SYSTEM

(71) Applicant: ConnectWise, LLC, Tampa, FL (US)

(72) Inventors: Arnold Bellini, III, Tampa, FL (US); Linda Brotherton, Tampa, FL (US); Robert Isaacs, Tampa, FL (US)

(73) Assignee: Connect Wise, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,376

(22) Filed: Dec. 12, 2022

(65) Prior Publication Data

US 2023/0359962 A1    Nov. 9, 2023

Related U.S. Application Data

(63) Continuation of application No. 17/372,628, filed on Jul. 12, 2021, now Pat. No. 11,526,820, which is a
(Continued)

(51) Int. Cl.
*G06Q 10/0631* (2023.01)
*G06Q 30/0601* (2023.01)

(52) U.S. Cl.
CPC . *G06Q 10/063118* (2013.01); *G06Q 30/0635* (2013.01)

(58) Field of Classification Search
None
See application file for complete search history.

(56) References Cited

U.S. PATENT DOCUMENTS

| 4,992,940 A | 2/1991 | Dworkin |
| 5,189,606 A | 2/1993 | Burns et al. |

(Continued)

FOREIGN PATENT DOCUMENTS

| CA | 2904848 A1 * | 10/2014 | ......... G06Q 10/0637 |
| CA | 2865663 A1 * | 4/2015 | ..... G06Q 10/063118 |

(Continued)

OTHER PUBLICATIONS

Li, Liang, and Ji-Ye Mao. "The effect of CRM use on internal sales management control: An alternative mechanism to realize CRM benefits." Information & management 49.6 (2012): 269-277. (Year: 2012).*

(Continued)

*Primary Examiner* — Thomas L Mansfield
(74) *Attorney, Agent, or Firm* — Foley Hoag LLP; John Lanza; Joshua S. Matloff

(57) ABSTRACT

The present disclosure facilitates interfacing between a sales management system and a project planning system. In some embodiments, the system includes an interface and schedule engine, both executing on a server. The interface can parse a sales order from the sales management system into products and project tasks within the products. The products can also include at least one of a labor product, a parts product, and an agreements product. The schedule engine can generate schedule tasks corresponding to the project tasks, determine a performance order of the schedule tasks, and combine the schedule tasks into schedule phases based on the performance order. The schedule engine can determine a performance order of the schedule phases and combine the schedule phases into a schedule component based on the performance order. The interface can transmit the schedule component to the project planning system for execution.

20 Claims, 47 Drawing Sheets

Related U.S. Application Data continuation of application No. 16/448,810, filed on Jun. 21, 2019, now Pat. No. 11,062,242, which is a continuation of application No. 15/612,650, filed on Jun. 2, 2017, now Pat. No. 10,332,051, which is a continuation of application No. 14/565,072, filed on Dec. 9, 2014, now Pat. No. 9,672,484.

(56) References Cited

U.S. PATENT DOCUMENTS

| | | |
|---|---|---|
| 5,493,490 A | 2/1996 | Johnson |
| 5,515,367 A | 5/1996 | Cox et al. |
| 5,570,291 A | 10/1996 | Dudle et al. |
| 5,758,328 A | 5/1998 | Giovannoli |
| 6,236,409 B1 | 5/2001 | Hartman |
| 6,356,909 B1 | 3/2002 | Spencer |
| 6,446,053 B1 | 9/2002 | Elliott |
| 6,687,677 B1 | 2/2004 | Barnard et al. |
| 6,859,768 B1 | 2/2005 | Wakelam et al. |
| 6,901,407 B2 | 5/2005 | Curns et al. |
| 7,055,107 B1 | 5/2006 | Rappaport et al. |
| 7,292,965 B1 | 11/2007 | Mehta et al. |
| 7,302,401 B1 | 11/2007 | Tervonen |
| 7,333,944 B1 | 2/2008 | Harris |
| 7,363,234 B2 | 4/2008 | Podgurny et al. |
| 7,483,841 B1 | 1/2009 | Jin et al. |
| 7,496,487 B2 | 2/2009 | Wakelam et al. |
| 7,496,886 B2 | 2/2009 | Puttaswamy et al. |
| 7,506,001 B2 | 3/2009 | Johnson et al. |
| 7,546,346 B2 | 6/2009 | Ouchi |
| 7,702,736 B2 | 4/2010 | Ouchi |
| 7,702,737 B2 | 4/2010 | Ouchi |
| 7,707,259 B2 | 4/2010 | Ouchi |
| 7,836,103 B2 | 11/2010 | Li et al. |
| 7,991,632 B1 | 8/2011 | Morris et al. |
| 7,991,680 B2 | 8/2011 | Livesay et al. |
| 8,005,910 B2 | 8/2011 | Ouchi |
| 8,131,593 B1 | 3/2012 | Wells et al. |
| 8,214,238 B1 * | 7/2012 | Fairfield ............ G06Q 30/0203 705/7.29 |
| 8,224,472 B1 | 7/2012 | Maluf et al. |
| 8,290,808 B2 | 10/2012 | Brower et al. |
| 8,370,192 B2 | 2/2013 | Deo et al. |
| 8,606,613 B2 | 12/2013 | Hegmann et al. |
| 8,694,487 B2 | 4/2014 | Lamothe |
| 8,874,477 B2 * | 10/2014 | Hoffberg ............ G06Q 20/065 705/37 |
| 9,461,876 B2 | 10/2016 | Van Dusen et al. |
| 2001/0037281 A1 | 11/2001 | French et al. |
| 2002/0069154 A1 | 6/2002 | Fields |
| 2002/0072992 A1 | 6/2002 | Elms et al. |
| 2002/0123969 A1 | 9/2002 | Foertsch et al. |
| 2002/0161697 A1 | 10/2002 | Stephens et al. |
| 2002/0165724 A1 | 11/2002 | Blankesteijn |
| 2003/0061266 A1 | 3/2003 | Ouchi |
| 2003/0088494 A1 | 5/2003 | Lee |
| 2003/0163331 A1 | 8/2003 | Podgurny et al. |
| 2003/0179870 A1 | 9/2003 | Desa et al. |
| 2003/0182172 A1 | 9/2003 | Claggett et al. |
| 2003/0208390 A1 | 11/2003 | Posner |
| 2003/0208435 A1 | 11/2003 | Posner |
| 2004/0044591 A1 | 3/2004 | Gilliland et al. |
| 2004/0083136 A1 | 4/2004 | Sasser |
| 2004/0117046 A1 | 6/2004 | Colle et al. |
| 2004/0153353 A1 | 8/2004 | Maschke et al. |
| 2005/0055299 A1 | 3/2005 | Chambers et al. |
| 2005/0240458 A1 | 10/2005 | Ciacciarelli et al. |
| 2006/0058993 A1 | 3/2006 | Ulreich et al. |
| 2006/0184715 A1 | 8/2006 | Gikas et al. |
| 2006/0287932 A1 | 12/2006 | Wulteputte et al. |
| 2007/0022404 A1 | 1/2007 | Zhang et al. |
| 2007/0033093 A1 | 2/2007 | Divine et al. |
| 2007/0088561 A1 | 4/2007 | Zeibig |
| 2007/0260502 A1 | 11/2007 | Motwani et al. |
| 2008/0071555 A1 | 3/2008 | Sattler et al. |
| 2008/0243565 A1 | 10/2008 | Gregory |
| 2008/0255914 A1 | 10/2008 | Oren |
| 2008/0312980 A1 | 12/2008 | Boulineau et al. |
| 2009/0076928 A1 | 3/2009 | Hjertonsson et al. |
| 2009/0094040 A1 | 4/2009 | Lewis |
| 2009/0125359 A1 | 5/2009 | Knapic et al. |
| 2010/0088240 A1 | 4/2010 | Ely et al. |
| 2010/0198652 A1 | 8/2010 | Spanton et al. |
| 2010/0318443 A1 | 12/2010 | Culp |
| 2011/0184771 A1 | 7/2011 | Wells |
| 2012/0030069 A1 | 2/2012 | Garg et al. |
| 2012/0072299 A1 | 3/2012 | Sampsell |
| 2013/0246113 A1 | 9/2013 | Mantravadi et al. |
| 2013/0268388 A1 | 10/2013 | Walker et al. |
| 2014/0122144 A1 | 5/2014 | Cirpus et al. |
| 2014/0164069 A1 | 6/2014 | Allard et al. |
| 2014/0214473 A1 | 7/2014 | Gentile et al. |
| 2014/0265299 A1 | 9/2014 | Janesky |

FOREIGN PATENT DOCUMENTS

| | | |
|---|---|---|
| CN | 100565448 C | 12/2009 |
| WO | WO-2004/053749 A1 | 6/2004 |
| WO | WO-2016/045425 A1 | 3/2016 |

OTHER PUBLICATIONS

Demeulemeester, Erik Leuven, Willy Herroelen, and Willy S. Herroelen. Project scheduling: a research handbook. vol. 49. Springer Science & Business Media, 2002. (Year: 2002).*

Cooper, Marjorie J., and Charlene Spoede Budd. "Tying the pieces together: A normative framework for integrating sales and project operations." Industrial Marketing Management 36.2 (2007): 173-182. (Year: 2007).*

Chen, "An Object Model Framework for Interface Management in Building Information Models" Dissertation submitted to the Faculty of the Virginia Polytechnic Institute and State University, Jul. 13, 2007, Blacksburg, VA.

ConnectWise, Inc., ConnectWise Documentation v2011.3, Product Search and Products Screen, Mar. 2012, Tampa, Florida.

ConnectWise, Inc., ConnectWise Documentation v2011.3, References Tab, Jun. 2011, Tampa, Florida.

ConnectWise, Inc., Release Notes Version 2011.3, Aug. 2013, Tampa, Florida.

ConnectWise, Inc., Release Notes Version 2013.3, Oct. 17, 2013, Tampa, Flordia.

ConnectWise, Inc., Release Notes Version 2013.4, Dec. 10, 2013, Tampa, Flordia.

Final Office Action on U.S. Appl. No. 17/372,628 Dtd Oct. 6, 2022.

H. Kerzner et al., "Project management: a systems approach to planning, scheduling, and controlling," John Wiley & Sons, Mar. 23, 2017.

Non-Final Office Action on U.S. Appl. No. 15/612,650 Dtd Sep. 27, 2018.

Non-Final Office Action on U.S. Appl. No. 16/448,810 Dtd Nov. 20, 2020.

Non-Final Office Action on U.S. Appl. No. 17/372,628 Dtd Jun. 20, 2022.

Notice of Allowance on U.S. Appl. No. 15/612,650 Dtd Feb. 7, 2019.

Notice of Allowance on U.S. Appl. No. 16/448,810 Dtd Mar. 17, 2021.

Notice of Allowance on U.S. Appl. No. 17/372,628 Dtd Nov. 1, 2022.

SAP AG, Simulation, Release 4.6C, Aug. 13, 2001, Walldorf, Germany.

SAP SE, frame from marketing video for Business by Design, Products Overview, Mar. 1, 2012.

SAP SE, From the Opportunity to the Sales Order, SAP Online Help, downloaded Oct. 12, 2014, Walldorf, Germany.

SAP SE, Opportunity Management, SAP Online Help, downloaded Oct. 12, 2014, Walldorf, Germany.

(56) References Cited

OTHER PUBLICATIONS

Siebel Systems, Inc., Siebel Professional Services Automation Guide, eBusiness Applications, Version 7.0, 10PA1-PS00-07000, Sep. 2001, San Mateo, California.
Siebel Systems, Inc., Siebel Professional Services Automation Guide, Version 7.7, Nov. 2004, San Mateo, California.
US Notice of Allowance on U.S. Appl. No. 14/565,072 Dtd Feb. 2, 2017.
US Office Action Dtd Mar. 18, 2015.
US Office Action Dtd Jul. 10, 2015.
US Office Action on U.S. Appl. No. 14/565,072 Dtd May 3, 2016.
Zadro, Renato, How Project Managers Can Keep All Their Ducks in a Row, blog entry, SAP Community Network, Mar. 5, 2014, Walldorf, Germany.

* cited by examiner

| | 1302 | 1301 | 1303 | 1304 | 1305 | 1306 | 1307 | 1308 | 1309 | 1310 | 1311 |

| Product ID | Description | Price | Cost | Taxable | Serialize | Serialized C... | Type | Category | Sub-category | Class |
|---|---|---|---|---|---|---|---|---|---|---|
| 1G100F | 1G100F One (1) Span Digital T1/E1/PRI to... | $1,700.00 | $1,314.50 | | | | Non-Inventory | Hardware | Hardware | Non-Inventory |
| 1R800F | Eight (8) Port Analog R-Series Failover Ap... | $1,350.00 | $1,094.50 | | | | Non-Inventory | Hardware | Hardware | Non-Inventory |
| 1TELC050LF | Digium D50 4-Line SIP with HD Voice | $250.00 | $196.90 | | | | Non-Inventory | Hardware | Hardware | Non-Inventory |
| 1VPMOCT128LF | 128 Channel Hardware Echo Cancellation... | $1,000.00 | $880.00 | | | | Non-Inventory | Hardware | Hardware | Non-Inventory |
| 20264502 | 2026 RM KIT | $290.00 | $231.29 | ✓ | | | Other Charge | Hardware | Hardware | Non-Inventory |
| 269-14954 | Microsoft Office 2010 Professional - 32/64-... | $603.74 | $447.32 | | | | Non-Inventory | Software | Software | Non-Inventory |
| 43X0802 | 300GB SAS HSWAP 15KRPM ESERVER | $1,099.00 | $955.16 | ✓ | | | Other Charge | Hardware | Hardware | Non-Inventory |
| 462969-B21 | HP RAID Controller Battery | $143.69 | $130.04 | ✓ | | | Non-Inventory | Hardware | Hardware | Non-Inventory |
| 592-InternetService | Internet Services | $60.00 | $0.00 | | | | Service | Managed Services | Web and E-mail Se... | Agreement |
| 661326-S01 | HP ProLiant ML350 G6 5U Tower Server -... | $2,052.39 | $1,634.42 | ✓ | | | Non-Inventory | Hardware | Hardware | Non-Inventory |
| 7995A1U | BC HS21 X/1.6 1P 1GB SAS GETH | $2,539.00 | $2,206.70 | ✓ | | | Other Charge | Hardware | Hardware | Non-Inventory |
| 885076U | AMD OPT LS20 FOR IBM BC | $3,249.00 | $2,825.22 | ✓ | | | Other Charge | Hardware | Hardware | Non-Inventory |
| 8G729CODEC | G.729 Codec | $13.00 | $10.00 | | | | Non-Inventory | Hardware | Hardware | Non-Inventory |
| 931176-0403 | MEDIAPLAY CDLS MOUSE MINI USB PS... | $49.95 | $41.50 | ✓ | | | Non-Inventory | Hardware | Hardware | Non-Inventory |
| BDR Service | Backup & Disaster Recovery Service | $100.00 | $0.00 | | | | Service | Managed Services | Remote Backup | Agreement |
| BDR Service-Additional | Backup & Disaster Recovery - Additional S... | $2.50 | $1.25 | | | | Service | Managed Services | Remote Backup | Agreement |
| Block Contract Renewal | Block Contract Renewal | $0.00 | $0.00 | | | | Service | Services Block Ren... | Block Contract Ren... | Agreement |
| Bria 3 | Bria 3 (Soft Phone) | $65.00 | $49.95 | | | | Non-Inventory | Hardware | Hardware | Non-Inventory |
| Cisco Catalyst 3750 | Cisco Catalyst 3750 switch | $295.00 | $175.00 | | | | Inventory | Hardware | Hardware | Inventory |
| Cisco Catalyst 4900 | Cisco Catalyst 4900 Switch | $450.00 | $125.00 | | | | Inventory | Hardware | Hardware | Inventory |
| Email | Email | $3.00 | $1.00 | | | | Service | Managed Services | Web and E-mail Se... | Agreement |
| EN489AA#ABA | DOCK STA ADV NC42/44 NC6X NC84 N... | $269.00 | $259.61 | ✓ | | | Non-Inventory | Hardware | Hardware | Non-Inventory |
| Hard drive - 500 GB | Hard drive,500 GB EIDE | $68.00 | $45.00 | | | | Non-Inventory | Hardware | Hardware | Non-Inventory |
| Installation Services | Installation Services | $500.00 | $0.00 | | | | Service | Service | Installation | Service |
| Internet Access-Connec... | Internet Access-ConnectOn | $144.00 | $0.00 | | | | Other Charge | Managed Services | Web and E-mail Se... | Agreement |

SYSTEMS AND METHODS FOR INTERFACING BETWEEN A SALES MANAGEMENT SYSTEM AND A PROJECT PLANNING SYSTEM

CROSS-REFERENCE TO RELATED APPLICATIONS

This application claims the benefit of priority under 35 U.S.C. § 120 as a continuation of U.S. patent application Ser. No. 16/448,810, filed Jun. 21, 2019, which claims the benefit of priority under 35 U.S.C. § 120 as a continuation of U.S. patent application Ser. No. 15/612,650, filed Jun. 2, 2017, which claims the benefit of priority under 35 U.S.C. § 120 as a continuation of U.S. patent application Ser. No. 14/565, 072, filed on Dec. 9, 2014, each of which is hereby incorporated herein by reference in its entirety for all purposes.

FIELD OF THE DISCLOSURE

The present disclosure generally relates to sales management systems and project planning systems. More specifically, the present disclosure relates to interfacing a sales management system to a project planning system.

BACKGROUND OF THE DISCLOSURE

Providers of information technology services may use a sales management system to manage interactions with their customers. The providers of information technology services may use a project planning system to manage their internal processes to service their customers. It may be challenging to ensure that the information in sales management system corresponds to the information in the project planning system.

SUMMARY OF THE DISCLOSURE

When a service provider sells information technology services to a customer, there may be many options that affect the sale. For example, the services required may depend on the equipment at the customer site. In another example, the services required may depend on the software installed on the equipment, the configuration of the equipment, and the versions of the equipment and software that are installed. Since the complexity of assembling a sales order with many options may be high, a service provider may want to use a sales management system to help manage this complexity. A sales management system may facilitate generating sales orders with the right options, tracking the sales order through the sales process, and maintaining consistency in the management and delivery of the products and services.

When the services that are sold include labor to install and configure the equipment and software required to deliver the services, it may be important to be able to estimate the schedule for the service accurately. The customer may need to be provided with the correct expectations about when various parts of the services will be available, and when there will be impacts such as downtime. The service provider also may need to be able to schedule internal resources at the right time, because these limited resources may be used to service multiple customers. If the schedule is estimated too pessimistically, the service provider can end up with idle resources, eventually resulting in increased cost to customers and difficulty in being competitive. If the schedule is estimated too optimistically, there can be schedule delays, resulting in customer disappointment and the risk of losing the customer. As a result, the service provider may want to use a project planning system to manage the complexity of scheduling and provide accurate estimates.

The sales management system and project planning system may also facilitate generating quotes for customers with accurate estimates. The cost estimates can include costs for parts, service, and agreements. The parts costs can be quoted as a bill of materials. The agreements costs can be quoted as service level agreements with periodic costs. The service costs can depend on the schedule and can be quoted a number of ways, such as hourly costs, fixed job costs, salary plus overtime, and so on. If the cost is estimated too pessimistically, the service provider may not be able to quote services competitively. If the cost is estimated too optimistically, the service provider may have to absorb the resulting cost overruns, and may go out of business doing so.

Systems and methods of the present disclosure provide an interface configured to integrate the sales management system with the project planning system. The interface is configured to reflect changes in one system in the other system. In an illustrative example, sales staff at the service provider may sell a variety of options, and provide accurate schedules and quotes, without ever knowing the details of how the schedules and quotes are derived. This may be because skills used for estimating may not be the same skills that are useful for doing sales, so the sales staff may not be particularly well suited to do estimating. In addition, the details of the parts, service, and agreements to deliver a particular component of an option may change relatively frequently based on the changing nature of the computer services industry, and it may be unreasonable to expect the sales staff to keep up with these changes. Additionally, a sale may depend on a "what-if" scenario with a customer, where certain options may be delayed or eliminated based on cost and schedule constraints by the customer. This kind of sale may benefit from a feedback loop where variations on the options can be adjusted until the customer agrees to the quote.

Systems and methods of the present disclosure interface between a sales management system and a project planning system in a way that provides the high level of integration needed for the functions described.

At least one aspect of the present disclosure is directed to a system for interfacing between a sales management system and a project planning system. In some embodiments, the system includes an interface executing on one or more processors of a server, and a schedule engine executing on the server. The interface receives, from the sales management system, a first data record including a sales order. The schedule engine parses the first data record to identify a first product and a second product of the sales order. The first product further includes a first project task and a second project task. The second product further includes a third project task, and at least one of a labor product, a parts product, and an agreements product. The schedule engine generates a first schedule task corresponding to the first project task, and a second schedule task corresponding to the second project task. The schedule engine determines a first order of performance between the first schedule task and the second schedule task. The schedule engine combines the first schedule task and the second schedule task based on the first order of performance to create a first schedule phase. The schedule engine generates a second schedule phase with a third schedule task corresponding to the third project task, the second schedule phase including the at least one of the labor product, the parts product, and the agreements product. The schedule engine determines a second order of performance between the first schedule phase and the second schedule phase. The schedule engine combines the first schedule phase and the second schedule phase based on the second order of performance to create a schedule component stored in a second data record. The interface transmits the second data record storing the schedule component to the project planning system for execution.

In some embodiments, the schedule component stored in the second data record is further configured for search capability.

In some embodiments, the server is further configured to generate a search index for the schedule component stored in the second data record. The server can be configured to store the search index in a third data record.

In some embodiments, the interface is further configured to receive, from the project planning system, an indication of a change to the schedule component. The interface can be configured to transmit to the sales management system, responsive to the indication, information about the change to the schedule component to initiate an update to the sales order.

In some embodiments, the interface is further configured to receive, from the project planning system, an indication of a change to the schedule component. The server can be configured to compare the indication with the sales order received from the sales management system. The server can be configured to determine, responsive to the comparing, to update the sales order based on the indication. The interface can be configured to transmit, to the sales management system, responsive to the determining, information about the change to the schedule component to initiate an update to the sales order.

In some embodiments, the system further includes an estimation engine executing on the server. The estimation engine can be configured to generate a first quote component based on the first project task and second project task associated with the first product, and a second quote component based on the third project task and the at least one of the labor product, the parts product, and the agreements product associated with the second product. The estimation engine can be configured to combine the first quote component and the second quote component to create a quote.

In some embodiments, the system further includes an estimation engine executing on the server. The estimation engine can be configured to generate a first quote component based on the first schedule task and second schedule task associated with the first schedule phase, and a second quote component based on the third schedule task. The estimation engine can be configured to combine the first component and the second quote component to create a quote for the schedule component.

In some embodiments, the server is further configured to provide a quote for the sales order. The interface can be configured to receive an indication of a modification to the quote. The schedule engine can be configured to update the schedule component responsive to the indication of the modification to the quote.

In some embodiments, the interface is further configured to provide a quote for the sales order. The interface can be configured to receive an indication to reduce the quote. The schedule engine can be configured to remove a portion of the schedule component responsive to the indication to reduce the quote.

In some embodiments, the schedule engine is further configured to establish a first duration for the first schedule phase and a second duration for the second schedule phase. The schedule engine can be configured to append the first duration and the second duration to the second data record storing the schedule component.

In some embodiments, the schedule engine is further configured to parse, from the first project task, a description, a parts component, an estimated time, a billing method, and a resource assignment. The schedule engine can be configured to generate, based on the description, a name. The schedule engine can be configured to generate, based on the parts component, a resource reference. The schedule engine can be configured to generate, based on the estimated time, a schedule duration. The schedule engine can be configured to generate, based on the billing method, a schedule billing method. The schedule engine can be configured to select, based on the resource assignment, a personnel reference. The schedule engine can be configured to associate the resource reference, the schedule duration, the schedule billing method, and the personnel reference with the first schedule task.

In some embodiments, the schedule engine is further configured to determine the first order of performance between the first schedule task and the second schedule task based on at least one of a manually assigned sequence included in the first data record, a sequence included in a template associated with the first data record, a dependency between the first schedule task and the second schedule task, the dependency included in the first data record, a first resource assignment associated with the first schedule task and a second resource assignment, same as the first resource assignment, associated with the second schedule task, the first order of performance chosen to avoid simultaneous use of the first resource assignment and the second resource assignment, and a default sequence determined by the scheduling engine.

In some embodiments, the schedule engine is further configured to parse, by the schedule engine, the second product. The schedule engine can be configured to generate, responsive to the second product including the labor product, a fourth schedule task based on the labor product. The schedule engine can be configured to determine a third order of performance between the third schedule task and the fourth schedule task. The schedule engine can be configured to combine the third schedule task and the fourth schedule task based on the third order of performance to create a third schedule phase. The schedule engine can be configured to determine a fourth order of performance between the first schedule phase and the third schedule phase. The schedule engine can be configured to combine the first schedule phase and the third schedule phase based on the fourth order of performance to create a second schedule component stored in a third data record. The interface can be configured to transmit the third data record storing the second schedule component to the project planning system for execution.

In some embodiments, the schedule component is further configured to include information for the project planning system to update an existing schedule.

In some embodiments, the system further includes an estimation engine executing on the server. The estimation engine can be configured to convert the sales order into a quote by generating a first quote for the first product and a second quote for the second product.

Another aspect of the present disclosure is directed to a method for interfacing between a sales management system and a project planning system. The method includes an interface executing on one or more processors of a server, and a schedule engine executing on the server. The method includes the interface receiving, from the sales management system, a first data record including a sales order. The method includes the schedule engine parsing the first data record to identify a first product and a second product of the sales order. The first product further includes a first project task and a second project task. The second product further includes a third project task, and at least one of a labor product, a parts product, and an agreements product. The method includes the schedule engine generating a first schedule task corresponding to the first project task, and a second schedule task corresponding to the second project task. The method includes the schedule engine determining a first order of performance between the first schedule task and the second schedule task. The method includes the schedule engine combining the first schedule task and the second schedule task based on the first order of performance to create a first schedule phase. The method includes the schedule engine generating a second schedule phase with a third schedule task corresponding to the third project task, the second schedule phase including the at least one of the labor product, the parts product, and the agreements product. The method includes the schedule engine determining a second order of performance between the first schedule phase and the second schedule phase. The method includes the schedule engine combining the first schedule phase and the second schedule phase based on the second order of performance to create a schedule component stored in a second data record. The method includes the interface transmitting the second data record storing the schedule component to the project planning system for execution.

Yet another aspect of the present disclosure is directed to a non-transitory computer readable medium storing instructions that, when executed by one or more processors, facilitate interfacing between a sales management system and a project planning system. The instructions include instructions to receive, by an interface executing on the one or more processors, from the sales management system, a first data record including a sales order. The instructions include instructions to parse, by a schedule engine executing on the one or more processors, the first data record to identify a first product and a second product of the sales order. The first product further includes a first project task and a second project task. The second product further includes a third project task, and at least one of a labor product, a parts product, and an agreements product. The instructions include instructions to generate, by the schedule engine, a first schedule task corresponding to the first project task, and a second schedule task corresponding to the second project task. The instructions include instructions to determine, by the schedule engine, a first order of performance between the first schedule task and the second schedule task. The instructions include instructions to combine, by the schedule engine, the first schedule task and the second schedule task based on the first order of performance to create a first schedule phase. The instructions include instructions to generate, by the schedule engine, a second schedule phase with a third schedule task corresponding to the third project task, the second schedule phase including the at least one of the labor product, the parts product, and the agreements product. The instructions include instructions to determine, by the schedule engine, a second order of performance between the first schedule phase and the second schedule phase. The instructions include instructions to combine, by the schedule engine, the first schedule phase and the second schedule phase based on the second order of performance to create a schedule component stored in a second data record. The instructions include instructions to transmit, by the interface, the second data record storing the schedule component to the project planning system for execution.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 13 is an illustrative example of an example embodiment of a user interface for displaying and modifying product data.

FIG. 15 is an illustrative example of an example embodiment of a user interface for displaying and modifying a quote for a customer.

FIG. 17 is an illustrative example of an example embodiment of a user interface for sales management.

FIG. 18 is an illustrative example of an example embodiment of a user interface for managing a single sales opportunity.

FIG. 19 is an illustrative example of an example embodiment of a user interface for managing the products associated with a single sales opportunity.

FIG. 22 is an illustrative example of an example embodiment of a user interface for project management.

FIG. 23 is an illustrative example of an example embodiment of a user interface for managing procurement.

FIG. 26 is an illustrative example of an example embodiment of a user interface for displaying and modifying the financial aspects of a service ticket.

Like reference numbers and designations in the various drawings indicate like elements.

DETAILED DESCRIPTION

Systems and methods of the present disclosure facilitate interfacing between a sales management system and a project planning system. This interface can provide a high level of integration between the two systems that allows sales staff to build sales orders including a variety of complex options. The options can contain parts, service components, agreements, and scheduling information. The options can be organized hierarchically, so that the same sub-options can be put together to make different options, simplifying the maintenance of the estimation data and allowing the sales staff to specify customer requirements efficiently at a high level. With this information, the sales order can be converted into a project schedule that is organized into phases of the project, and also converted to a quote for the customer that includes the right components and their cost. Furthermore, the sales order can be quoted as phases (based on the schedule phases) instead of one monolithic cost. This can be very attractive for the customer in terms of spacing out payment, and can facilitate making the service provider more competitive by allowing phased payments as a realistic option without losing money.

The interface allows a sales order to include products that include phase products. These phase products can include project tasks as well as products that are labor, parts, or agreements. This organization can allow a scheduling engine to create schedule tasks from the project tasks, organize them into schedule phases based on the phase products, and maintain the association of the labor, parts, and agreements with the correct schedule phases. By organizing the schedule phases in this manner to represent the schedule within the project planning system, the project planning system can generate estimates of time and cost while integrating functions, data, and propagating updates between the sales management system and the project planning system.

Figure 1:
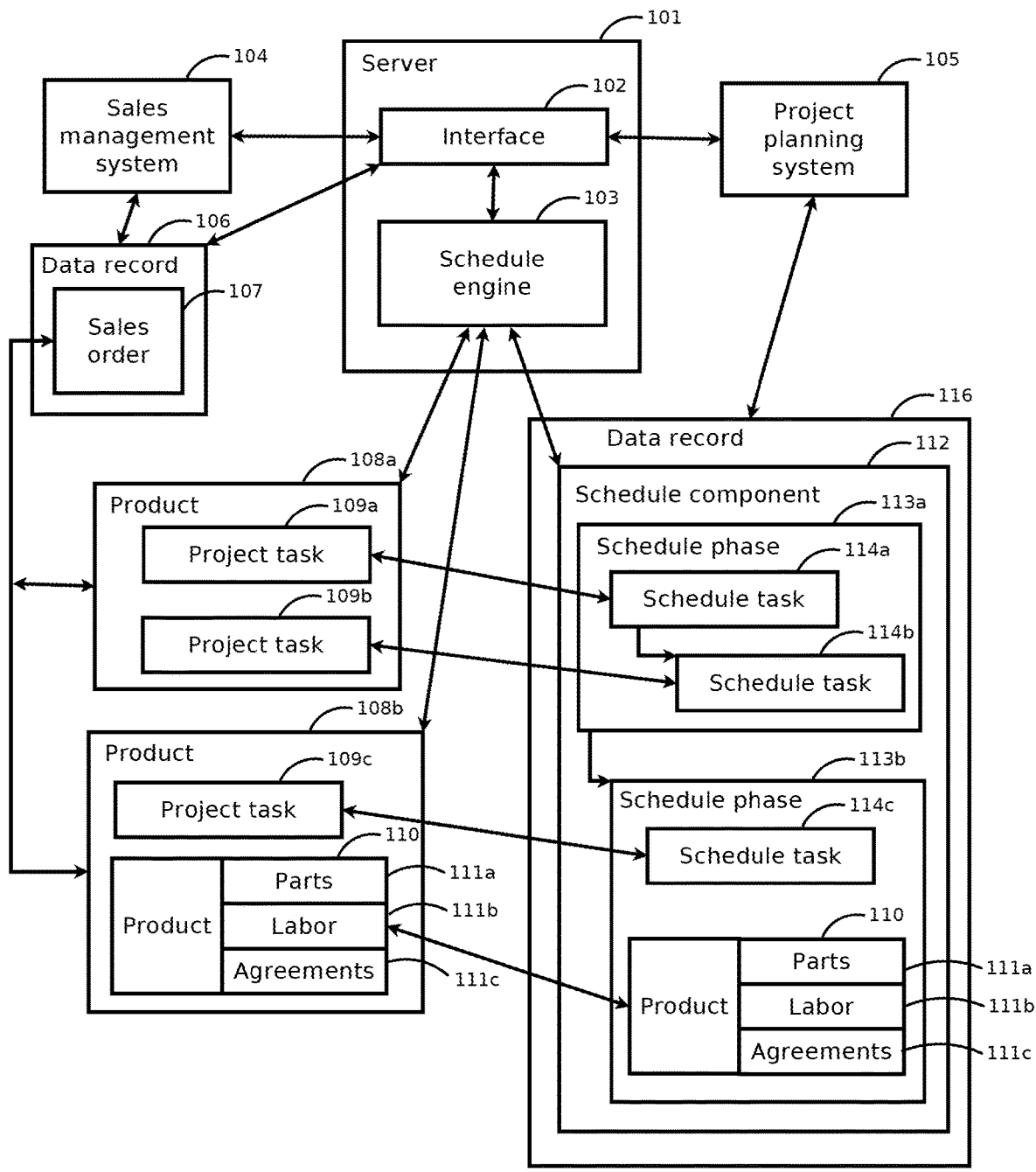
FIG. 1 is an illustrative block diagram of an example embodiment of a system for interfacing between a sales management system and a project planning system.

Turning to the drawings, FIG. 1 is an illustrative block diagram of an example embodiment of a system for interfacing between a sales management system and a project planning system. An interface 102 can execute on a server 101 and may provide data connectivity between a sales management system 104 and a project planning system 105. In providing this connectivity, the interface 102 can enable new functions that were not previously available in either the sales management system 104 or the project planning system 105. In an illustrative example, a sales representative can avoid promising a product to a customer on a time schedule that cannot be met because the resources used to install the product are not available in time. The interface 102 can receive a data record 106 from the sales management system 104, which can contain a sales order 107. The interface 102 can use a schedule engine 103 to parse the sales order 107 and identify products 108a-108b within it. Product 108a can contain project tasks 109a-109b.

Similarly, product 108b can contain project task 109c, and may also contain a product 110 that can include a labor product 111a, a parts product 111b, or an agreements product 111c. In an illustrative example, the sales order 107 may represent the sale of an upgrade to an email system at a customer site. The product 108a may represent the preparatory work needed before the upgrade to the email system, and the product 108b may represent the actual upgrade to the email system. Within the product 108a, the project task 109a may represent the installation of an upgrade to the operating system of the device running the email server that is required in order to upgrade the email server, and the project task 109b may represent the installation of a required upgrade to the database system that is used by the email server.

Within the product 108b, the project task 109c may represent the installation of the upgrade to the email system, and the product 110 may represent the email system software. The labor product 111a may represent the time required by a technician to make configuration changes to the email system after it is installed. The parts product 111b may represent the actual software from the vendor for the email system. The agreements product 111c may represent a service contract being offered to the customer to maintain, support, and service the email system. The agreements product 111c may also include a service level agreement (SLA).

The schedule engine 103 can generate a schedule task 114a from the project task 109a, and can generate a schedule task 114b from the project task 109b. The schedule engine 103 can determine the ordering of the schedule tasks 114a-114b and combine the schedule tasks 114a-114b into a schedule phase 113a. Continuing the example, the schedule engine 103 may determine that schedule task 114a precedes schedule task 114b because the operating system upgrade represented by schedule task 114a is required in order to install and run the database upgrade represented by schedule task 114b. This ordering is represented in FIG. 1 by the one-way arrow from schedule task 114a to schedule task 114b, and the schedule tasks 114a-114b may be combined to create a schedule phase 113a that represents the preparatory phase of the work. The schedule engine 103 can generate a schedule task 114c from the project task 109c, and use the schedule task 114c and the product 110 to create the schedule phase 113b. The schedule engine 103 can determine the ordering of the schedule phases 113a-113b and combine the schedule phases 113a-113b into a schedule component 112. Continuing the example still further, the schedule engine may create the schedule task 114c to install the email system, and then use the schedule task 114c and the product 110 to create a schedule phase 113b. The schedule engine 103 may determine that schedule phase 113a precedes schedule phase 113b because the preparatory work represented by schedule phase 113a is to be done before the installation work represented by schedule phase 113b. This ordering is represented in FIG. 1 by the one-way arrow from schedule phase 113a to schedule phase 113b, and the schedule phases 113a-113b may be combined to create a schedule component 112 that represents the schedule for the work required to deliver the product that is being sold to the customer.

The interface 102 can transmit the schedule component 112 to the project planning system 105 using a data record 116. The project planning system 105 may be able to create a new schedule using the schedule component 112, or may be able to incorporate the schedule component 112 into an existing schedule. It should be noted that the schedule engine 103 may also be able to create a schedule task such as 114a-114c using information from a labor product such as 111a. Continuing the example, this would create another schedule task (not depicted in FIG. 1) in schedule phase 113b, which would represent the schedule task for configuring the email system. The schedule engine 103 might determine that this configuration schedule task would need to follow the installation schedule task 114c.

The system and its components, such as a server 101, interface 102, schedule engine 103, sales management system 104, and project planning system 105, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a server 101, interface 102, schedule engine 103, sales management system 104, and project planning system 105, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The one or more servers associated with the server 101, interface 102, schedule engine 103, sales management system 104, or project planning system 105 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

Elements of the system, such as the server 101, the interface 102, the schedule engine 103, the sales management system 104, and the project planning system 105, may be communicatively coupled using a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include one or more of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

Figure 2:
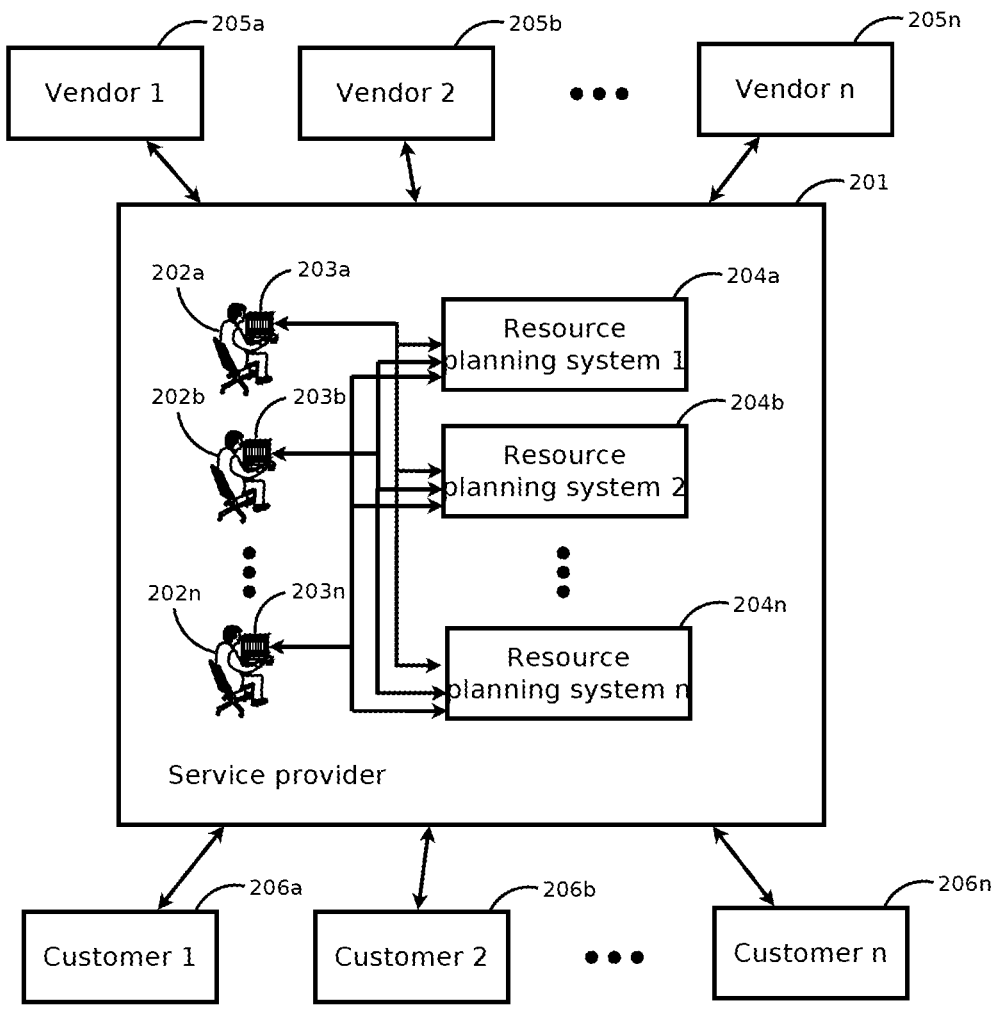
FIG. 2 is an illustrative block diagram of an example embodiment of a service provider.

FIG. 2 is an illustrative block diagram of an example embodiment of a service provider. The service provider 201 provides goods and services to customers 206. In one embodiment, the service provider 201 is an information technology (IT) service company that provides computer software, hardware, and maintenance to its customers 206. In another embodiment, the service provider 201 is a software product developer that provides the same software application to many different customers 206. In another embodiment, the service provider 201 is a custom software developer that provides different software applications, customized for specific needs, to each customer 206. In another embodiment, the service provider 201 is a web development company that provides the design and implementation of web sites to its customers 206. In another embodiment, the service provider 201 is a managed service provider (MSP) that services the computer hardware and software of its customers 206 for a fee (e.g., a fixed fee). In another embodiment, the service provider 201 is a hardware reseller that provides its customers 206 with computer hardware, installation, and setup. These embodiments are intended to be illustrative rather than limiting, and in still other embodiments, the service provider 201 provides its customers 206 with various combinations of the services described in these embodiments.

The service provider 201 employs a staff 202 to provide the services described. To support their work, the staff 202 uses one or more resource planning systems 204, accessing the resource planning systems 204 with devices 203. Devices 203 may be connected to the resource planning systems 204 either directly or through a network. In one embodiment, the resource planning systems 204 run internally at the service provider 201. In another embodiment, the resource planning systems 204 run externally, outside the service provider 201. In other embodiments, the resource planning systems 204 are a mixture of internal and external systems.

The service provider interacts with vendors 205, which can include one or more of hardware vendors that supply physical hardware, software vendors that supply software applications, and service vendors that supply other services. In one embodiment, a vendor 205 is also a service provider, such as the service provider 201.

Figure 3:
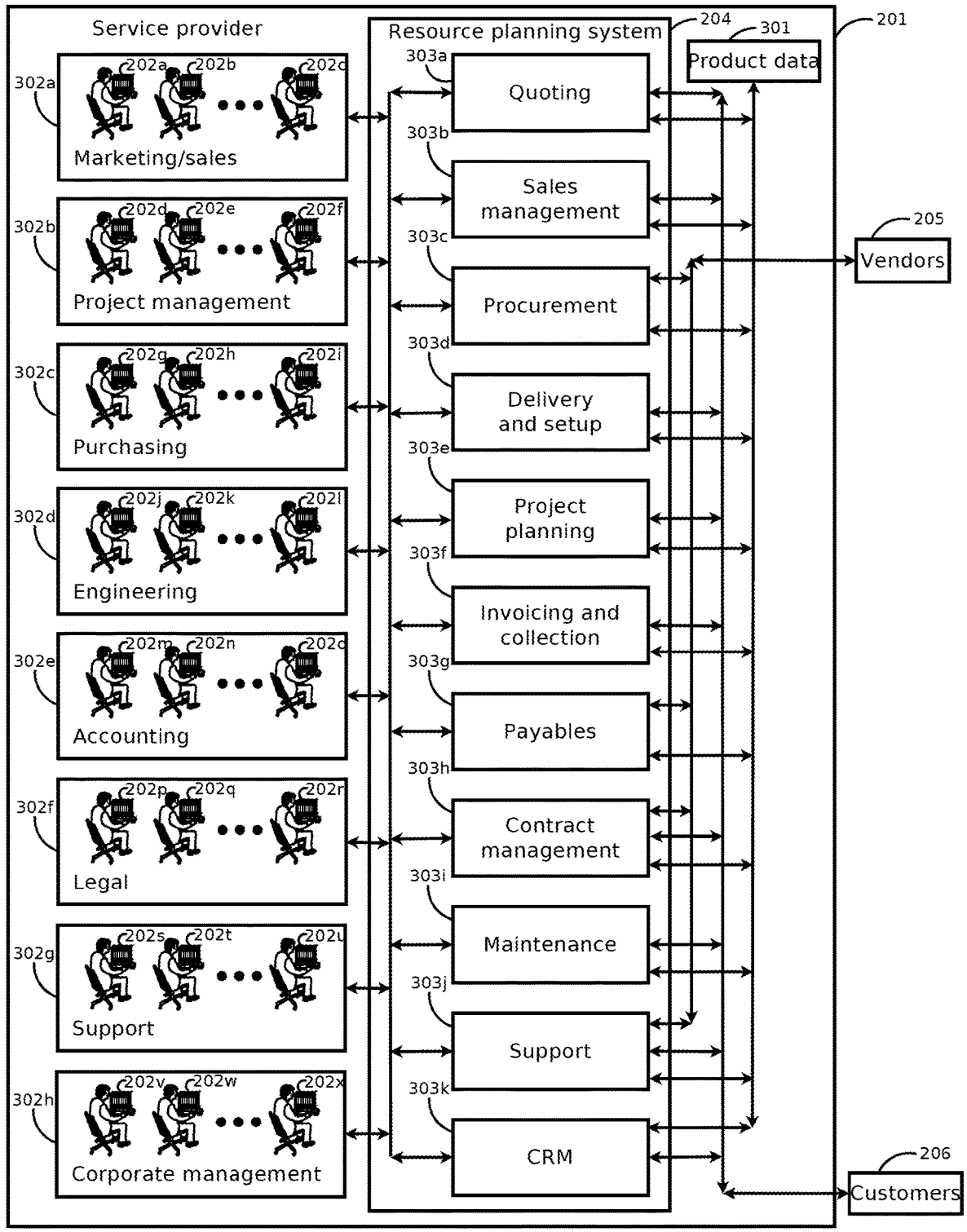
FIG. 3 is an illustrative block diagram of an example embodiment of the business units and processes within a service provider.

FIG. 3 is an illustrative block diagram of an example embodiment of the business units and processes within a service provider. The staff 202 at the service provider 201 is organized into different business units 302. In one embodiment, the business units 302 can include at least one of the marketing/sales department 302*a*, the project management department 302*b*, the purchasing department 302*c*, the engineering department 302*d*, the accounting department 302*e*, the legal department 302*f*, the support department 302*g*, and the corporate management 302*h*. In some embodiments, such as smaller companies, a single staff member 202 is a member of more than one department 302. In other embodiments, there are different business units; the embodiment described is intended to be illustrative rather than limiting.

The marketing/sales department 302*a* is responsible for finding customers 206 and convincing the customers 206 to do business with the service provider 201. The project management department 302*b* is responsible for understanding the needs of customers 206 and providing detailed plans to the staff 202 to meet those needs. The purchasing department 302*c* is responsible for interacting with vendors 205 to procure and pay for goods and services provided by the vendors 205. The engineering department 302*d* is responsible for the technical operations of installing, setting up, and maintaining the goods and services provided to the customers 206. The accounting department 302*e* is responsible for managing all of the financial aspects of the service provider 201. The legal department 302*f* is responsible for agreements between the service provider 201 and customers 206, agreements between the service provider 201 and vendors 205, and any other legal issues involving the service provider 201. The support department 302*g* is responsible for helping customers 206 to resolve any problems they have with the goods and services that the service provider 201 provides. The corporate management 302*h* oversees the operation of the service provider 201 and is ultimately responsible for its success or failure.

The business units 302 use multiple business processes 303 to interact with vendors 205 and provide goods and services to customers 206. In some embodiments, these business processes 303 can include at least one of a quoting process 303*a*, a sales management process 303*b*, a procurement process 303*c*, a delivery and setup process 303*d*, a project planning process or project planning business process 303*e*, an invoicing and collection process 303*f*, a payables process 303*g*, a contract management process 303*h*, a maintenance process 303*i*, a support process 303*j*, and a customer relationship management (CRM) process 303*k*.

Business units 302 have the ability to interact with processes 303, and can do so from time to time. As will be seen in FIG. 4, business units 302 can have a preferred set of business processes 303 with which they interact on a more regular basis. For example, the vendors 205 can interact with the procurement process 303*c*, the payables process 303*g*, the contract management process 303*h*, and the support process 303*j*. In another example, the customers 206 can interact with the quoting process 303*a*, the sales management process 303*b*, the delivery and setup process 303*d*, the project planning process 303*e*, the invoicing and collection process 303*f*, the contract management process 303*h*, the maintenance process 303*i*, the support process 303*j*, and the CRM process 303*k*.

The quoting process 303*a* provides a quote to a customer 206 with the cost of a specific set of goods and services to be provided by the service provider 201. The sales management process 303*b* helps the marketing/sales department 302*a* to organize their activities efficiently and manage their activities with the customers 206. The procurement process 303*c* orders, receives, and processes goods and services from the vendors 205. The delivery and setup process 303*d* ensures that goods and services from the service provider 201 arrive at the customers 206 and are installed and configured properly. The project planning process 303*e* coordinates the resources of the service provider 201 in order to satisfy the commitments of the service provider 201 to the customers 206 efficiently and in a timely manner. The invoicing and collection process 303*f* delivers invoices to customers 206, notifies customers 206 when a payment is due and ensures that the customers 206 pay the service provider 201 in a timely manner. The payables process 303*g* facilitates the process that includes the service provider 201 paying the vendors 205 in a timely manner. The contract management process 303*h* can negotiate the terms of agreements between the service provider 201 and the customers 206, and can also negotiate the terms of agreements between the service provider 201 and the vendors 205. The maintenance process 303*i* facilitates the process that includes completing, by the service provider 201 in a timely manner, periodic tasks required by the customers 206. The support process 303*j* addresses product-related problems that the customers 206 are having, and can continue to work on those problems until they are resolved to the satisfaction of the customer 206. The CRM process 303*k* facilitates contact between the service provider 201 and customers 206 by maintaining contact information and company information, and providing convenient interfaces for using that information to initiate telephone calls, emails, text messages, letters, faxes, or other forms of communication.

The business processes 303 use the product data 301. The product data 301 is a key shared repository for data about the goods and services provided by the service provider 201. Systems and methods of the present disclosure can use product data 301 to serve as a unifying mechanism for the business processes 303, the business units 302 that use those business processes 303, and the staff 202 that are part of those business units 302.

FIGS. 4A-4H are illustrative block diagrams of example embodiments of the relationships between the business units and the processes within a service provider. Business units 302 can interact with business processes 303, and certain interactions may occur more frequently in normal business operations. The interactions described with respect to FIG. 4 are not intended to be limiting, but are intended to illustrate customary business practices.

Figure 4A:
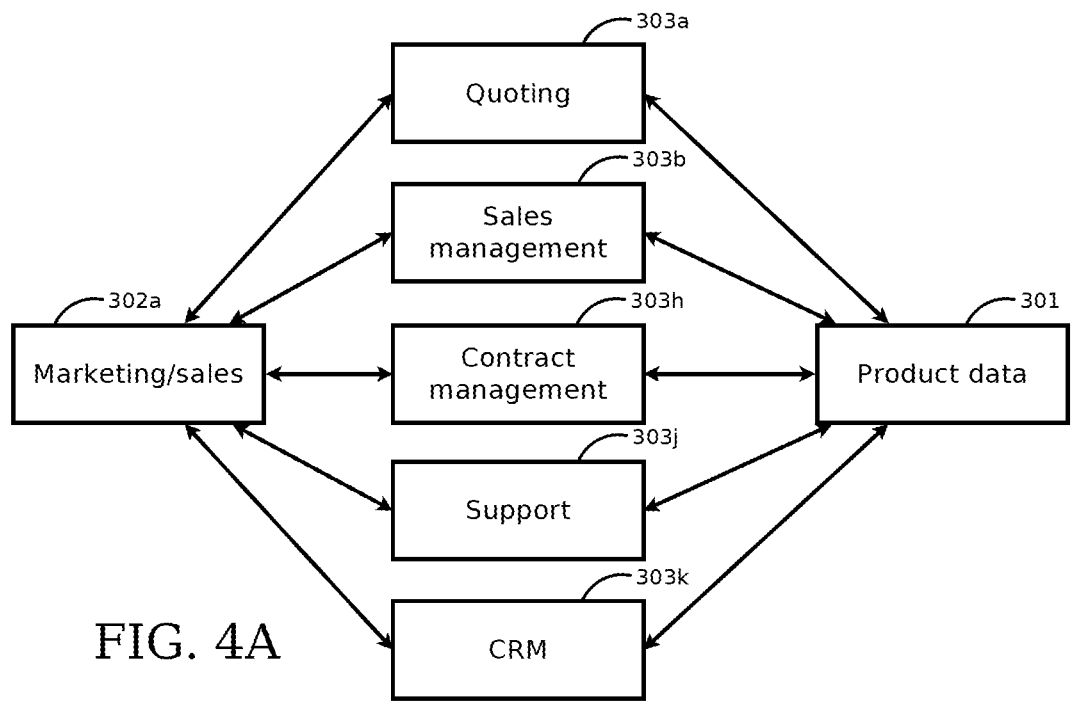
FIGS. 4A-4H are illustrative block diagrams of example embodiments of the relationships between the business units and the processes within a service provider.

FIG. 4A illustrates an exemplary interaction between the marketing/sales department 302*a* and various business processes including, e.g., at least one of the quoting process 303*a*, sales management process 303*b*, contract management process 303*h*, support process 303*j*, or CRM process 303*k*. The marketing/sales department 302*a* can drive the quoting process 303*a* by communicating with the customer 206 and arriving at an understanding of the customer's needs, then assembling the quote from goods and services in the product data 301, including the prices of those goods and services. The marketing/sales department 302*a* can interact with the sales management process 303*b* on a regular basis to find customers 306 and close orders with these customers. The marketing/sales department 302*a* can interact with the contract management process 303*h* to finalize agreements with customers 206 for products that may require ongoing service and payment. The marketing/sales department 302*a* can interact with the support process 303*j* for pre-sale support activity when, e.g., a prospective customer has a problem with a product or service and needs help from the support department 302*g*. The marketing/sales department 302*a* can use the CRM process 303*k* when the department attempts to contact a customer 206. In these interactions, the product data 301 can serve as the basis of interaction between the business processes 303, and can also serve as a common way for the marketing/sales department 302*a* to understand their interactions with those business processes.

Figure 4B:
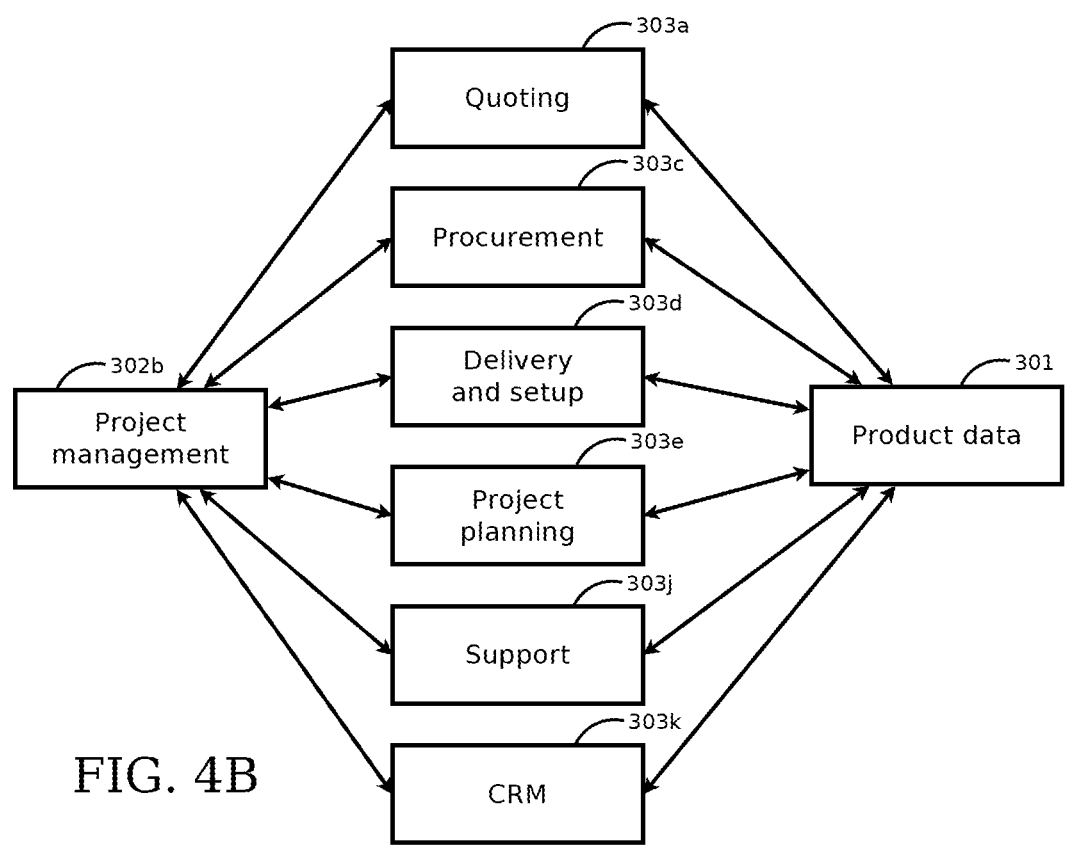

FIG. 4B illustrates an exemplary interaction between the project management department 302*b* and various processes including, e.g., the quoting process 303*a*, procurement process 303*c*, delivery and setup process 303*d*, project planning process 303*e*, support process 303*j*, or CRM process 303*k*. The project management department 302*b* can use the details from the quoting process 303*a* to build a project plan to deliver that quote, and can also integrate that project plan with other projects that are going on within the service provider 201. The project management department 302*b* can use the procurement process 303*c* to purchase external goods and services needed from vendors 205 in order to implement the project plan. The project management department 302*b* can use the delivery and setup process 303*d* to deliver the goods and services indicated by the project plan to the customer 206. The project management department 302*b* can interact with the support process 303*j* whenever there are unforeseen difficulties in implementing the project plan that are to be resolved for the customer 206. The project management department 302*b* can use the CRM process 303*k* to contact a customer 206. In some or all of these interactions, the product data 301 can serve as the basis of interaction between the business processes 303, and can also serve as a common way for the project management department 302*b* to understand their interactions with those business processes.

Figure 4C:
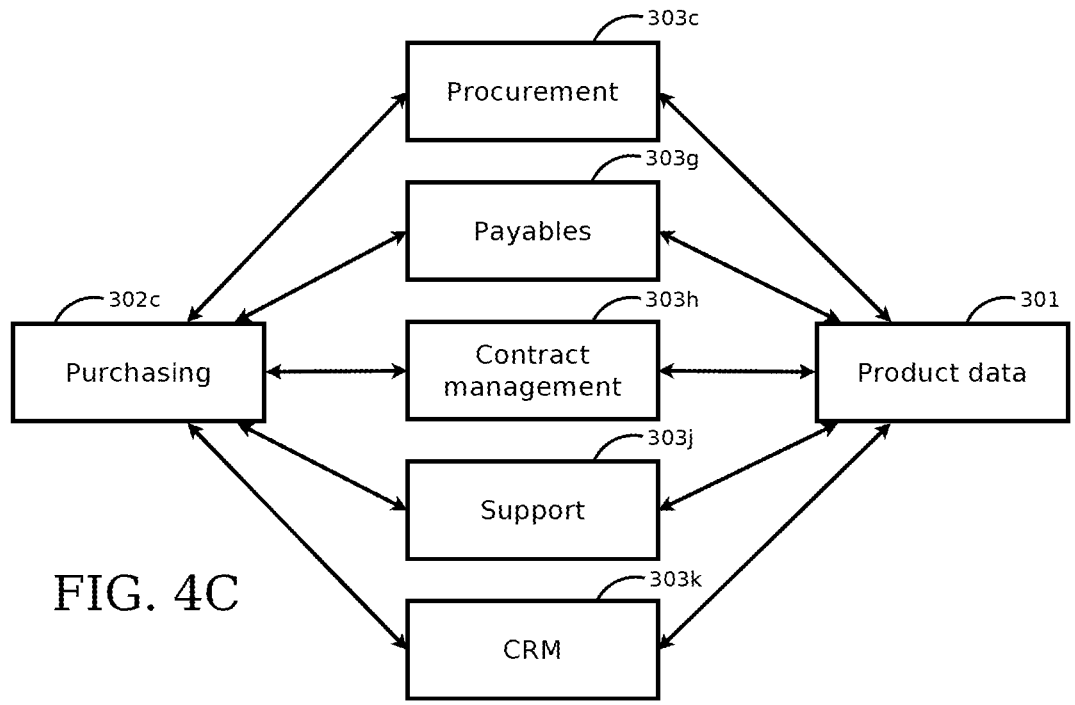

FIG. 4C illustrates an exemplary interaction between the purchasing department 302*c* and various business processes including, e.g., at least one of the procurement process 303*c*, payables process 303*g*, contract management process 303*h*, support process 303*j*, or CRM process 303*k*. The purchasing department 302*c* can manage the procurement process 303*c* to order goods and services from vendors 205 that are needed in order for the service provider 201 to meet its commitments to its customers 206. The purchasing department 302*c* can help to manage the payables process 303*g* to pay the vendors 205 in a timely manner and manage the cash flow of the service provider 201. The purchasing department 302c can interact with the contract management process 303h to get more favorable purchasing terms from vendors 205 by entering into longer term purchase agreements with them. The purchasing department 302c can also interact with the contract management process 303h to set up terms for services rendered by vendors 205 for the service provider 201 and its customers 206. The purchasing department 302c can interact with the support system 303j when a customer 206 has an issue concerning an interaction with a vendor 205 for which the purchasing department 302c is managing the relationship. The purchasing department 302c can use the CRM process 303k to contact a customer 206. In some or all of these interactions, the product data 301 can serve as the basis of interaction between the business processes 303, and can also serve as a common way for the purchasing department 302c to understand their interactions with those business processes.

Figure 4D:
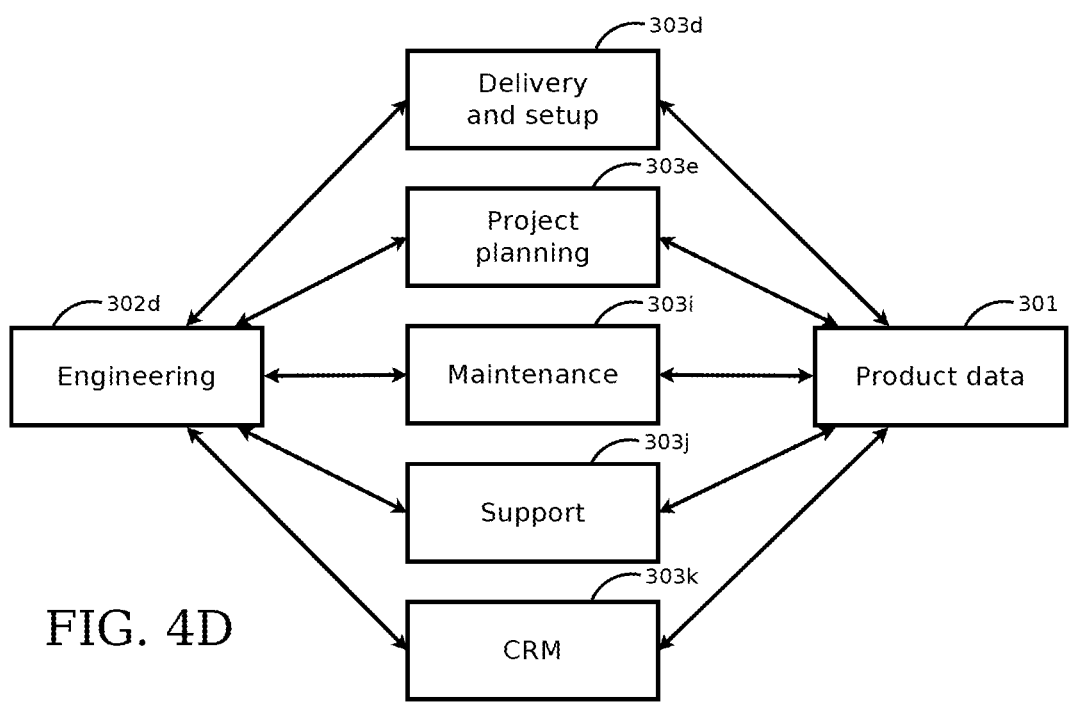

FIG. 4D illustrates an exemplary interaction between the engineering department 302d and various business processes including, e.g, at least one of the delivery and setup process 303d, project planning process 303e, maintenance process 303i, support process 303j, or CRM process 303k. The engineering department 302d can implement the setup part of the delivery and setup process 303d at the site of the customer 206 by implementing any installation and configuration services needed for the goods and services provided by the service provider 201 to the customer 206. The engineering department 302d can use the project planning process 303e as a source of information on the selection and timing of tasks that are required in order to implement the overall project plan. The engineering department 302d can implement the maintenance process 303i at the site of the customer 206 by implementing the periodic work agreed to by the service provider 201 and the customer 206. The engineering department 302d can use the support process to understand and diagnose problems encountered by customers 206, and to implement and track the solutions to those problems. The engineering department 302d can use the CRM process 303k to contact a customer 206. In some or all of these interactions, the product data 301 can serve as the basis of interaction between the business processes 303, and can also serve as a common way for the engineering department 302d to understand their interactions with those business processes.

Figure 4E:
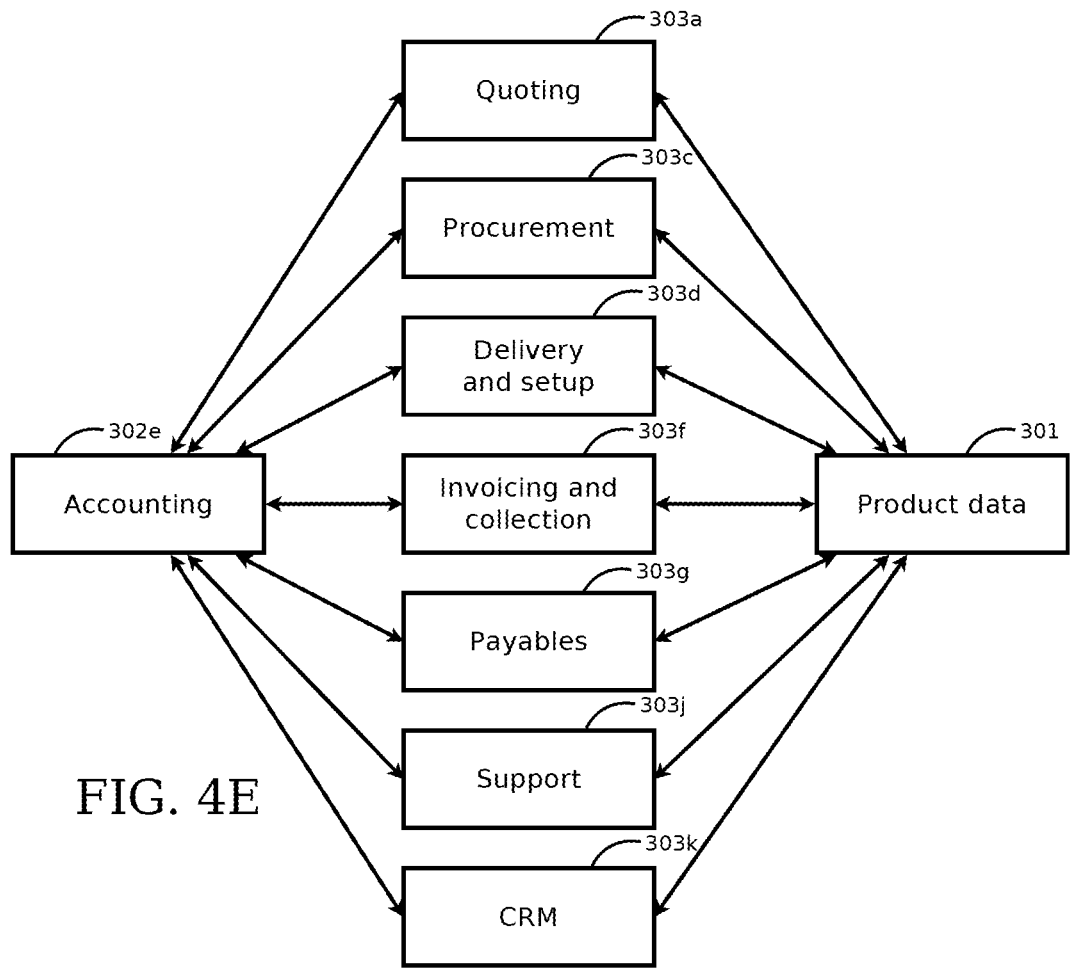

FIG. 4E illustrates an exemplary interaction between the accounting department 302e and various business processes including, e.g., at least one of the quoting process 303a, procurement process 303c, delivery and setup process 303d, invoicing and collection process 303f, payables process 303g, support process 303j, or CRM process 303k. The accounting department 302e can use the quoting process 303a as a source of information for creating an invoice to bill the customer 206. The accounting department 302e can use information from the procurement process 303c to generate forecasts of expenses to manage the cash flow of the service provider 201. The accounting department 302e can use the delivery and setup process 303d to know when deliveries take place at customers 206 in order to coordinate invoices and avoid invoicing a customer 206 for something that has not yet been delivered. The accounting department 302e can manage the invoicing and collection process 303f to deliver invoices to customers 206 and collect payments from them, and can manage the cash flow of the service provider 201. The accounting department 302e can manage the payables process 303g to pay vendors 205 in a timely manner, and can manage the cash flow of the service provider 201. The accounting department 302e can use the support process 303j to manage and track billing and invoicing issues generated by customers 206. The accounting department 302e can use the CRM process 303k to contact a customer 206. In some or all of these interactions, the product data 301 can serve as the basis of interaction between the business processes 303, and can also serve as a common way for the accounting department 302e to understand their interactions with those business processes.

Figure 4F:
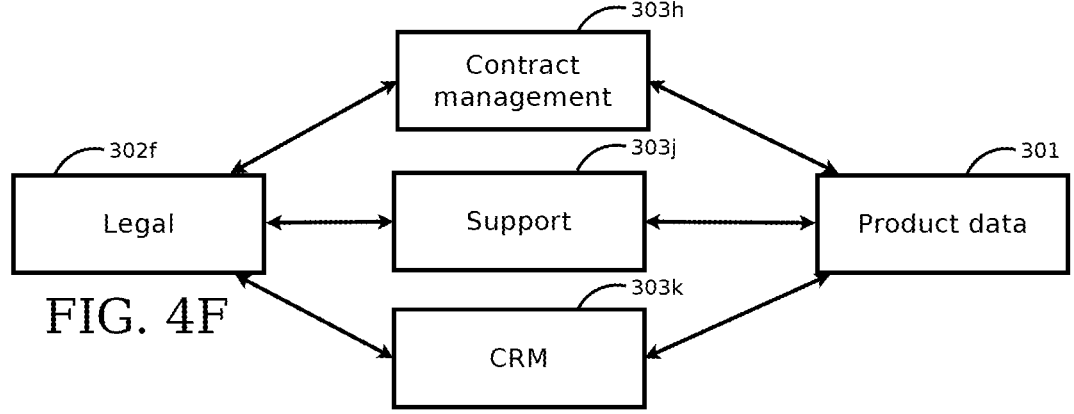

FIG. 4F illustrates an exemplary interaction between the legal department 302f and various business processes including, e.g., at least one of the contract management process 303h, support process 303j, or CRM process 303k. The legal department 302f can manage the contract management process 303h to define and negotiate the terms of any agreement into which the service provider 201 enters. The legal department can use the support process 303j to manage and track any issues generated by customers 206 that involve the terms of an agreement. The legal department 302f can use the CRM process 303k to contact a customer 206. In some or all of these interactions, the product data 301 can serve as the basis of interaction between the business processes 303, and can also serve as a common way for the legal department 302f to understand their interactions with those business processes.

Figure 4G:
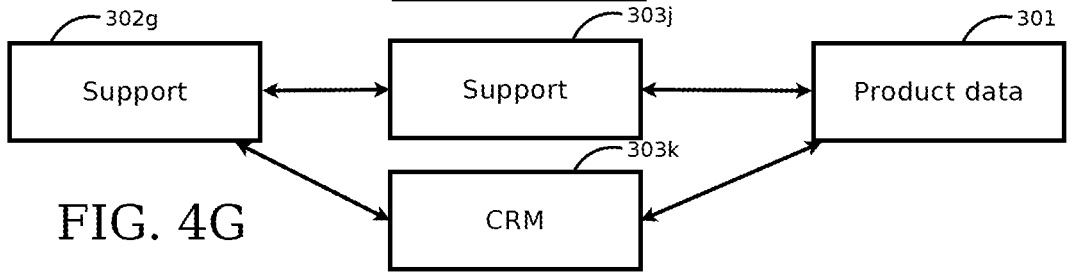

FIG. 4G illustrates an exemplary interaction between the support department 302g and various business processes including, e.g., at least one of the support process 303j or CRM process 303k. The support department 302g can manage the support process 303j and can use it to track and respond to all issues with customers 206. The support department 302g can use the CRM process 303k to contact a customer 206. In some or all of these interactions, the product data 301 can serve as the basis of interaction between the business processes 303, and can also serve as a common way for the support department 302g to understand their interactions with those business processes.

Figure 4H:
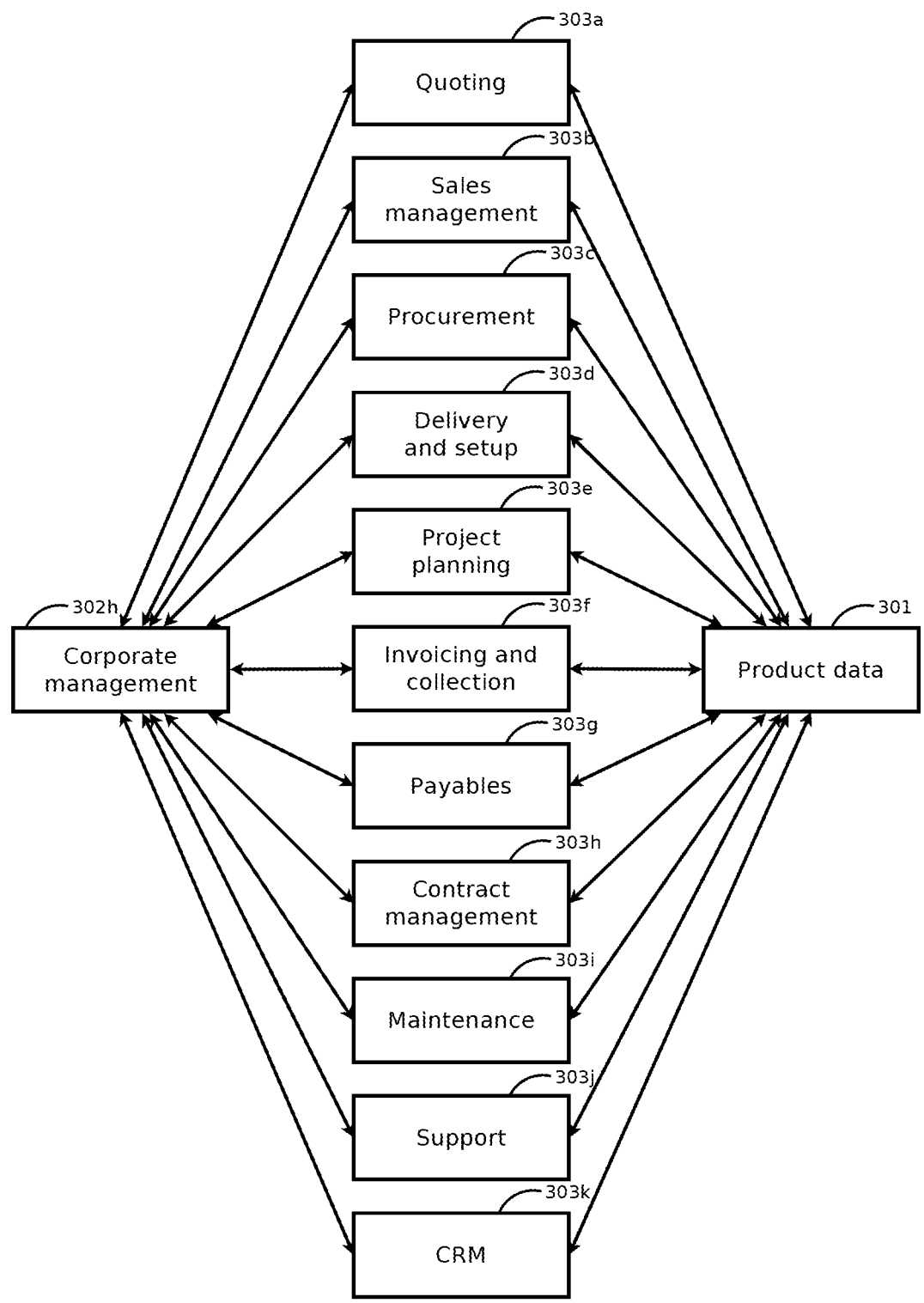

FIG. 4H illustrates an exemplary interaction between corporate management 302h and various business processes including, e.g., at least one of the business processes 303a-303k. Corporate management 302h can use information from business processes 303a-303k to track and understand the operation of the business of the service provider 201 as a whole. This can give a "360-degree view" of the business and can be valuable in making decisions about how to run the business. Again, the product data 301 can serve as the basis of interaction between the business processes 303, which can facilitate oversight provided by corporate management 302h with respect to the status of processes 303 and to understand the implications of same.

Figure 5:
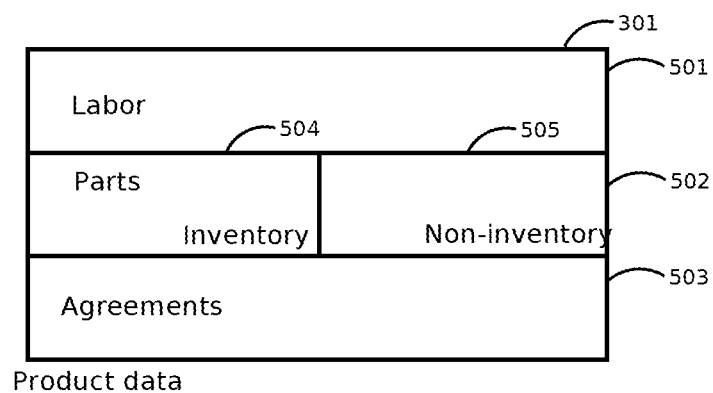
FIG. 5 is an illustrative block diagram of an example embodiment of product data.

FIG. 5 is an illustrative block diagram of an example embodiment of product data. For example, one class of product data 301 can be labor 501, which describes products that are services. Services-oriented products can include one-time actions that are taken by a person. For example, labor 501 can include the action of setting up the initial configuration for a piece of equipment. Another example of labor 501 can include the action of installing a software update onto a computer. Yet another example of labor 501 can include the action of replacing a part in a network router that is broken in order to restore its function. Labor products 501 can be invoiced at a fixed rate, based on the work that is done, or at an hourly rate, based on the amount of time spent doing the work.

A second class of product data 301 is parts 502, which describes products that are purchased entities delivered to the customer 206. For example, parts 502 can include a new piece of equipment that is installed for the customer 206.

Another example of parts 502 can include a replacement part for a network router that is broken. In some embodiments, parts 502 can also include non-physical entities such as a software license for a commercial third party software application that is installed for the customer 206. In another example, parts 502 can include an extended warranty from a manufacturer covering repair and updates for a longer period of time than the standard warranty. Parts products 502 can be invoiced at the cost to the service provider 201 plus a markup.

In some embodiments, parts products can include a plurality of subclasses. For example, parts products can include two sub-classes, inventory parts 504 and non-inventory parts 505. Inventory parts 504 can be parts 502 that the service provider 201 orders ahead of time and keeps in stock, which can make it convenient and quick to deliver the inventory parts 505 to a customer 206. Non-inventory parts 505 can be parts 502 that the service provider orders from a vendor 205 on an as-needed basis. The vendor 205 can delivers the parts 502 directly to the customer 206. The vendor 205 can also deliver the parts 502 to the service provider 201, who can then deliver them to the customer 206. Inventory parts 504 can be invoiced with a larger markup than non-inventory parts 505, because the service provider may need to pay the inventory and carrying costs associated with the inventory parts 504.

In some embodiments, product data 301 can include a third class for agreements 503, which describes products that are repeated or periodic services. Repeated or periodic services can refer to actions taken by a person on a regular basis, and can be covered by service agreements that are entered into between the service provider 201 and the customer 206. Examples of agreements 503 can include agreements to periodically clean a piece of equipment at the site of the customer 206; install updates for a commercial third party software application as they are released; and provide a network routing solution to meet a written specification, and continually update the network to meet the written specification as the environment changes. Agreements products 503 are can be invoiced at a fixed fee for a given time period, such as monthly or yearly.

Figure 6:
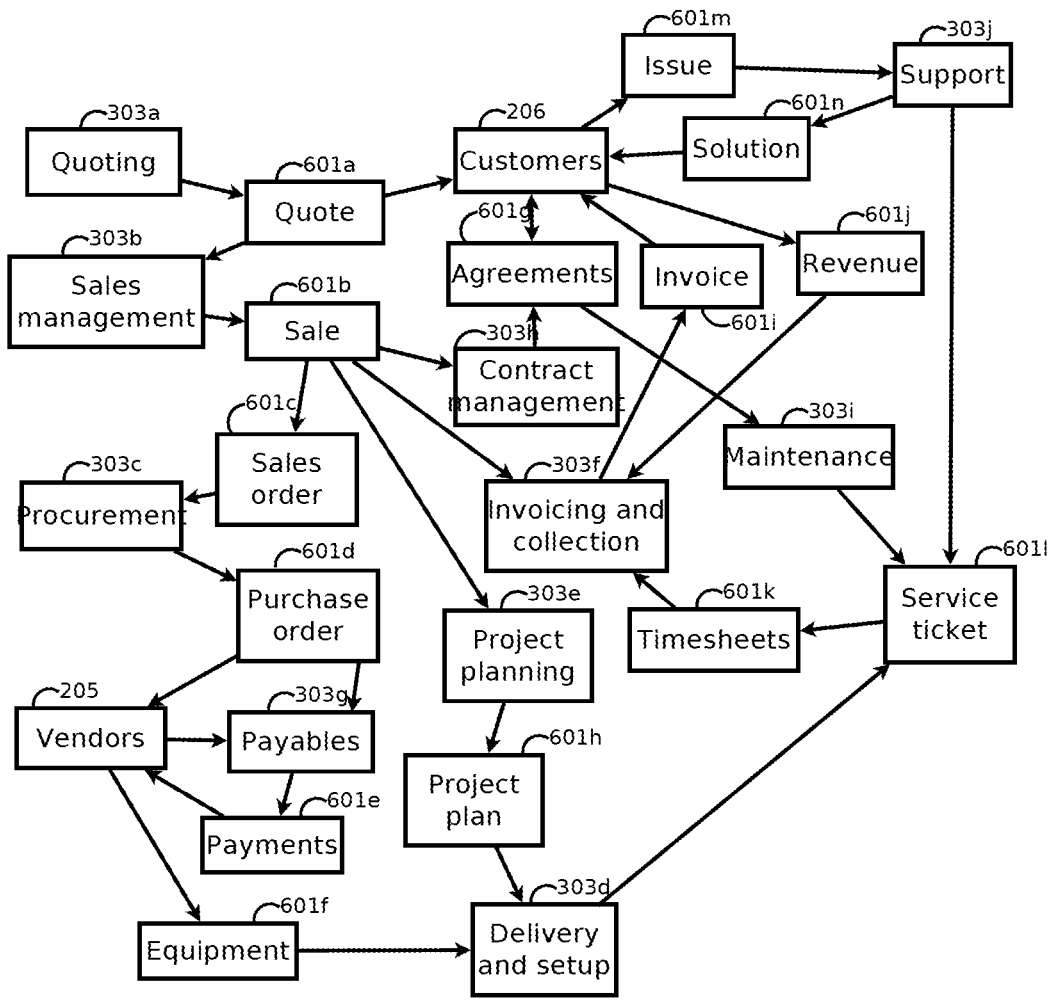
FIG. 6 is an illustrative block diagram of an example embodiment of the data flow within a service provider.

FIG. 6 is an illustrative block diagram of an example embodiment of the data flow within a service provider. FIG. 6 illustrates a number of different forms of intermediate data 601 between the business processes 301, but in every case the intermediate data 601 is made up of products from the product data 301, as will be described in further detail here. In this way, the product data 301 serves as a common source of information for both the business processes 301 and the intermediate data 601 that is used to transfer information between them. FIG. 6 is not intended to be limiting, but is instead intended to illustrate many of the aspects of the flow of information inside a service provider 201. Other embodiments of a service provider 201 have elements of data flow that are not shown in FIG. 6.

In some embodiments, the marketing/sales department 302*a* can commence the process by using the quoting business process 303*a* to create a quote 601*a* from the product data 301. In other embodiments, different departments or processes can commence the flow. The quote 601*a* can include a list of products designed to address the needs of a customer 206. This list can include a plurality of classes of products such as labor products 501, parts products 502, and agreements products 503. For example, a customer 206 that needs an email server may get a quote 601*a* that includes the hardware for the server, which is a parts product 502, the one-time setup for that server, which is a labor product 501, and the ongoing maintenance for that server, which is an agreements product 503. The quote 601*a* includes prices for all of the products in the list, so that the customer 206 knows in advance the total price for what is being bought, and exactly what that price includes.

The sales management business process 303*b* now has the responsibility of selling the products to the customer 206. The marketing/sales department follows a series of steps for working with the customer 206. The steps can reference the list of products in the quote 601*a*. In some embodiments, the sale is complete when the customer 206 agrees with every element of the quote 601*a*. At that time, the sale has been closed and the quote 601*a* is converted to a sale 601*b*. The sale 601*b* is a different form of information, but it is a list of the products that the customer 206 has agreed to purchase, so it is created from the quote by using the same product data 301 that the quote refers to. This is an example of how the product data 301 serves as a common source of information for both the quoting business process 303*a* and the sales management business process 303*b*.

Once the sale 601*b* is finalized, the list of products in it is copied, transferred, or otherwise conveyed to several places. For example, the list of parts products 501 in the sale 601*b* can be copied to a sales order 601*c*. The sales order 601*c* is a list of the parts products 501 that need to be ordered in order to deliver the quote 601*a*. The sales order goes to the procurement business process 303*c*, which is responsible for procuring the parts products 501 that are listed in the sales order. Since the sales order 601*c* is created from a list of products from the product data 301, this is an example of how the product data 301 serves as a common source of information for both the sales management business process 303*b* and the procurement business process 303*c*.

The list of agreements products in the sale 601*b* is used by the contract management business process 303*h*. Each agreements product in the sale 601*b* is used to generate an agreement 601*g*. The agreement is created from information in the product data 301 about the product in the list of products in the sale 601*b*, so this is an example of how the product data 301 serves as a common source of information for both the sales management business process 303*b* and the contract management business process 303*h*. The contract management business process 303*h* is responsible for negotiating the terms of the agreements 601*g* with the customer 206, and updating the agreements 601*g* with the results of the negotiation.

The list of all products in the sale 601*b* is used by the invoicing and collection business process 303*f*. Each product in the sale 601*b* is copied into the invoicing system, which is used to create invoices 601*i* to be sent to the customer 206. The invoices 601*i* are created from information such as pricing in the product data 301 for the list of products in the sale 601*b*, so this is an example of how the product data 301 serves as a common source of information for both the sales management business process 303*b* and the invoicing and collections business process 303*f*. The invoices 601*i* are not actually sent to the customer 206 until the products listed on them have actually been delivered; this is described later more fully.

The list of labor products 501 in the sale 601*b* is used by the project planning business process 303*e*. The project planning business process 303*e* creates a project plan 601*h*, which is a list of tasks needed to deliver the quote 601*a*. Each labor product 501 listed in the sale 601*b* is copied into one task, and the product data 301 provides information such as the expected length of time for the task. The project planning business process 303*e* assigns the tasks to appropriate staff 202 within the service provider 201 based on the nature of the tasks, and schedules the tasks based on the availability of the staff 202. The result is the completed project plan 601*h*. The tasks in the project plan 601*h* are created using information from the product data 301 about the labor products 501 in the sale 601*b*, so this is an example of how the product data 301 serves as a common source of information for both the sales management business process 303*b* and the project planning business process 303*e*.

The list of products in the sales order 601*c* is used by the procurement business process 303*c* to create purchase orders 601*d*. A purchase order 601*d* is a list of products to be procured from one vendor 205. Each product in the sales order 601*c* that is procured from the same vendor 205 is copied into the purchase order 601*d* for that vendor 205. The purchase order 601*d* is then sent to the vendor 205 and is also used by the payables business process 303*g*. The purchase orders 601*d* are created using the vendor information in the product data 301, so this is an example of how the product data 301 serves as a common source of information for both the procurement business process 303*c* and the payables business process 303*g*.

The list of products in the purchase order 601*d* is used by the payables business process 303*g* to create payments 601*e* to be sent to the vendors 205. The payables business process 303*g* monitors the deliveries of equipment 601*f* from the vendors 205 and coordinates the payments 601*e* to correspond to the delivery times and terms agreed upon with the vendors 205. The payments 601*e* are created and scheduled using vendor information and payment terms in the product data 301, so this is another example of how the product data 301 serves as a common source of information for both the procurement business process 303*c* and the payables business process 303*g*.

The project plan 601*h* is used by the delivery and setup business process 303*d* to schedule the delivery of equipment 601*f* to the customer 206 as well as the use of staff 202 to set up the equipment 601*f* once it has been delivered. Each task in the project plan 601*h* is copied into a service ticket 601*l*, and the service tickets are used by the staff 202 to properly organize their time so that the setup of the equipment 601*f* is done in a timely and efficient manner. The service tickets 601*l* are created using information about the time and expense taken from the product data 301 for the labor products 501 in the tasks in the project plan 601*h*, so this is an example of how the product data 301 serves as a common source of information for both the project planning business process 303*e* and the delivery and setup business process 303*d*.

The staff 202 addressing the service tickets 601*l* creates timesheets 601*k* for the work they are doing. Information from the service ticket 601*l* that is completed is copied into the timesheet entry for that ticket, and the timesheet goes to the invoicing and billing business process to be included in the invoice 601*i* that is sent to the customer 206. This closes the loop that was described previously where a labor product 501 entered the invoicing and collection business process 303*f* from the sale 601*b*; the arrival of the same labor product 501 from a timesheet 601*k* indicates that the labor product 501 has been delivered to the customer and can now be included in an invoice 601*i* that is sent to the customer. Since the same labor product 501 is used from the product data 301, this is an example of how the product data 301 serves as a common source of information for the sales management business process 303*b*, the invoicing and collection business process 303*f*, and the delivery and setup business process 303*d*.

The agreements 601*g* are used by the maintenance business process 303*i* to schedule and deliver the ongoing tasks required to meet the terms of the agreements 601*g*. The terms of the agreements 601*g* in the products in the agreements are copied into service tickets 601*l*, and the service tickets are used by the staff 202 to properly organize their time so that the periodic maintenance tasks are done in a timely and efficient manner. The service tickets 601*l* are created using information about the scheduling, time, and expense taken from the product data 301 for the agreements products 503 in the agreements 601*g*, so this is an example of how the product data 301 serves as a common source of information for both the contract management business process 303*h* and the maintenance business process 303*i*.

The service tickets 601*l* created by the maintenance business process 303*i* can be handled in essentially the same way as previously described for service tickets 601*l* created by the delivery and setup business process 303*d*. In much the same way, this is an example of how the product data 301 serves as a common source of information for the sales management business process 303*b*, the invoicing and collection business process 303*f*, and the maintenance business process 303*i*.

The customers 206 have ongoing issues 601*m* with the goods and services delivered by the service provider 201. The support business process 303*j* takes these issues 601*m* in a triage process and creates a service ticket 601*l* for each ticket. Since each issue is in reference to a particular product, the support process copies information from the product data 301 into the service ticket 601*l*. The service tickets are then used by staff 202 to prioritize and organize time and effort efficiently to arrive at solutions 601*n* for the issues, which are delivered to the customers 206. The product information in the service tickets 601*l* is integral in understanding, diagnosing, and solving the issues 601*m*, so this is an example of how the product data 301 serves as a common source of information for the support business process 303*j* and every other business process 301, since any other business process 301 can be involved in solving customer issues 601*m* at some point in time.

The service tickets 601*l* created by the support business process 303*j* are handled in essentially the same way as previously described for service tickets 601*l* created by the delivery and setup business process 303*d*. In much the same way, this is an example of how the product data 301 serves as a common source of information for the sales management business process 303*b*, the invoicing and collection business process 303*f*, and the support business process 303*j*.

The logical end of the overall flow is reached when the customer 206 delivers revenue 601*j* to the service provider 201 in response to receiving an invoice 601*i*. The revenue 601*i* goes to the invoicing and collection business process 303*f*, which matches the revenue against the invoices 601*i* that have been delivered to the customer 206 and closes the outstanding billing. In this final step, the revenue 601*j* can be matched to the product items in the invoice 601*i* that is being paid, so this is an example of how the product data 301 serves as a common source of information for the invoicing and collection business process 303*f* to manage the financial relationship with the customer 206.

Figure 7A:
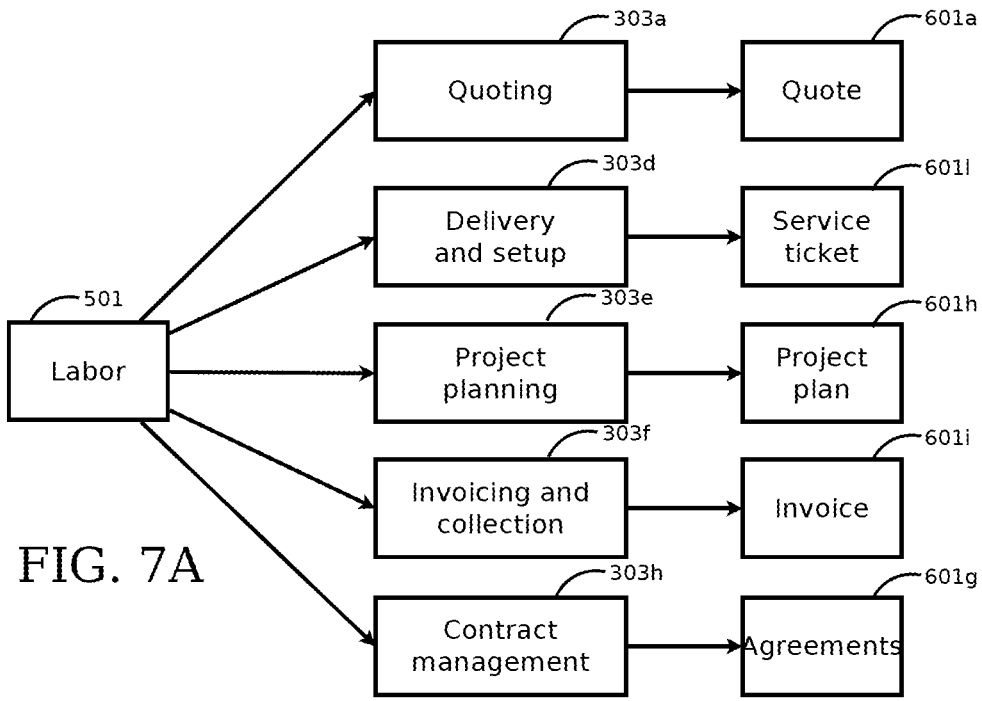
FIGS. 7A-7C are illustrative block diagrams of example embodiments of the flow of information from product data to the business processes within a service provider.
Figure 7B:
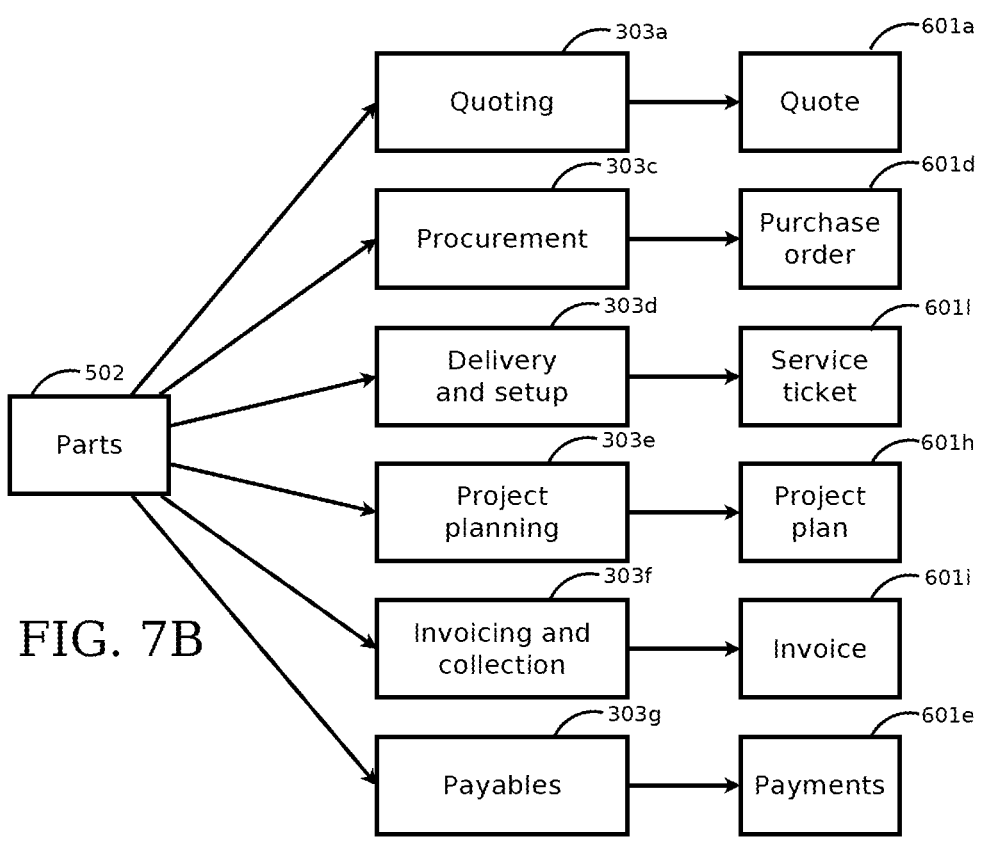
Figure 7C:
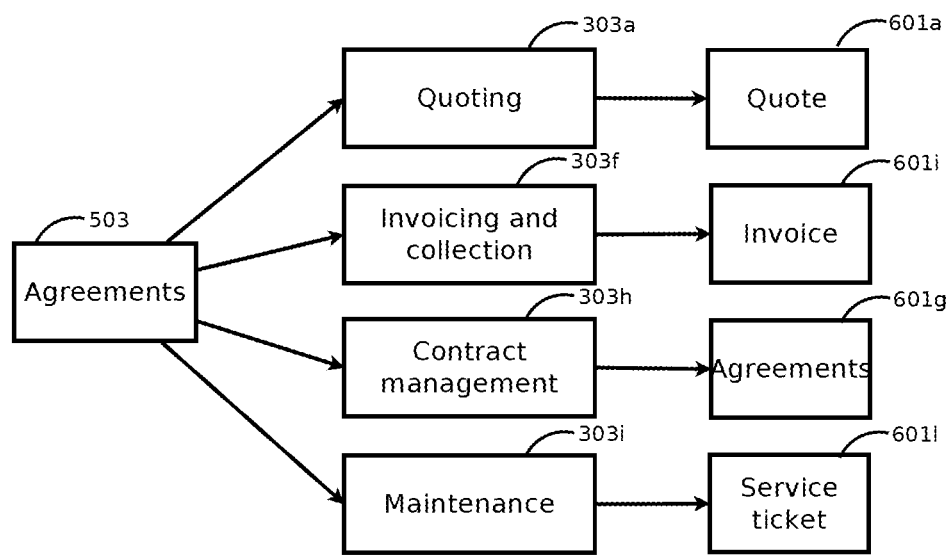

FIGS. 7A-7C are illustrative block diagrams of example embodiments of the flow of information from product data to the business processes within a service provider. The product class is the entity that divides the product data 301 into labor products 501, which are detailed in FIG. 7A, parts products 502, which are detailed in FIG. 7B, and agreements products 503, which are detailed in FIG. 7C.

FIG. 7A illustrates the way in which information from labor products 501 is copied to the business processes 303 in the system. In particular, information from labor products 501 is copied to the quoting business process 303*a*, delivery and setup business process 303*d*, project planning business process 303*e*, invoicing and collection business process 303*f*, and contract management business process 303*h*.

The quoting business process 303*a* creates a quote 601*a* in which every line item is a product from the product data 301. The line item uses information from the labor product data 501 to fill in, among other things, the description, part number, hourly rate, fixed fee, technician skill level, estimated time, and arbitrary notes for the product.

The delivery and setup business process 303*d* creates service tickets 601*l* for each task that is required in order to complete the delivery and setup. Each service ticket uses information from the labor product data 501 to fill in, among other things, the description, estimated time, customer name, customer contact information, and arbitrary notes for the ticket.

The project planning business process 303*e* creates a project plan 601*h* in which every task corresponds to a product from the product data 301. The task uses information from the labor product data 501 to fill in, among other things, the description, budgeted time, billing type, resource type (skill level) required, and arbitrary notes for the task.

The invoicing and collection business process 303*f* creates an invoice 601*i* in which every line item is a product from the product data 301. The line item uses information from the labor product 501 to fill in, among other things, the description, part number, hourly rate, fixed fee, billing method, and arbitrary notes for the product.

The contract management business process 303*h* creates agreements 601*g* when a labor product 501 is delivered by an outside vendor 205 rather than a staff member 202 of the service provider 201. In this case, the contract management is to set up an agreement 601*g* with the vendor 205 specifying the terms for the delivery of the labor product 501. The agreement 601*g* uses information from the labor product 501 to fill in, among other things, the name, description, hourly rate, fixed fee, billing method, estimated time, vendor name, and arbitrary notes for the product.

FIG. 7B illustrates the way in which information from parts products 502 is copied to the business processes 303 in the system. In particular, information from parts products 502 is copied to the quoting business process 303*a*, procurement business process 303*c*, delivery and setup business process 303*d*, project planning business process 303*e*, invoicing and collection business process 303*f*, and payables business process 303*g*.

The quoting business process 303*a* creates a quote 601*a* in which every line item is a product from the product data 301. The line item uses information from the parts product data 502 to fill in, among other things, the description, part number, packaging, price, pricing modifiers, image, arbitrary notes, and sourcing information for the product.

The procurement business process 303*c* creates a purchase order 601*d* in which every line item is a product from the product data 301. The line item uses information from the parts product data 502 to fill in, among other things, the product ID, description, quantity, price, customer site, packaging, pricing modifiers, and arbitrary notes for the product.

The delivery and setup business process 303*d* creates service tickets 601*i* for each task that is required in order to install and configure the parts product 502. Each service ticket uses information from the parts product data 502 to fill in, among other things, the description, estimated time, customer name, customer contact information, and arbitrary notes for the ticket.

The project planning business process 303*e* creates a project plan 601*h* in which every task corresponds to a product from the product data 301. The tasks corresponding to parts product data 502 are the tasks for installing and configuring those parts products 502. The tasks use information from the parts product data 502 to fill in, among other things, the description, budgeted time, billing type, resource type (skill level) required, and arbitrary notes for the task.

The invoicing and collection business process 303*f* creates an invoice 601*i* in which every line item is a product from the product data 301. The line item uses information from the parts product 501 to fill in, among other things, the description, part number, packaging, price, pricing modifiers, image, arbitrary notes, and sourcing information for the product.

The payables business process 303*g* creates payments 601*e* for products that are ordered from vendors 205. The payments correspond to a series of parts products, and the payments use information from the parts product data 502 to fill in, among other things, the description, price, part number, and arbitrary notes for the product.

FIG. 7C illustrates the way in which information from agreements products 503 is copied to the business processes 303 in the system. In particular, information from agreements products 503 is copied to the quoting business process 303*a*, invoicing and collection business process 303*f*, contract management business process 303*h*, and maintenance business process 303*i*.

The quoting business process 303*a* creates a quote 601*a* in which every line item is a product from the product data 301. The line item uses information from the agreements product data 503 to fill in, among other things, the name, description, hourly rate, fixed fee, billing method, estimated time, vendor name, and arbitrary notes for the product.

The invoicing and collection business process 303*f* creates an invoice 601*i* in which every line item is a product from the product data 301. The line item uses information from the agreements product 503 to fill in, among other things, the name, description, hourly rate, fixed fee, billing method, estimated time, vendor name, and arbitrary notes for the product.

The contract management business process 303*h* creates agreements 601*g* to fulfill the obligations required by the agreements products 503. The contract management sets up an agreement 601*g* with the customer 206 specifying the terms for the delivery of the agreements product 503. The agreement 601*g* uses information from the labor product 501 to fill in, among other things, the name, description, hourly rate, fixed fee, billing method, estimated time, vendor name, and arbitrary notes for the product.

The maintenance business process 303*d* creates service tickets 601*l* for each task that is required in order to complete the periodic maintenance task. Each service ticket uses information from the agreement product data 503 to fill in, among other things, the description, hourly rate, fixed fee, billing method, estimated time, scheduling information, customer name, customer contact information, and arbitrary notes for the ticket.

Figure 8:
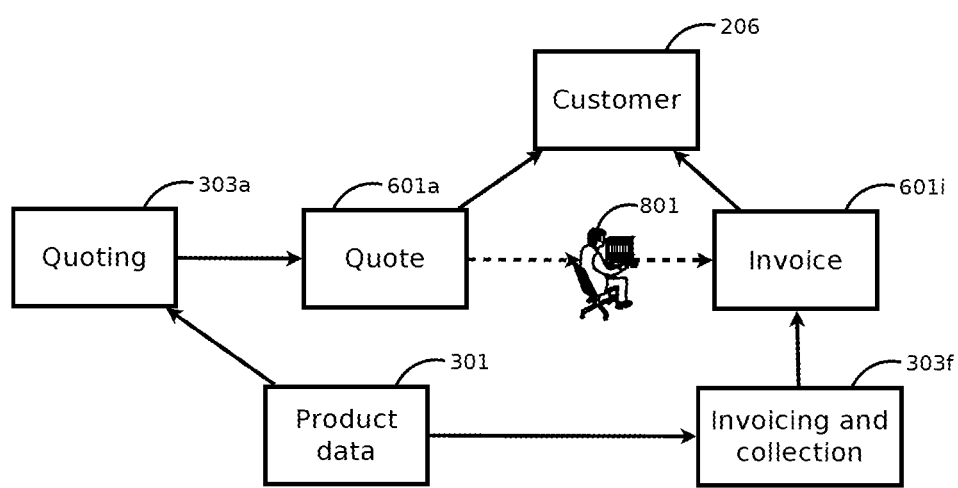
FIG. 8 is an illustrative block diagram of an example embodiment of reliable synchronization of the quote and invoice seen by a customer.

FIG. 8 is an illustrative block diagram of an example embodiment of reliable synchronization of the quote and invoice seen by a customer. After the quoting business process 303*a* prepares the quote 601*a*, the quote 601*a* is sent to the customer 206. The customer may interact with the quote 601a and may even change it. After this, many business processes 303 interact with the quote 601a and are driven by it. Eventually, sometimes much later, one end result of the sale is the invoicing and collection business process 303f, which prepares the invoice 601i to be sent to the customer 206. This is a very important process to the service provider 201, because it is the mechanism by which the business makes money. In some systems not described by the present disclosure, the invoice 601i is created by a person 801 using a manual process that involves referring to the quote 601a. Preparing the invoice 601i this way has a substantial risk of introducing errors, including simple typographical errors, transcription errors, referring to the wrong copy of a quote, and so on. Unfortunately, the consequences of a customer 206 seeing a mismatch between the quote 601a and the invoice 601i are very negative. The customer 206 is not sure what amount to pay, which delays the payment. The customer 206 may interpret the mismatch as hidden charges or over-billing. The customer is likely to lose faith in the service provider 201 as a result of this relatively minor error.

The present disclosure completely avoids the unfortunate situation described. Since both the quote 601a and the invoice 601i are derived from the same list of products from the product data 301, and the same product list is used by both the quoting process 303a and the invoicing and collection process 601i, the quote 601a and the invoice 601i seen by the customer 206 always match exactly. In this way, the customer knows well in advance what payment is expected, so the payment is handled smoothly. The customer feels that the service provider 201 is in control and professional.

Figure 9:
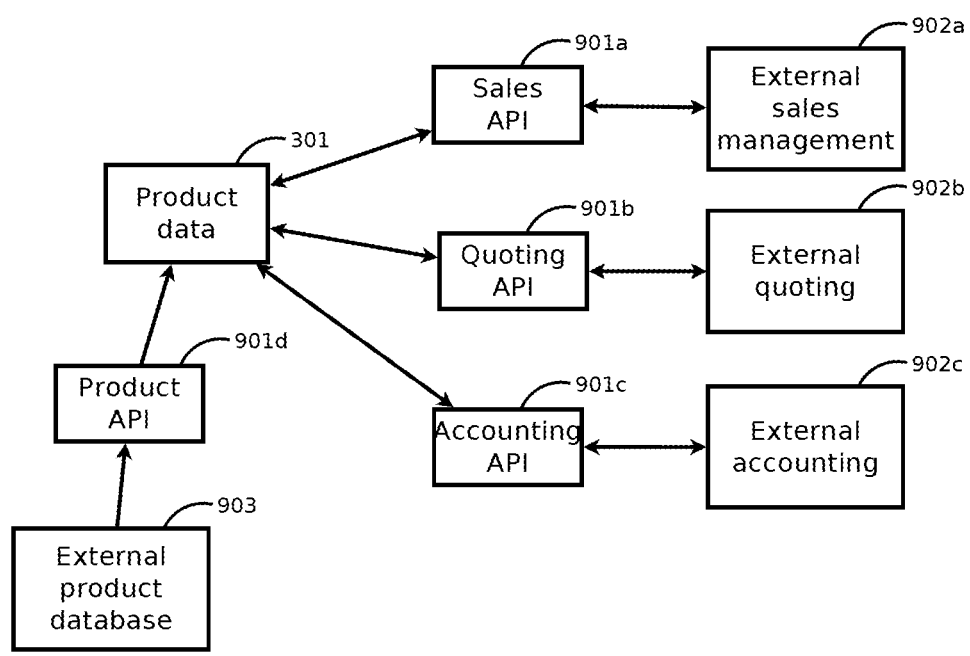
FIG. 9 is an illustrative block diagram of an example embodiment of interfaces between product data and external systems.

FIG. 9 is an illustrative block diagram of an example embodiment of interfaces between product data and external systems. The service provider 201 may use external systems for some business processes. For example, the service provider 201 may use an external system when the service provider 201 previously chose a system for one business process long before deciding to use a resource planning system 204, and does not want to train employees to work with a different system. In another embodiment, the service provider 201 previously chose or can choose a system for one or more business process based on special needs that require the features of that system. In another embodiment, the service provider 201 previously chose or can choose a system for one business process based on requirements imposed by a customer 206 or a vendor 205. FIG. 9 illustrates an embodiment where the sales management process is implemented using an external sales management system 902a such as the system provided by Salesforce.com of San Francisco, California, USA. FIG. 9 illustrates an embodiment where the quoting process is implemented using an external quoting system 902b such as the system provided by Quosal LLC of Bothell, Washington, USA. FIG. 9 illustrates an embodiment where the invoicing and collection process and the payables process is implemented using an external accounting system 902c such as the QuickBooks system provided by Intuit, Inc. of Mountain View, California, USA. For each of these external systems, the resource planning system 204 provides an application programming interface (API) 901 that communicates information both ways between the product data 301 and the external system 902. The API 901 uses a well defined interface defined by the supplier of the external system 902, and is greatly simplified by the fact that it only needs to correctly interface to a single product data source 301 in order to work with the rest of the resource planning system 204. In this way, a sales API 901a is provided to interface the product data 301 with the external sales management system 902a, a quoting API 901b is provided to interface the product data 301 with the external quoting system 902b, and an accounting API 901c is provided to interface the product data 301 with the external accounting system 902c.

In some embodiments, external interfaces can facilitate the use of external sources of product data. For example, external interfaces can facilitate importing standard product data from an external product database 903, such as the product database provided by Etilize, Inc. of Denver, Colorado, USA. The external product database 903 may include thousands of commercially available products. To use this external product database 903, the resource planning system 204 provides a product API 901d that communicates information from the external product database 903 to the product data 301. The API 901d uses a well defined interface defined by the supplier of the external product database 903, and is greatly simplified by the fact that it only needs to correctly interface to a single product data source 301 in order to work with the rest of the resource planning system 204.

Figure 10:
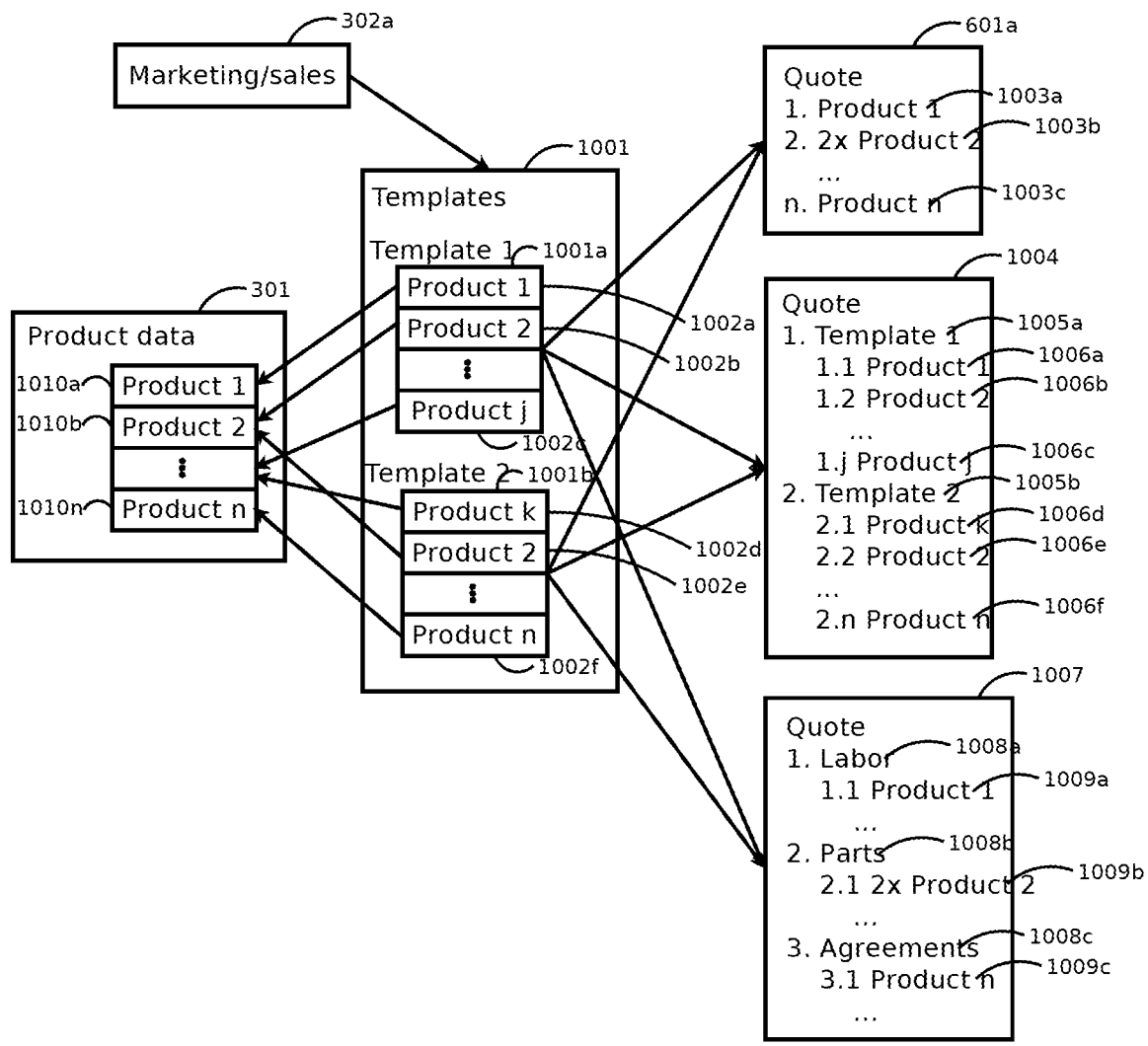
FIG. 10 is an illustrative block diagram of an example embodiment of templates for product data.

FIG. 10 is an illustrative block diagram of an example embodiment of templates for product data. When the marketing/sales department 302a prepares a quote 601a for a customer, there is often a need to add to the quote 601a a collection of products that are commonly grouped together. In one embodiment, a quote for a small business setup includes a server, a router, a firewall/VPN, operating system software for the server, VPN software for the employees of the business, software installation, network installation, and monitoring and maintenance for the server. The service provider 201 wants to ensure that all of these products are included in the quote with the right configuration and pricing, but it is inefficient and error prone to require that all of the sales staff knows this product configuration, especially since it will change from time to time. To address this issue, the resource planning system 204 provides templates 1001 that are used to manage groups of products.

A list of templates 1001 is available for generating quotes 601a. In one embodiment, template 1 1001a contains product references to product 1 1002a through product j 1002c, and template 2 1001b contains product references to product k 1002d through product n 1002f, as well as a reference to product 2 1002e. Each of the product references 1002 in the templates 1001 is a pointer to the actual product information 1010 in the product data 301, so that when the product data 301 is updated, the templates 1001 are automatically updated as well. When template 1 1001a and template 2 1001b are both added to a quote 601a, the quote 601a lists line items 1003 for product 1 1003a through product n 1003c. The line item 1003b for product 2 indicates a quantity of 2, because one was generated by reference 1002b in template 1 1001a, and the other was generated by reference 1002e in template 2 1001b.

Since the quote 601a is generated automatically from the product data 301, it is simple for the marketing/sales department to generate the quote in different formats for the convenience of the customer. In one embodiment, the quote 601a is organized as a simple list of the products. In a second embodiment, the quote 1004 is organized by the templates 1005 used to make the quote, with the products 1006 listed within the templates. In a third embodiment, the quote 1007 is organized by the product classes labor 1008a, parts 1008b, and agreements 1008c, and the products are listed in each class 1008 as described previously, as labor products 1009a, parts products 1009b, and agreements products 1009c.

In this way, templates 1001 allow the sales/marketing department 302*a* to provide a quote 601*a* to a customer that contains commonly offered combinations of products, without requiring the sales/marketing department 302*a* to have detailed knowledge of the exact combination of products used in those commonly offered combinations.

Figure 11:
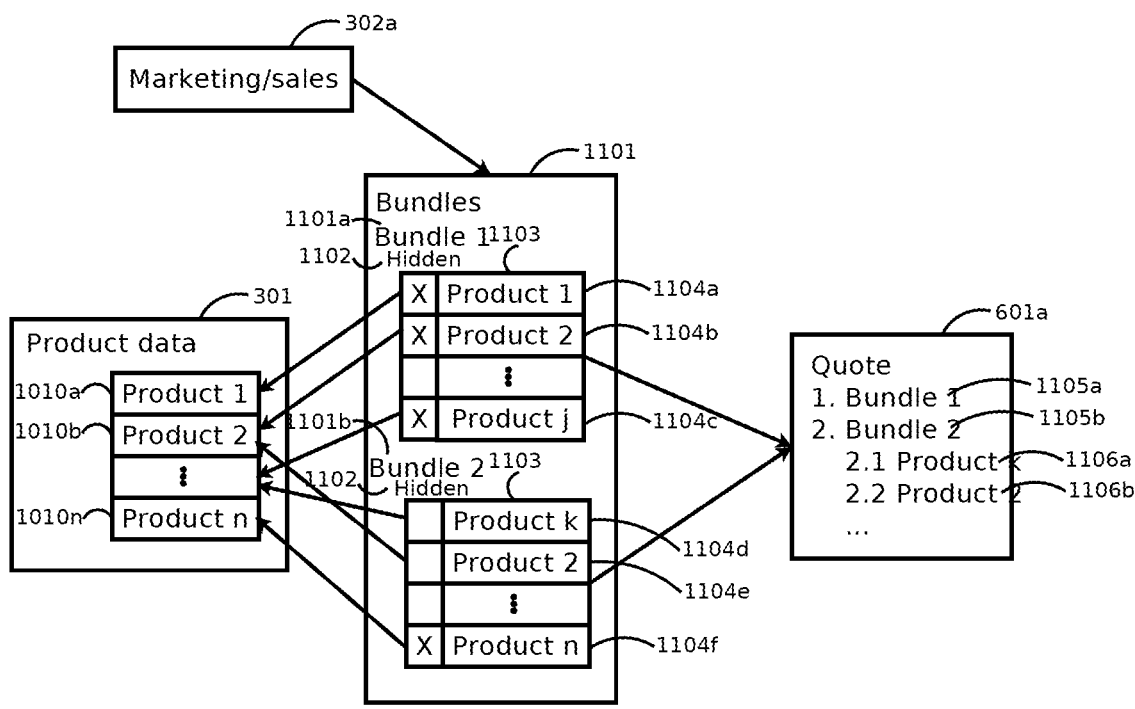
FIG. 11 is an illustrative block diagram of an example embodiment of bundles for product data.

FIG. 11 is an illustrative block diagram of an example embodiment of bundles for product data. When the marketing/sales department 302*a* prepares a quote 601*a* for a customer, it may add to the quote 601*a* a product that is provided by the service provider 201, but is internally divided into a number of components. In one embodiment, the service provider 201 provides a product that is a small business server, but internally the product is made up of the server hardware, the operating system software license, the labor to install and configure the server, and the agreement for maintaining the server. In some embodiments, the resource planning system 204 provides bundles 1101 that are used to manage products that are made up of a number of components. The bundles 1101 can hide details from the customer, simplify the quote to make it more readable, or disguise details of the server hardware to discourage the customer 206 from looking for another source for the hardware.

A list of bundles 1101 is available for generating quotes 601*a*. In one embodiment, bundle 1 1101*a* contains product references to product 1 1104*a* through product j 1104*c*, and bundle 2 1101*b* contains product references to product k 1104*d* through product n 1104*f*, as well as a reference to product 2 1104*e*. Each of the product references 1104 in the bundles 1101 is a pointer to the actual product information 1010 in the product data 301, so that when the product data 301 is updated, the bundles 1101 are automatically updated as well. Each product reference 1104 in a bundle 1101 contains both the product reference itself 1103, and an indicator 1102 as to whether or not the product reference should be hidden. In FIG. 11, all of the product references 1104*a*-1104*c* in bundle 1 1101*a* are hidden, and only the product reference 1104*f* to product n in bundle 2 1101*b* is hidden.

When bundle 1 1101*a* and bundle 2 1101*b* are both added to a quote 601*a*, the quote 601*a* lists one line item 1105*a* for bundle 1, and a line item 1105*b* for bundle 2 that is broken down into line items 1106 for all of the product references 1104 in bundle 2 1101*b* except for product n 1104*f*, which is marked as hidden.

In this way, bundles 1101 allow the service provider 201 to provide its own products that are made up of component products, and also provide the ability to hide the details of those products where it is advantageous for the operation of the business.

In some embodiments, the system can determine to hide one or more details based on a user identifier (e.g., username, biometric information, pin number) associated with a user of the system, such as a customer or other entity using the system. For example, the system may include a list of users that are authorized to view certain data, and compare the user identifier of the user with the list to determine whether the user is authorized to view such data. In some embodiments, the system may prompt the user for a password prior to making the determination. Upon determining that the user is not authorized to view certain data (e.g., price or product details), the system may omit or otherwise censor the data such that the data is effectively hidden from the user. In some embodiments, the user can request access to the hidden data. The system can forward the request to a system manager or operator, who may grant or deny the request.

Figure 12:
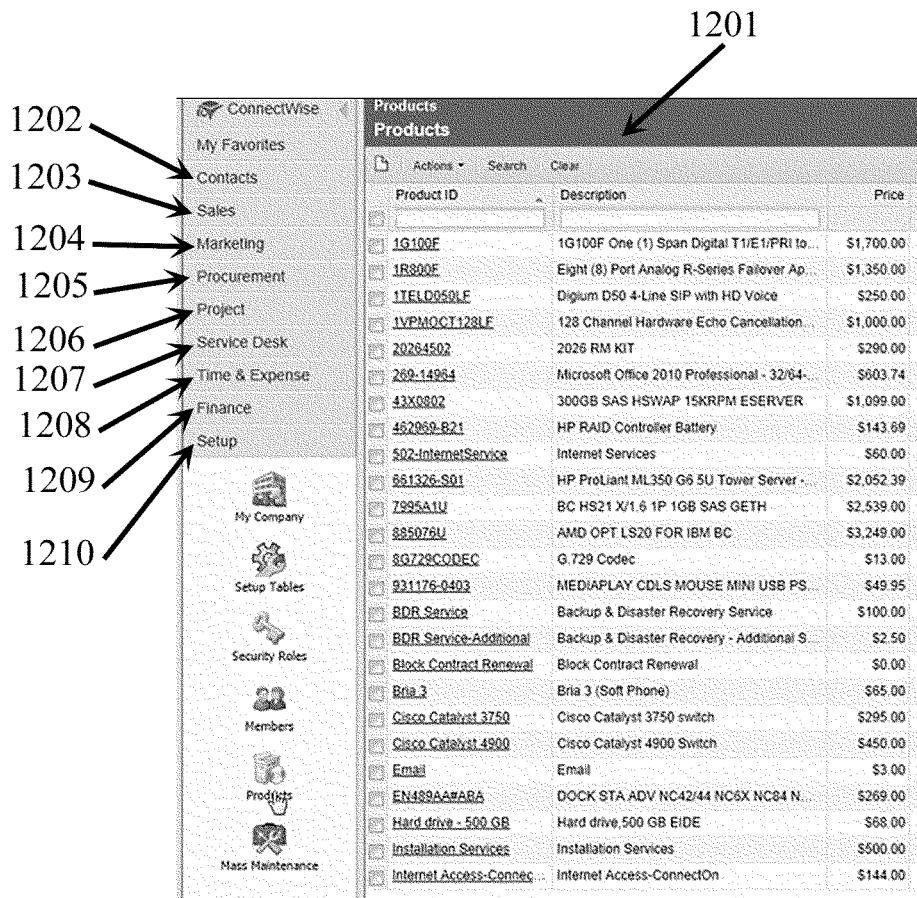
FIG. 12 is an illustrative example of an example embodiment of a user interface for overall access to a resource planning system.

FIG. 12 is an illustrative example of an example embodiment of a user interface for overall access to a resource planning system. The main display 1201 shows a view of the product data 301. The navigation display has tabs to select different main displays for contacts 1202, sales 1203, marketing 1204, procurement 1205, project 1206, service desk 1207, time and expense 1208, finance 1209, and setup 1210.

FIG. 13 is an illustrative example of an example embodiment of a user interface for displaying and modifying product data. The display 1301 shows a list of the product data, with a single line for each product 1302. The columns 1303-1311 display information about each product. Column 1303 displays the product ID. Column 1304 displays the description of the product. Column 1305 displays the price of the product to the customer 206. Column 1306 displays the cost of the product from the vendor 205. Column 1307 displays whether or not the product is taxable. Column 1308 displays the type of the product, column 1309 displays the category of the product. and column 1310 displays the sub-category of the product. Together, the type, category, and sub-category of the product displayed by columns 1308-1310 affect the way the product is treated by the rest of the resource planning system 204. Column 1311 displays the class of the product as described previously with respect to FIG. 5.

Figure 14:
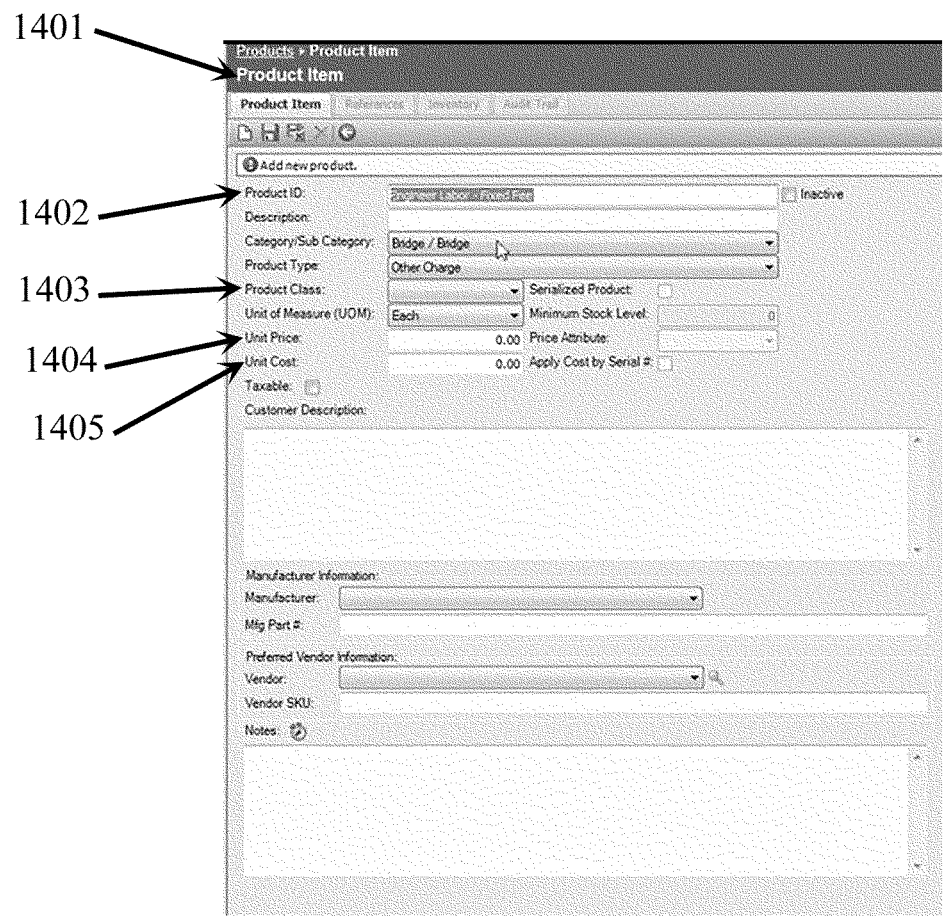
FIG. 14 is an illustrative example of an example embodiment of a user interface for displaying and modifying a single item of product data.

FIG. 14 is an illustrative example of an example embodiment of a user interface for displaying and modifying a single item of product data. The display 1401 is shown by selecting one of the products 1302 in the display 1301 described previously with respect to FIG. 13. Entry 1402 allows the product ID, which is displayed in column 1303 in FIG. 13, to be modified. Entry 1403 allows the product class, which is displayed in column 1311 in FIG. 13, to be modified. Entry 1404 allows the product price, which is displayed in column 1305 in FIG. 13, to be modified. Entry 1405 allows the product cost, which is displayed in column 1306 in FIG. 13, to be modified.

Figure 15:
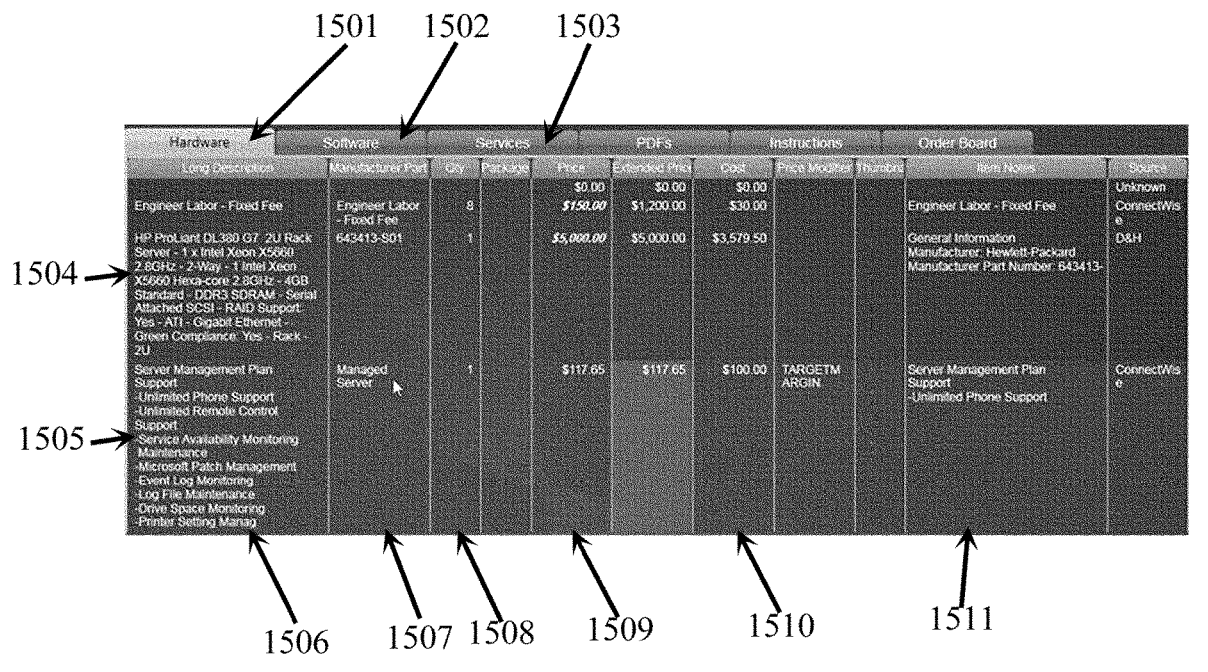

FIG. 15 is an illustrative example of an example embodiment of a user interface for displaying and modifying a quote for a customer. The display has tabs across the top allowing selection of different components of the quote. Tab 1501 selects the hardware component of the quote. Tab 1502 selects the software component of the quote. Tab 1503 selects the services component of the quote. When a product is added to the quote, the product type, product category, product sub-category, and product class displayed in columns 1308-1311 of FIG. 13 determine the component of the quote to which the product belongs. Every product that is added to the quote adds a row to the quote. In one embodiment, the quote has two hardware products, which appear in row 1504 and row 1505 in the hardware section 1501 of the quote. Each row has columns 1506-1511 that describe the product in the row. Column 1506 displays the long description of the product. Column 1507 displays the manufacturer's part number for the product. Column 1508 displays the number of products that are in the quote. Column 1509 displays the unit price of the product, and column 1510 displays the total price for the product in the quote. Column 1511 displays any notes relevant to the product in the quote.

Figure 16:
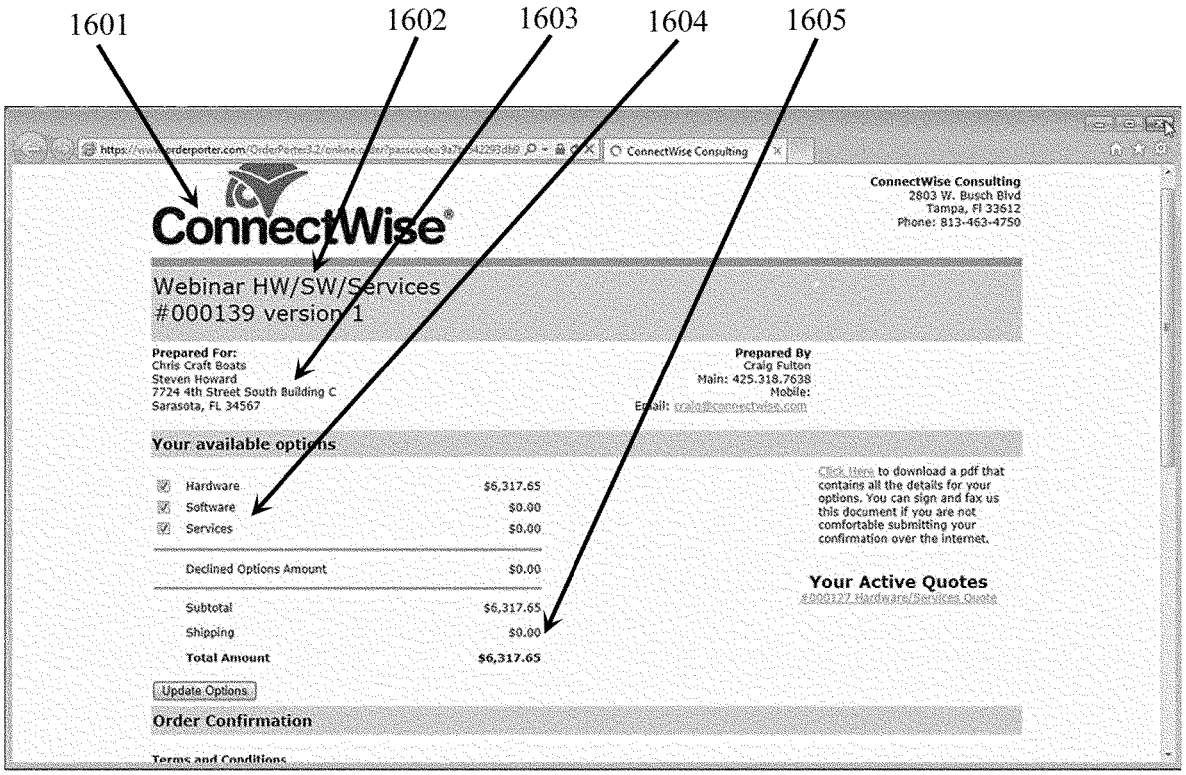
FIG. 16 is an illustrative example of an example embodiment of a quote for a customer.

FIG. 16 is an illustrative example of an example embodiment of a quote for a customer. The quote is customized with the name and logo 1601 of the service provider 201. The quote includes a name and other identifying information 1602. The quote includes the customer information 1603. The quote includes summary totals 1604 of the price being quoted for different classes of products. The quote also includes a total price 1605 for easy reference by the customer 206.

Figure 17:
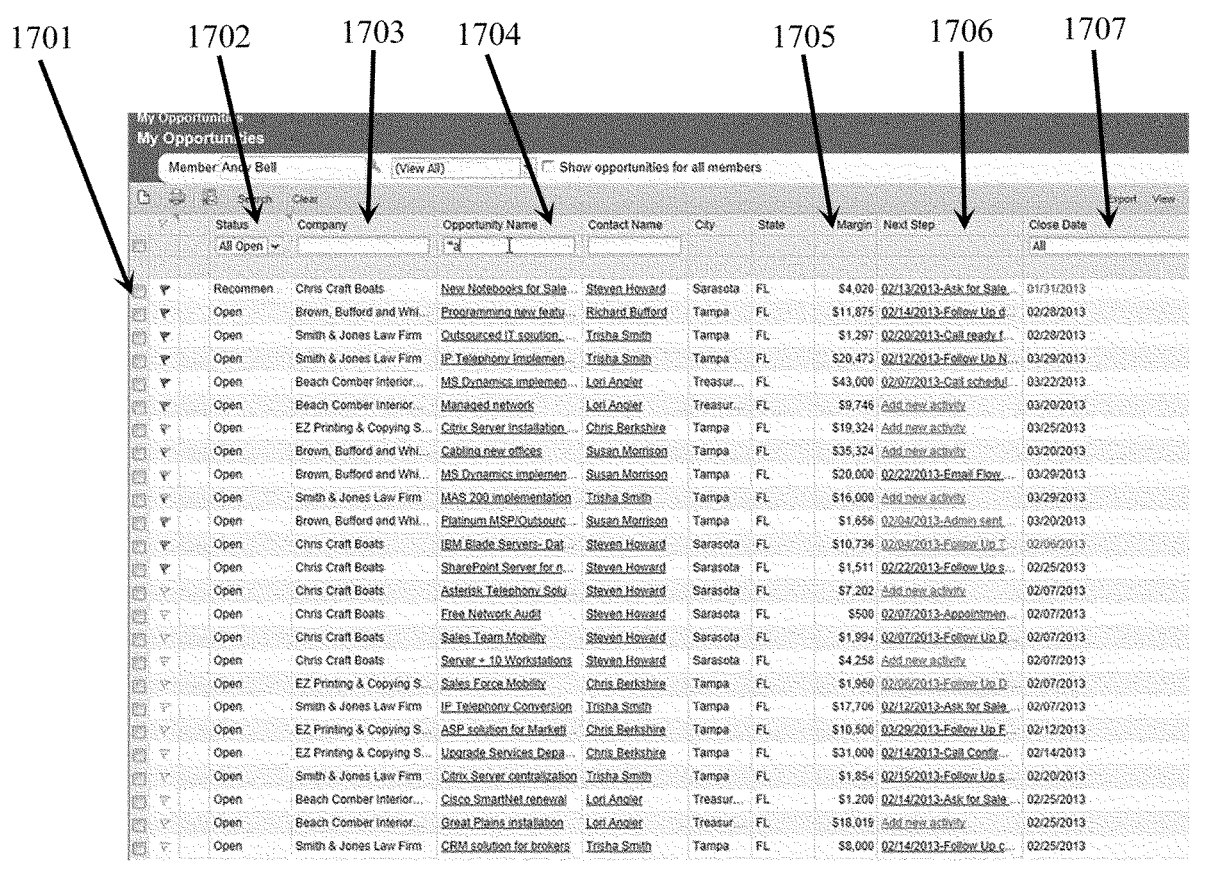

FIG. 17 is an illustrative example of an example embodiment of a user interface for sales management. The display shows all the sales opportunities being pursued, for easy reference by the sales staff. Each sales opportunity is displayed as one row 1701. Each row has multiple columns 1702-1707 that display the data for that sales opportunity. Column 1702 displays the status of the opportunity. Column 1703 displays the company with which the opportunity is being pursued. Column 1704 displays the internal name of the opportunity. Column 1705 displays the margin (profit) that the opportunity would give the service provider 201 if it were closed. Column 1706 displays the next step that is required by the sales staff in order to advance the opportunity. Column 1707 displays the expected closing date for the opportunity, or the actual closing date if the opportunity has been closed.

Figure 18:
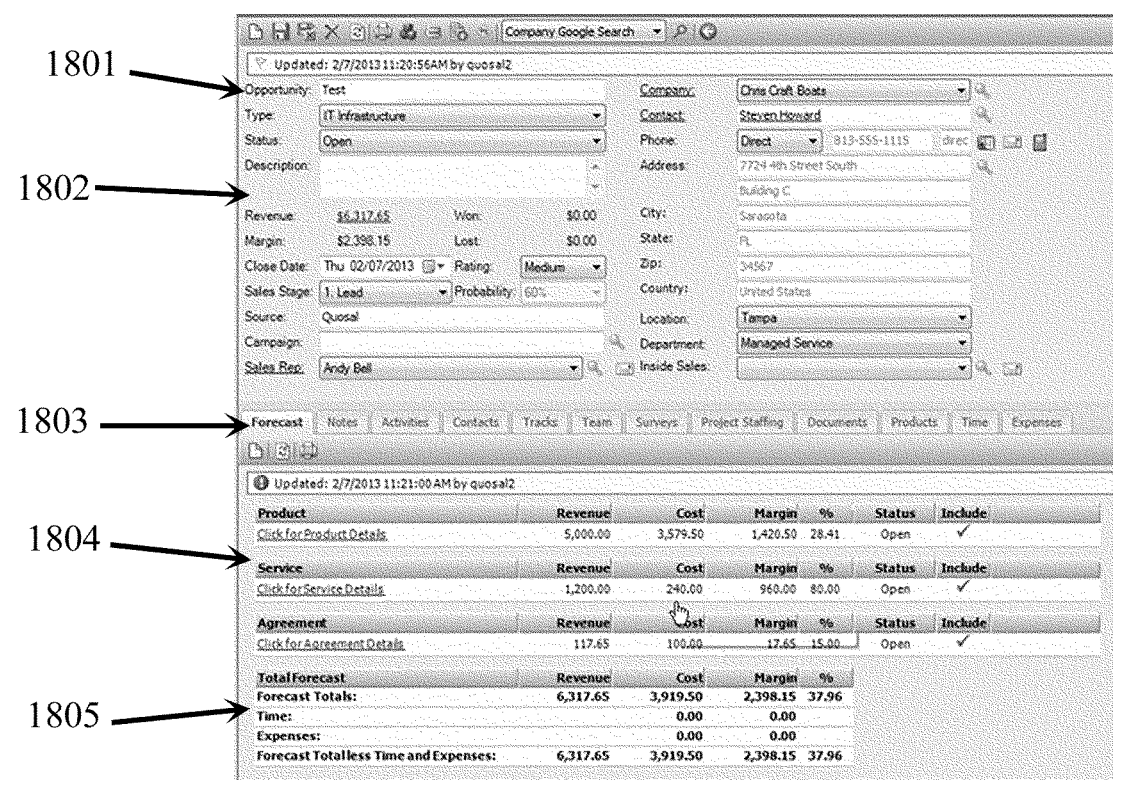

FIG. 18 is an illustrative example of an example embodiment of a user interface for managing a single sales opportunity. The display allows the sales staff to view and edit all the detail information about a single sales opportunity. Entry 1801 allows the internal name of the opportunity, which is displayed in column 1704 in FIG. 17, to be modified. Entry 1802 allows the description of the opportunity to be modified.

The bottom part of the user interface is used to display several different categories of information about the opportunity. A set of tabs 1803 is used to select the category of information being displayed. In the embodiment shown in FIG. 18, the Forecast tab is selected. This shows an area 1804 displaying the breakdown of the financials associated with each product class, and an area 1805 with the total financials for the entire opportunity.

Figure 19:
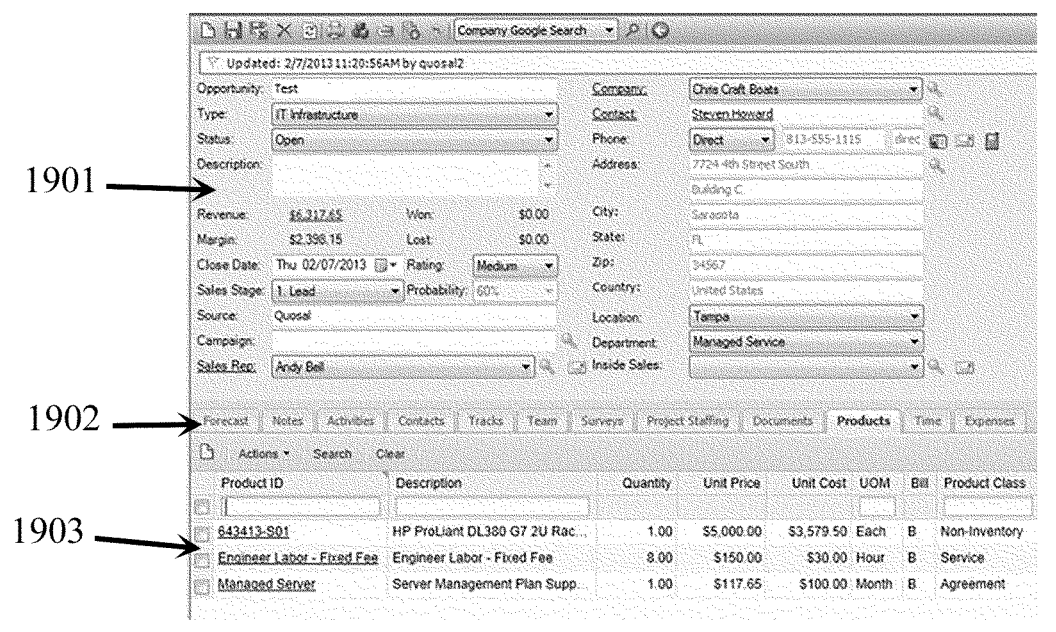

FIG. 19 is an illustrative example of an example embodiment of a user interface for managing the products associated with a single sales opportunity. The top part of the user interface 1901 is the same as previously illustrated with respect to FIG. 18. In the tabs 1902, a different tab is selected for Products. As a result, the bottom part of the user interface 1903 is modified to display the list of products that are associated with the opportunity.

Figure 20:
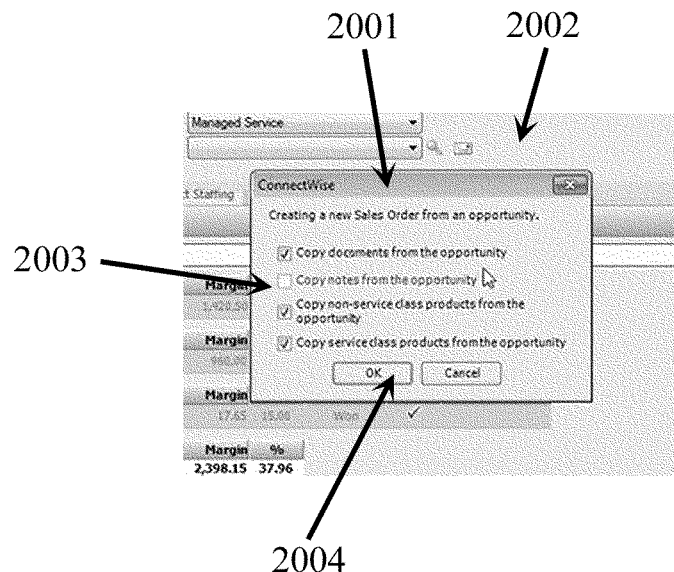
FIG. 20 is an illustrative example of an example embodiment of a user interface for creating a sales order from a sales opportunity that was won.

FIG. 20 is an illustrative example of an example embodiment of a user interface for creating a sales order from a sales opportunity that was won. After the sales opportunity is won, the next step is to deliver the sale from the service provider 201 to the customer 206. Initiating this process creates a dialog box 2001 on top of the existing sales management interface 2002 (shown in part). The dialog box 2001 has a number of options 2003 about what information is copied from the sales opportunity to the sales order. After adjusting these options 2003, clicking on the OK button 2004 creates the sales order.

Figure 21:
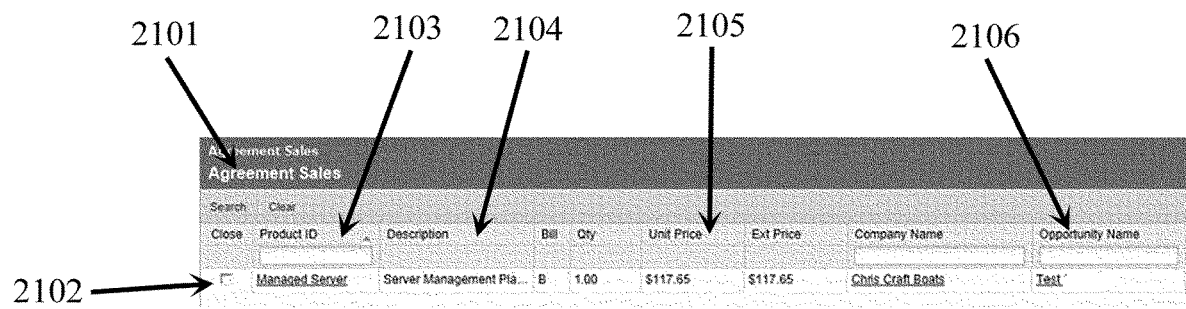
FIG. 21 is an illustrative example of an example embodiment of a user interface for displaying and modifying agreements.

FIG. 21 is an illustrative example of an example embodiment of a user interface for displaying and modifying agreements. The display 2101 shows a list of agreements products, where each row 2102 has information about one agreements product. The columns 2013-2106 display information about each agreements product. Column 2103 displays the product ID. Column 2104 displays the product description. Column 2105 displays the price of the agreements product for the customer 206. Column 2106 displays the internal name of one sales opportunity that uses the product.

Figure 22:
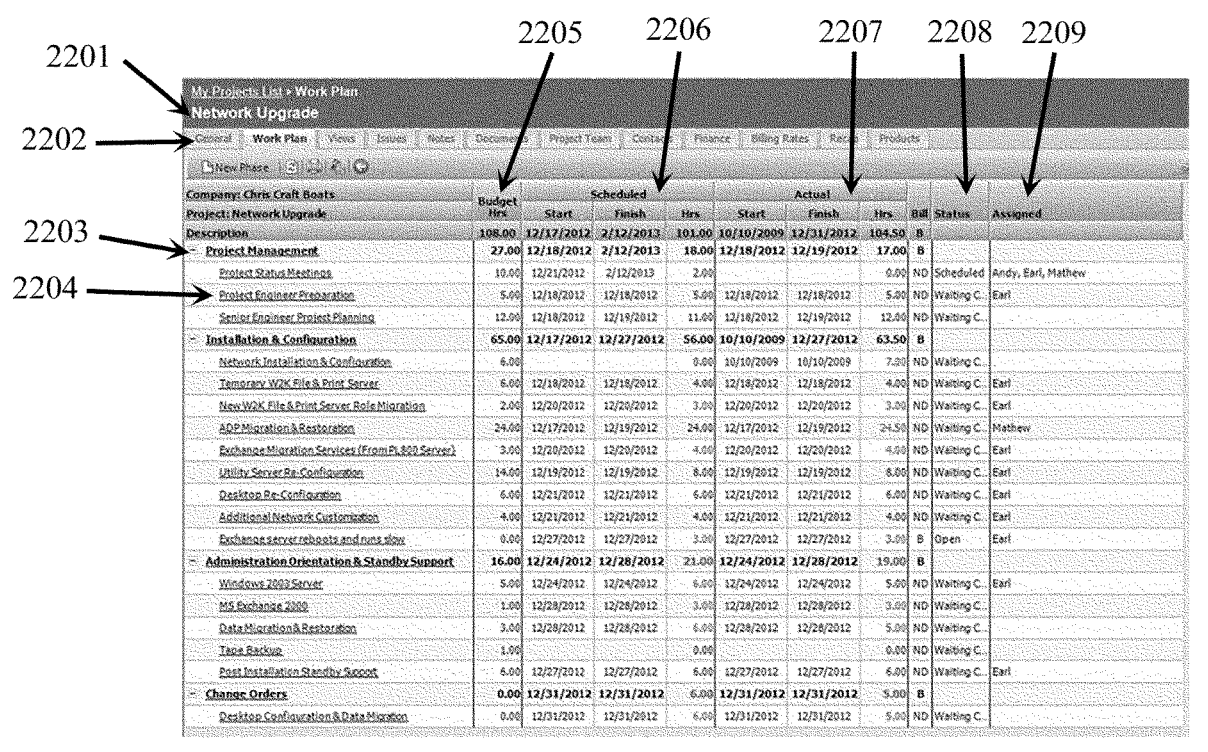

FIG. 22 is an illustrative example of an example embodiment of a user interface for project management. The name of the project 2201 is the label for the display. A set of tabs 2202 selects the information shown in the display. In one embodiment, the Work Plan tab is selected as shown in FIG. 22, and the display shows the groups of tasks 2203 with the individual tasks 2204 indented under the groups 2203. For each task 2204, the columns 2205-2209 display information about the task. Column 2205 displays the hours of time that are budgeted for the task. Column 2206, which comprises a group of columns, displays the details about the task scheduling: when the task is planned, and how much time is planned to finish the task. Column 2207, which is made up of a group of columns, displays the details about the timing of the task as it was actually completed: when the task was started, when the task was finished, and how much time was used to finish the task. Column 2208 displays the current status of the task. Column 2209 displays the staff members who are responsible for completing the task.

Figure 23:
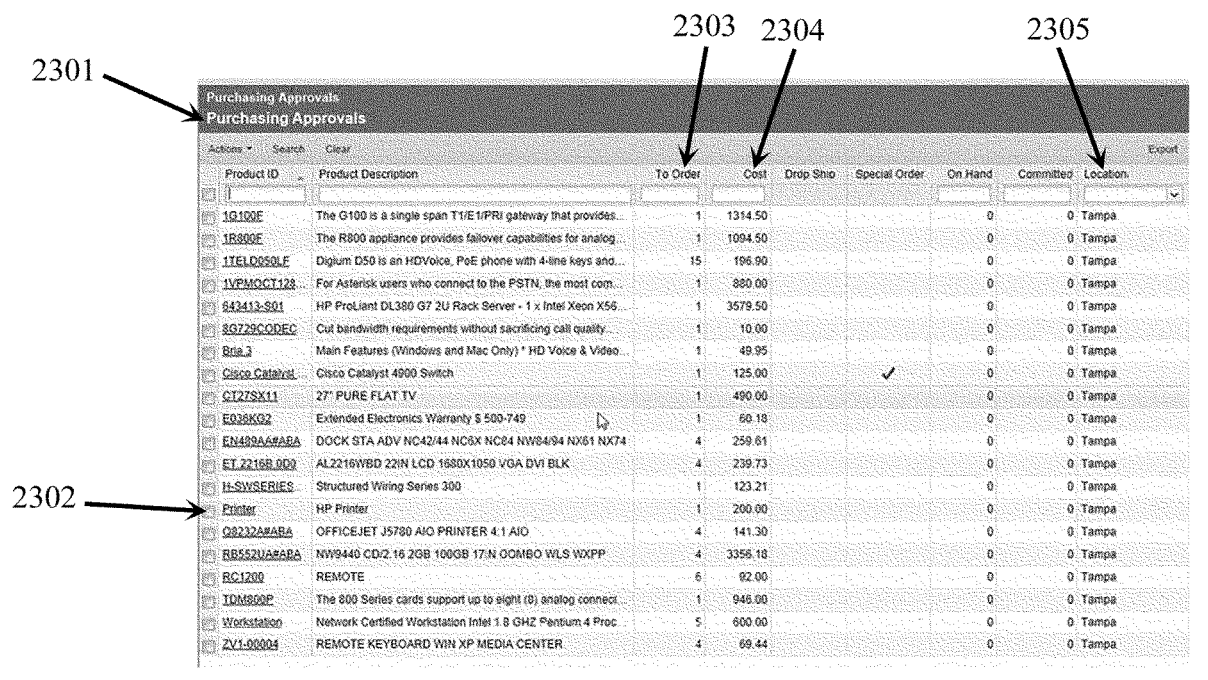

FIG. 23 is an illustrative example of an example embodiment of a user interface for managing procurement. The display header 2301 indicates that the page displays information about purchasing. The display is a list of items that need to be purchased, where each row 2302 is a single item for purchase. The columns 2303-2305 display information about each item for purchase. Column 2303 displays the quantity (number) of items to purchase. Column 2304 displays the cost of the item from the vendor 205. Column 2306 displays the location where the item should be delivered.

Figure 24:
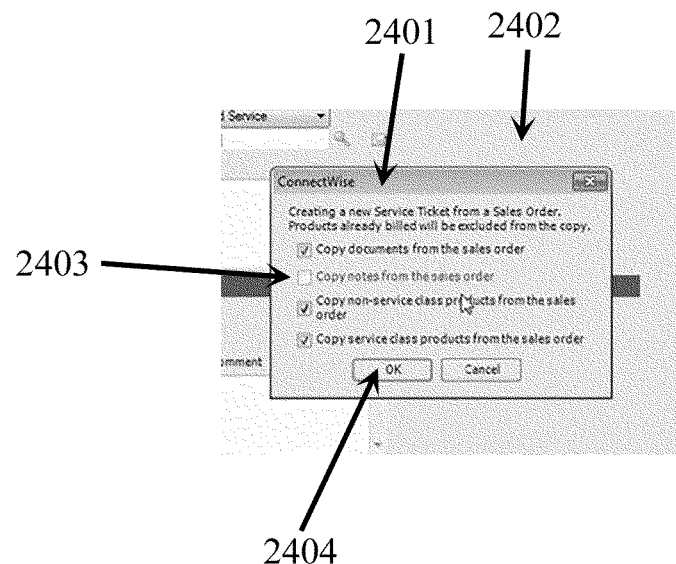
FIG. 24 is an illustrative example of an example embodiment of a user interface for creating a service ticket from a sales order.

FIG. 24 is an illustrative example of an example embodiment of a user interface for creating a service ticket from a sales order. After the sales order has been planned and is ready for execution, the next step is to generate tickets to drive the implementation of the sales order by engineering. Initiating this process creates a dialog box 2401 on top of the existing sales order interface 2402 (shown in part). The dialog box 2401 has a number of options 2403 about what information is copied from the sales order to the service ticket. After adjusting these options 2403, clicking on the OK button 2404 creates the service ticket.

Figure 25:
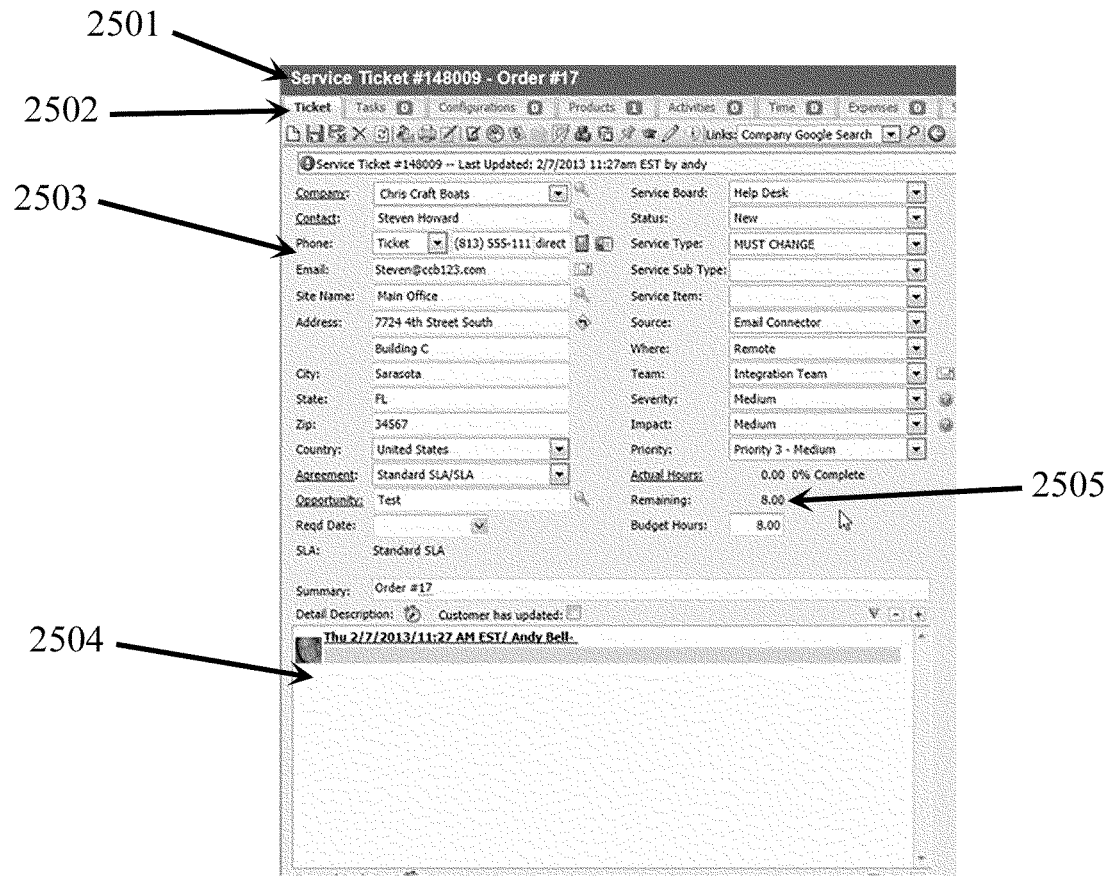
FIG. 25 is an illustrative example of an example embodiment of a user interface for displaying and modifying a service ticket.

FIG. 25 is an illustrative example of an example embodiment of a user interface for displaying and modifying a service ticket. The display header 2501 indicates the name and identifier of the service ticket. A set of tabs 2502 selects the information shown in the display. In one embodiment, the Ticket tab is selected as shown in FIG. 25. As a result, the rest of the display 2503 shows information about the ticket. A large interaction area 2504 allows entry of free-form text describing any aspect of the ticket.

The initial time 2505 budgeted for the service ticket cannot be changed. This is because the value is taken from the product data 301. This makes it clear to the engineer in charge of the ticket what the expected effort is for the ticket, and when to alert management if complications are increasing the amount of labor significantly. In this way, the generation of the service ticket directly from the product data 301 greatly helps to control labor costs and manage overruns.

Figure 26:
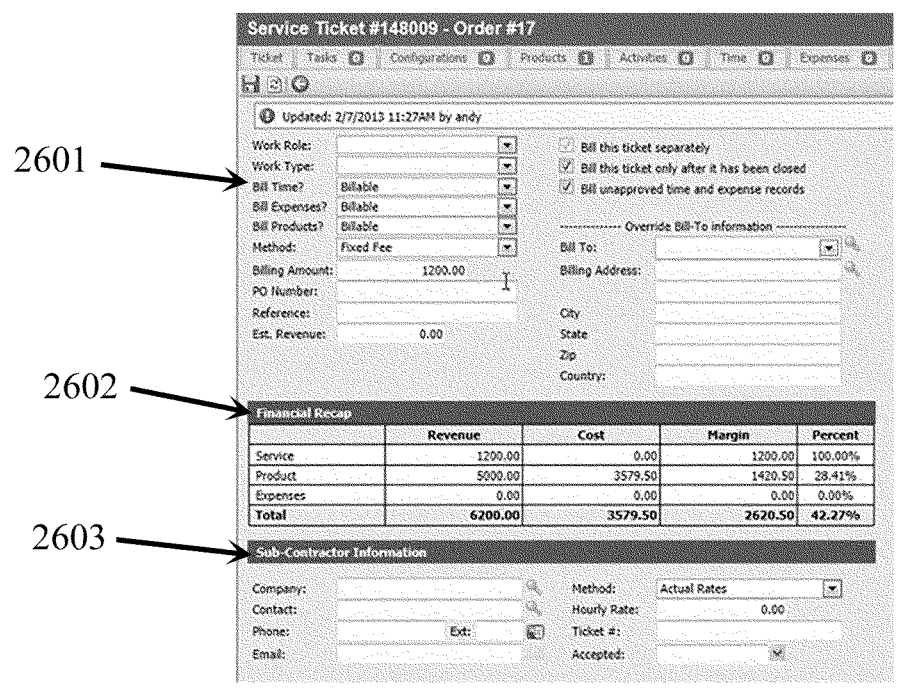

FIG. 26 is an illustrative example of an example embodiment of a user interface for displaying and modifying the financial aspects of a service ticket. The tabs across the top of the interface are used to select the information that is displayed. Section 2601 displays the billing details, including the method used for computing the billing and the information for billing the customer. Section 2602 displays the summary for the customer expenses incurred by the service ticket. Section 2603 displays information about any external contractor used by the service provider 201 in order to complete the ticket.

Figure 27:
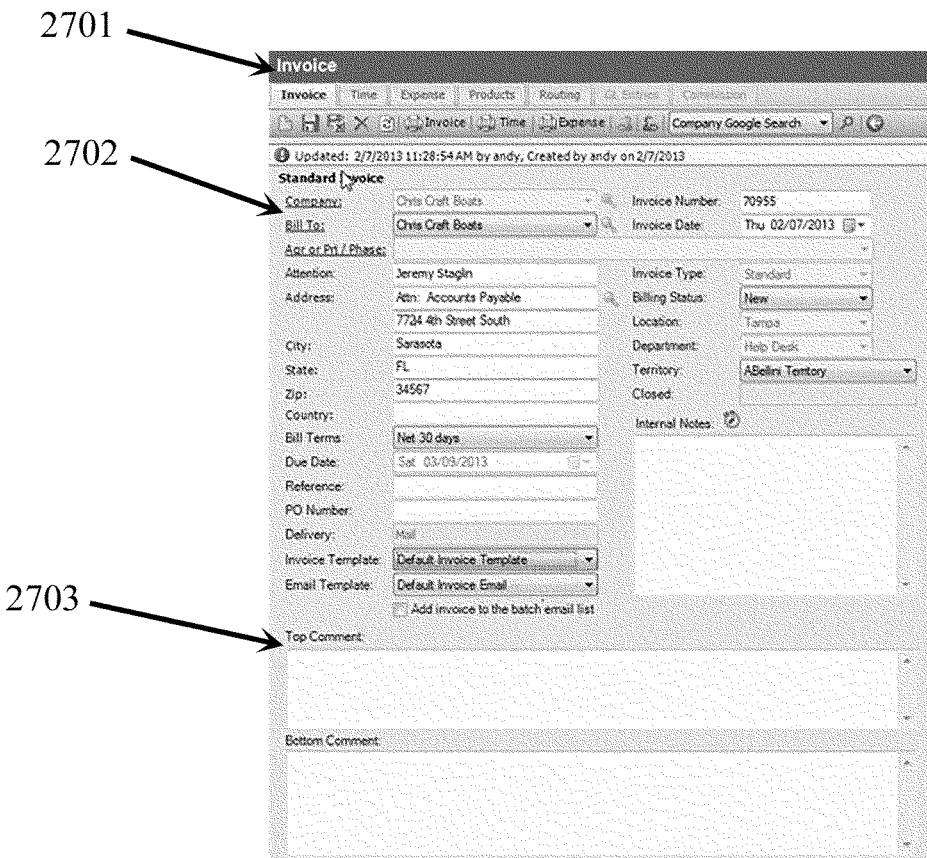
FIG. 27 is an illustrative example of an example embodiment of a user interface for displaying and modifying an invoice for a customer.

FIG. 27 is an illustrative example of an example embodiment of a user interface for displaying and modifying an invoice for a customer. The display header 2701 indicates that the interface is for generating an invoice, and provides a set of tabs for controlling the information that is displayed. In one embodiment, the Invoice tab is selected as shown in FIG. 27, and the bottom area of the interface 2702 provides a viewing and editing capability for all aspects of the invoice that goes to the customer 206. The editing capability includes large text areas 2703 that allow for significant customization of the invoice.

Figure 28:
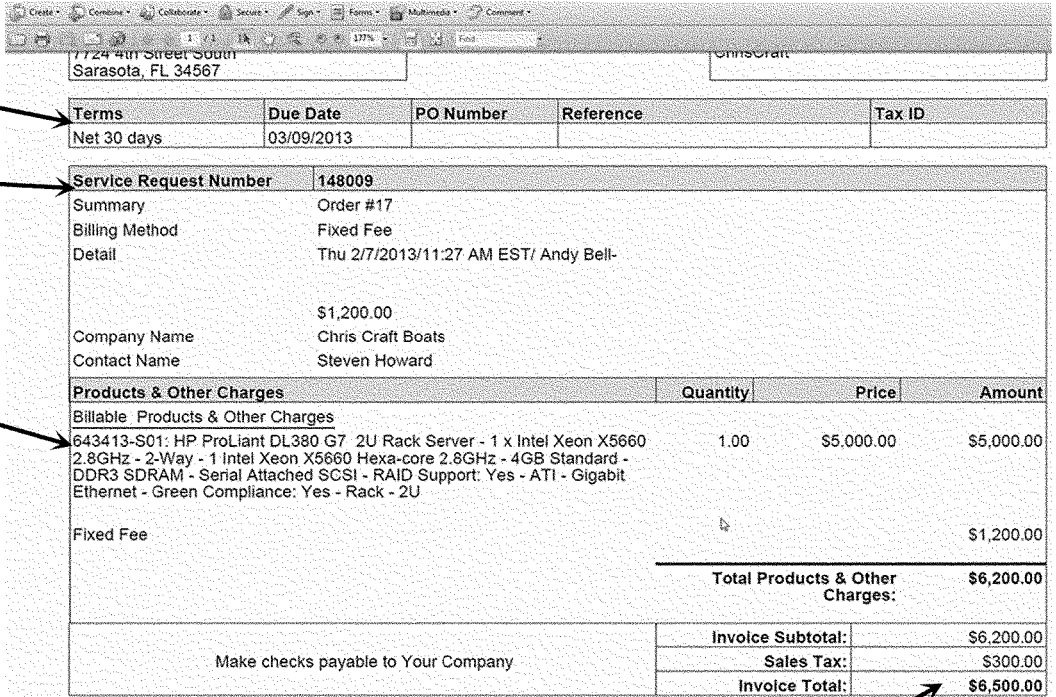
FIG. 28 is an illustrative example of an example embodiment of an invoice for a customer.

FIG. 28 is an illustrative example of an example embodiment of an invoice for a customer. The invoice illustrated in FIG. 28 is generated using the interface previously described with respect to FIG. 27. Section 2801 identifies the invoice and its terms. Section 2802 lists contact information and billing information for both the service provider 201 and the customer 206. Section 2803 displays the detail about the products included in the invoice. Section 2804 summarizes the amount of the invoice for the customer 206.

Figure 29:
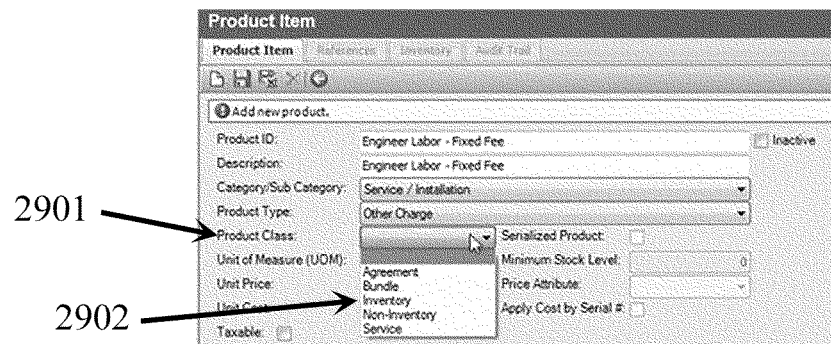
FIG. 29 is an illustrative example of an example embodiment of classes for product data.

FIG. 29 is an illustrative example of an example embodiment of classes for product data. The user interface shown in FIG. 29 is an instance of the user interface previously described with respect to FIG. 14. The item Product Class 2901 is implemented as a pull down 2902. The Agreement item in the pull down 2902 corresponds to agreements products 503 as previously described with respect to FIG. 5. The Bundle item in the pull down 2902 corresponds to bundles 1101 as previously described with respect to FIG. 11. The Inventory item in the pull down 2902 corresponds to inventory parts products 504 as previously described with respect to FIG. 5. The Non-Inventory item in the pull down 2902 corresponds to non-inventory parts products 505 as previously described with respect to FIG. 5. The Service item in the pull down 2902 corresponds to labor products 501 as previously described with respect to FIG. 5.

Figure 30:
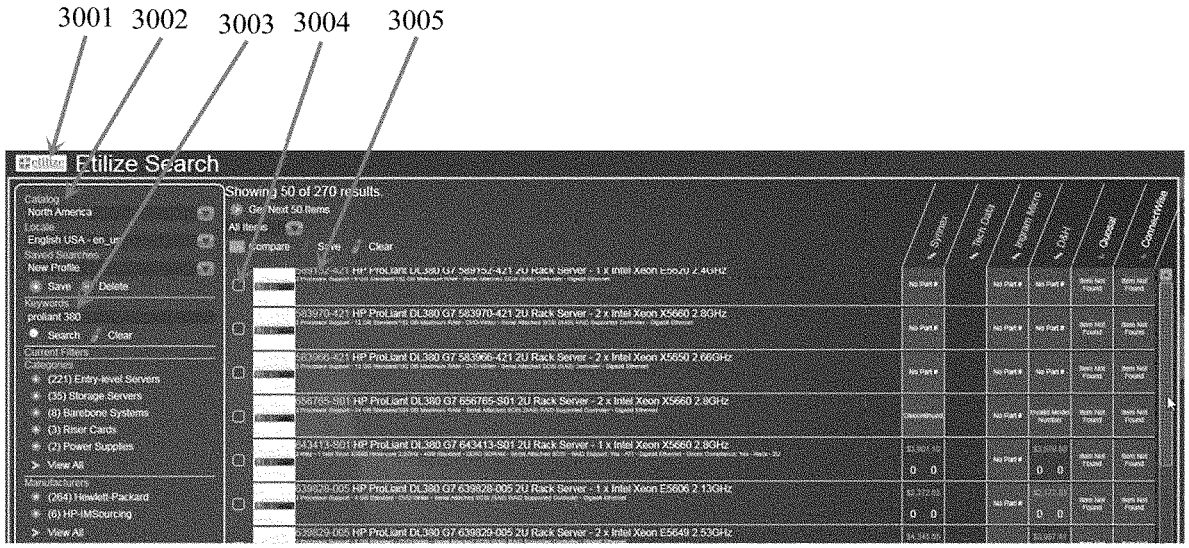
FIG. 30 is an illustrative example of an example embodiment of a user interface for interfacing product data to an external product data source.

FIG. 30 is an illustrative example of an example embodiment of a user interface for interfacing product data to an external product data source. The interface header 3001 displays the name of the external product database. The interface allows the product database to be selected 3002 and searched 3003 using keywords. The results of the search are shown in the right panel of the interface. Once an item is found using its detail information 3005, it can be selected 3004 and imported into the product data 301.

Figure 31:
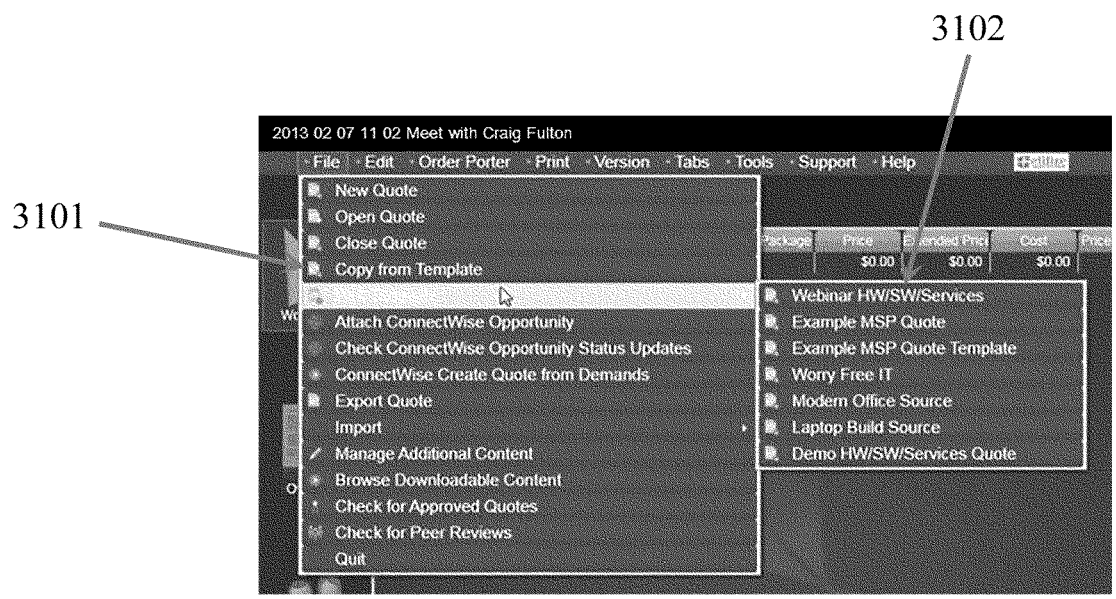
FIG. 31 is an illustrative example of an example embodiment of a user interface for selecting a product template.

FIG. 31 is an illustrative example of an example embodiment of a user interface for selecting a product template. To create a new quote, one of the menu options 3101 is to copy the quote from a template. Hovering over this menu option 3101 displays a list 3102 of the available quote templates. The desired template can then be selected and used.

Figure 32:
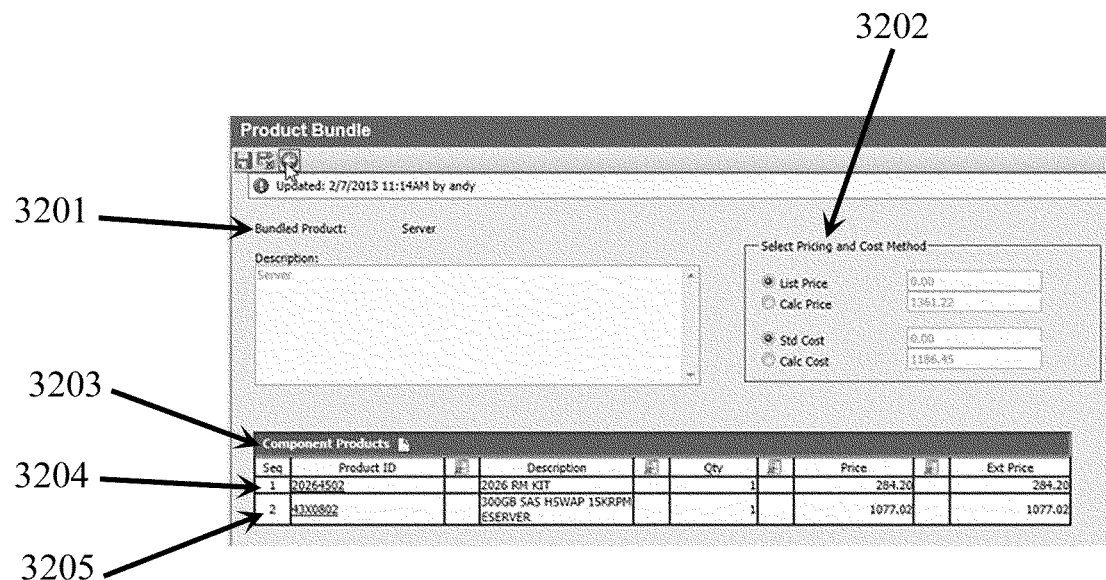
FIG. 32 is an illustrative example of an example embodiment of a user interface for displaying and modifying a product bundle.

FIG. 32 is an illustrative example of an example embodiment of a user interface for displaying and modifying a product bundle. The display indicates the name 3201 of the bundle. Section 3202 of the user interface allows editing of the pricing options for the bundle. Section 3203 of the user interface lists the products that are included in the bundle. In one embodiment, the bundle contains two products 3204 and 3205 as shown in FIG. 32.

Figure 33:
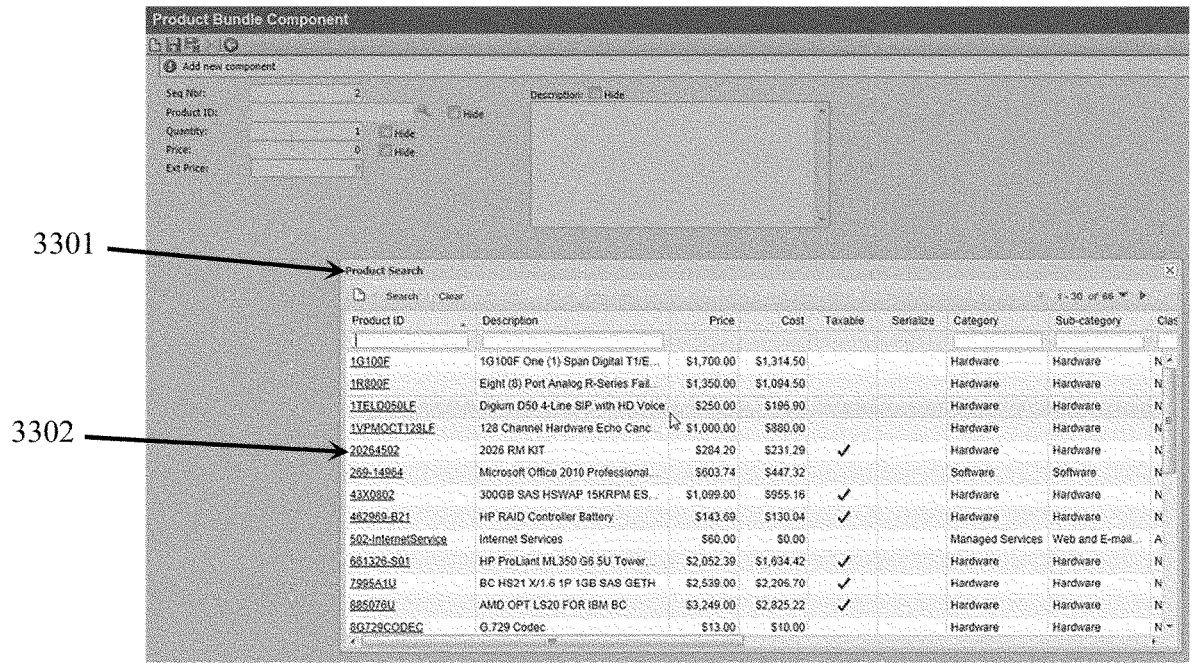
FIG. 33 is an illustrative example of an example embodiment of a user interface for selecting products to include in a product bundle.

FIG. 33 is an illustrative example of an example embodiment of a user interface for selecting products to include in a product bundle. When adding a product to a bundle, the bundle user interface as previously described with respect to FIG. 32 remains in the background, and a product list 3301 is displayed on top of it. Selecting a product 3302 from the list adds it to the bundle being edited.

Figure 34:
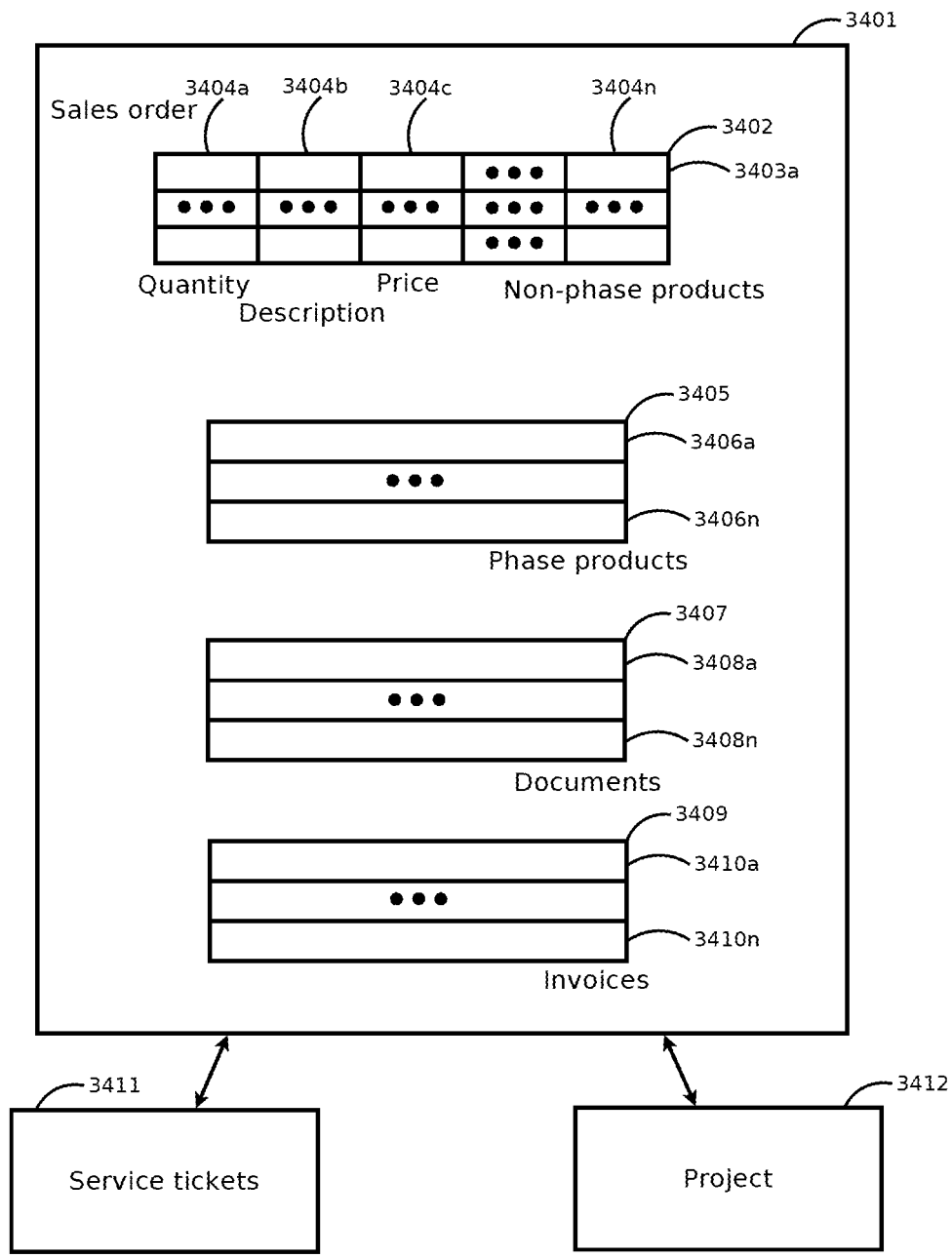
FIG. 34 is an illustrative block diagram of an example embodiment of a sales order.

FIG. 34 is an illustrative block diagram of an example embodiment of a sales order. A sales order 3401 can contain non-phase products 3402, phase products 3405, documents 3407, and invoices 3409. Each non-phase product 3403a-3403n in the list 3402 can include a quantity 3404a, a description 3404b, a price 3404c, and other similar information 3404n. Each phase product 3406a-3406n in the list 3405 can be a product as described for products 108a-108b as described with respect to FIG. 1. Each document 3408a-3408n in the list 3407 can be supporting documentation related to the sale associated with the sales order 3401. Each invoice 3410a-3410n in the list 3409 can be an invoice that was sent to the customer for payment of the sale associated with the sales order 3401. Continuing the example described with respect to FIG. 1, the sales order 3401 may be associated with the sale of an upgrade to an email system at a customer site. A non-phase product 3403a may be a license from the email service provider for additional email addresses, which may require no installation or configuration at the customer site, and may include a quantity 3404a of 10 email addresses, a description 3404b of "Additional email addresses", and a price 3404c of $10 per year. A phase product 3406a may be the preparatory work needed before the upgrade to the email system, as described previously with respect to FIG. 1. A document 3408a may be the new user manual for the upgraded email system. An invoice 3410a may be for an initial down payment required from the customer before work commences. The sales order 3401 can be converted to service tickets 3411, and can also be converted to a project 3412.

In some embodiments, the sales order 3401 in FIG. 34 can include components or functionality of the sales order 107 as described with respect to FIG. 1. In some embodiments, the phase products 3406a-3406n in FIG. 34 can include components or functionality of the products 108a-108b as described with respect to FIG. 1.

Figure 35:
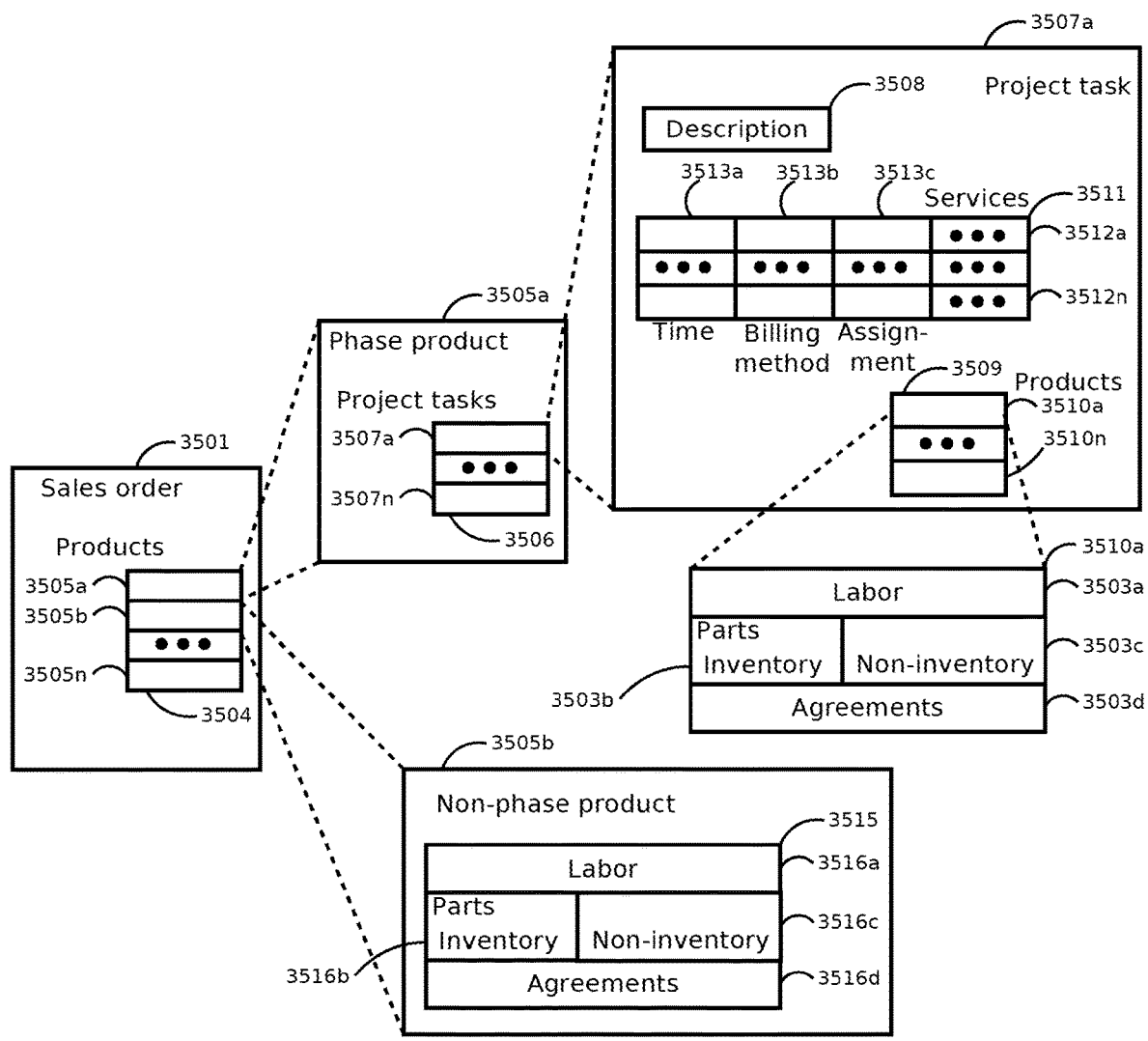
FIG. 35 is an illustrative block diagram of an example embodiment of products in a sales order.

FIG. 35 is an illustrative block diagram of an example embodiment of products in a sales order. A sales order 3501 can contain a list 3504 of products 3505a-3505n. A product 3505a can be a phase product, which can include a list 3506 of project tasks 3507a-3507n. A single project task 3507a can include a description 3508, a list 3509 of products 3510a-3510n, and a list 3511 of services 3512a-3512n. A product 3510a can include a labor product 3503a, a parts product, which can either be inventory 3503b or non-inventory 3503c, and an agreements product 3503d. A services product 3512a-3512n can include an estimated time 3513a, a billing method 3513b, a resource assignment 3515c, and so on. A product 3505b can be a non-phase product, which can include a product 3515. The product 3515 can include a labor product 3503a, a parts product, which can either be inventory 3503b or non-inventory 3503c, and an agreements product 3503d. Continuing the example described with respect to FIG. 1, the sales order 3501 may be associated with the sale of an upgrade to an email system at a customer site. A phase product 3505a may be the preparatory work needed before the upgrade to the email system. The description 3508 may be "Pre-upgrade prep". A product 3510a may be a license renewal from the database vendor to allow the customer to continue to use the database system to support the email system, may require no installation or configuration at the customer site, may include a non-inventory parts product 3503c that is the software license, and may include no labor product 3503a, inventory parts product 3503b, or agreements product 3503d. A service product 3512a may be the installation of an upgrade to the operating system of the device running the email server that is required in order to upgrade the email server, and may contain a time 3513*a* of 2 hours, a billing method 3513*b* of "flat fee", a resource assignment 3513*c* of "on-site technician", and so on. A non-phase product 3505*b* may be a license renewal 3515 for a backup system from the backup vendor to allow the customer to continue to back up the email system to prevent data loss, may require no installation or configuration at the customer site, may include a non-inventory parts product 3516*c* that is the software license, and may include no labor product 3516*a*, inventory parts product 3516*b*, or agreements product 3516*d*.

In some embodiments, the sales order 3501 in FIG. 35 can include components or functionality of the sales order 107 as described with respect to FIG. 1. In some embodiments, the phase products 3505*a*-3505*n* in FIG. 35 can include components or functionality of the products 108*a*-108*b* as described with respect to FIG. 1. In some embodiments, the project tasks 3507*a*-3507*n* in FIG. 35 can include components or functionality of the project tasks 109*a*-109*c* as described with respect to FIG. 1. In some embodiments, the product 3515 in FIG. 35 can include components or functionality of the product data 301 as described with respect to FIG. 3. In some embodiments, the labor product 3516*a* in FIG. 35 can include components or functionality of the labor product 501 as described with respect to FIG. 5. In some embodiments, the inventory parts product 3516*b* in FIG. 35 can include components or functionality of the inventory parts product 504 as described with respect to FIG. 5. In some embodiments, the non-inventory parts product 3516*c* in FIG. 35 can include components or functionality of the non-inventory parts product 505 as described with respect to FIG. 5. In some embodiments, the agreements product 3516*d* in FIG. 35 can include components or functionality of the agreements product 503 as described with respect to FIG. 5.

Figure 36:
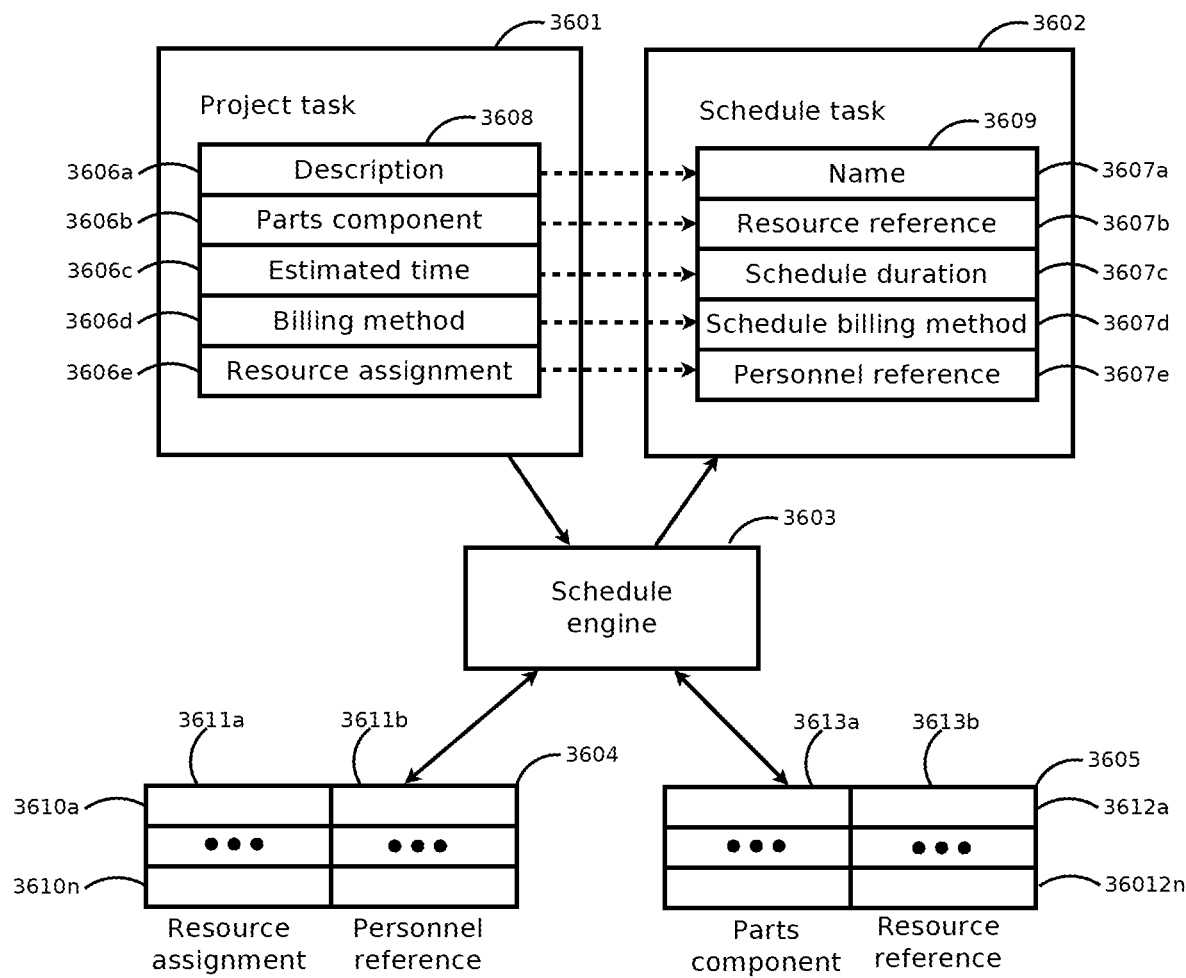
FIG. 36 is an illustrative block diagram of an example embodiment of converting a project task to a schedule task.

FIG. 36 is an illustrative block diagram of an example embodiment of converting a project task to a schedule task. A project task 3601 can include a list 3608 of information including a description 3606*a*, a parts component 3606*b*, an estimated time 3606*c*, a billing method 3606*d*, a resource assignment 3606*e*, and so on. The schedule engine 3603 can create a schedule task 3602 with a list 3609 of information including a name 3607*a*, a resource reference 3607*b*, a schedule duration 3607*c*, a schedule billing method 3607*d*, and a personnel reference 3607*e*. The schedule engine can populate the name 3607*a* with the description 3606*a*, the schedule duration 3607*c* with the estimated time 3606*c*, and the schedule billing method 3607*d* with the billing method 3606*d*. The schedule engine 3603 can access a table 3605 that can provide an association between parts components 3613*a* and resource references 3613*b*, with each entry 3612*a*-3612*n* in the table 3605 representing an association between one parts component 3613*a* and one resource reference 3613*b*. The schedule engine 3603 can use the table 3605 to populate the resource reference 3607*b* with one or more entries based on the parts component 3606*b*. The schedule engine 3603 can access a table 3604 that can provide an association between resource assignments 3611*a* and personnel references 3611*b*, with each entry 3610*a*-3610*n* in the table 3604 representing an association between one resource assignment 3611*a* and one personnel reference 3611*b*. The schedule engine 3603 can use the table 3604 to populate the personnel reference 3607*e* with one or more entries based on the resource assignment 3606*e*. Continuing the example described with respect to FIG. 1, the project task 3601 may represent the installation of an upgrade to an email system at a customer site. The description 3606*a* may be "Install email system upgrade". The parts component 3606*b* may represent the email system software from the vendor. The estimated time 3606*c* may be 2 hours. The billing method 3606*d* may be "hourly time and materials". The resource assignment 3606*e* may be "on-site technician". The schedule engine 3603 may create a schedule task 3602 with information 3609, populate the name 3607*a* with "Install email system upgrade", populate the schedule duration 3607*c* with 2 hours, and populate the schedule billing method 3607*d* with "hourly time and materials". The schedule engine 3603 may use the table 3605 to discover that the email system software can be delivered in several different forms, and may use additional information (not depicted in FIG. 36) to determine which form of the email system software to use in order to populate the resource reference 3607*b*. In an illustrative example, the email system software may be packaged differently depending on the size of the company, and the schedule engine 3603 may use the number of employees at the company to select the proper form. The schedule engine 3603 may use the table 3604 to discover that several different on-site technicians may be available to perform the upgrade at the customer site, and may use additional information (not depicted in FIG. 36) to determine which technicians to use in order to populate the personnel reference 3607*e*. In an illustrative example, Alice and Bill may both be available to perform the upgrade, but Alice may work at an office that is closer to the customer site, so the schedule engine may populate the personnel reference 3607*e* with Alice.

In some embodiments, the project task 3601 in FIG. 36 can include components or functionality of the project tasks 109*a*-109*c* as described with respect to FIG. 1. In some embodiments, the parts component 3606*b* in FIG. 36 can include components or functionality of the product data 301 as described with respect to FIG. 3. In some embodiments, the schedule task 3602 in FIG. 36 can include components or functionality of the schedule tasks 114*a*-114*c* as described with respect to FIG. 1. In some embodiments, the schedule engine 3603 in FIG. 36 can include components or functionality of the schedule engine 103 as described with respect to FIG. 1.

Figure 37:
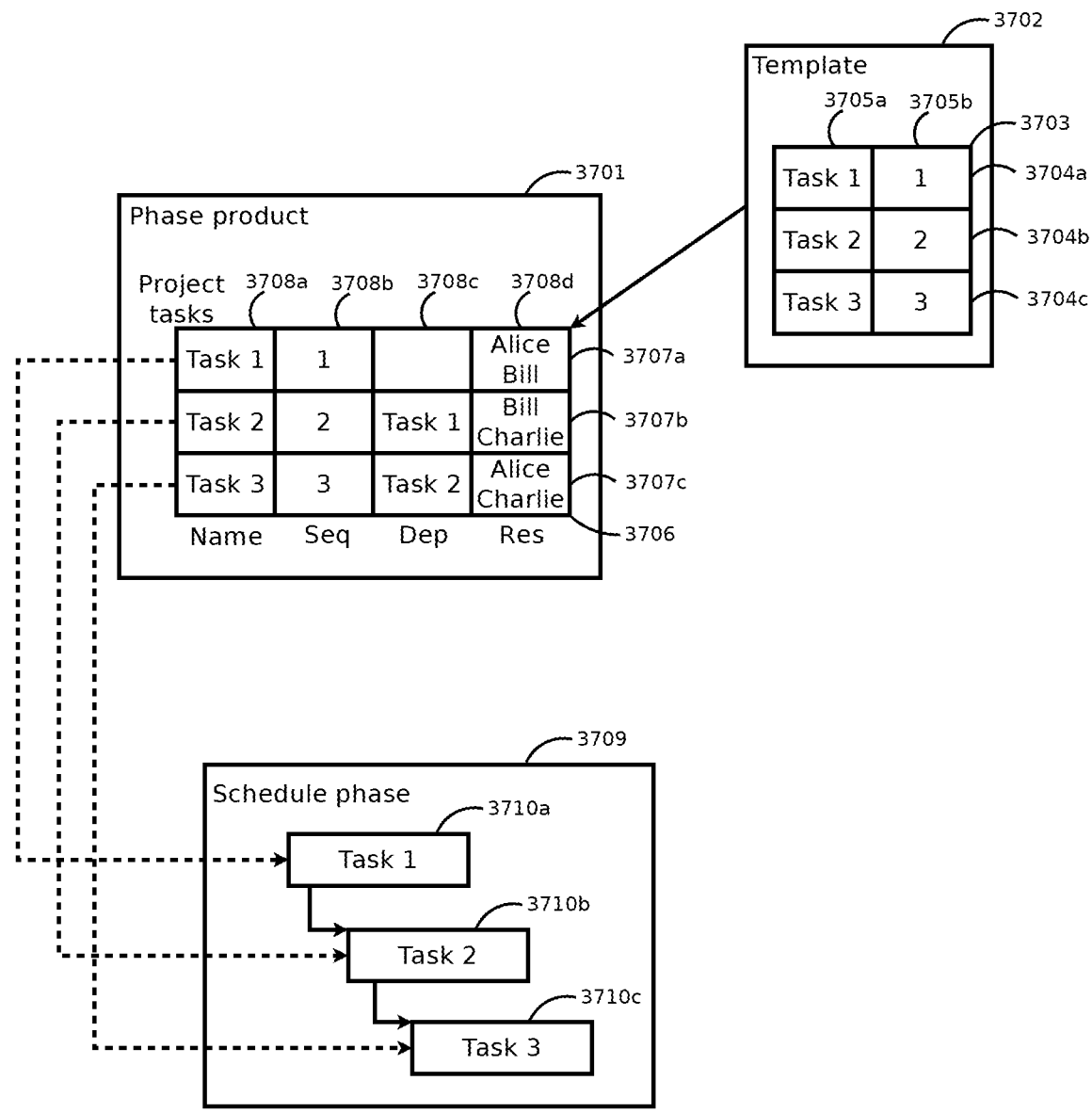
FIG. 37 is an illustrative block diagram of an example embodiment of determining an order of performance between schedule tasks.

FIG. 37 is an illustrative block diagram of an example embodiment of determining an order of performance between schedule tasks. A phase product 3701 can include a list 3706 of project tasks 3707*a*-3707*c*. Each project task 3707*a*-3707*c* can include an identifier 3708*a*, a sequence 3708*b*, dependencies 3708*c*, and resources 3708*d*. A template 3702 may be used to initially populate the phase product 3701, and the template 3702 can include a list 3703 of template tasks 3704*a*-3704*c*. Each task 3704*a*-3704*c* can include an identifier 3705*a* and a sequence 3705*b*. The identifier 3705*a* and sequence 3705*b* in the template tasks 3704*a*-3704*c* can be used to initialize the identifier 3708*a* and sequence 3708*b* in the project tasks 3707*a*-3707*c*. The project tasks 3707*a*-3707*c* can be converted into schedule tasks 3710*a*-3710*c* in a schedule phase 3709. The schedule tasks 3710*a*-3710*c* can have an order of performance assigned to them. In the example depicted in FIG. 37, the order of performance is task 1 3710*a*, followed by task 2 3710*b*, followed by task 3 3710*c*, as indicated by the one-way arrows pointing from task 1 3710*a* to task 2 3710*b*, and from task 2 3710*b* to task 3 3710*c*. The order of performance may be assigned based on the sequence 3708*b* in the project tasks 3707*a*-3707*c*. In the example depicted in FIG. 37, the sequence of project task 1 3701*a* is 1, the sequence of project task 2 3701*b* is 2, and the sequence of project task 3 3701c is 3, so the schedule tasks 3710a-3710c are ordered as task 1 3710a, followed by task 2 3710b, followed by task 3 3710c. The sequence 3708b for the project tasks 3707a-3707c may be assigned manually through a user interface (not depicted in FIG. 37), or it may be assigned from the template 3702 as previously described. The order of performance may be assigned based on the dependencies 3708c in the project tasks 3707a-3707c, in such a way to ensure that a task is completed before any tasks depending on it are started. In the example depicted in FIG. 37, project task 1 3701a has no dependencies, project task 2 3701b depends on project task 1 3701a, and project task 3 3701c depends on project task 2 3701b, so the schedule tasks 3710a-3710c are ordered as schedule task 1 3710a, followed by schedule task 2 3710b, followed by schedule task 3 3710c. In this way, every schedule task 3710a-3710c is not started until the schedule tasks 3710a-3710c upon which it depends are completed. The order of performance may be assigned based on the resources 3708d in the project tasks 3707a-3707c, in such a way to ensure that no two tasks requiring the same resource are performed at the same time. In the example depicted in FIG. 37, project task 1 3701a requires resources Alice and Bill, project task 2 3701b requires resources Bill and Charlie, and project task 3 3701c requires Alice and Charlie, so the schedule tasks 3710a-3710c are ordered in such a way that none of them are scheduled at the same time. One such ordering is the ordering depicted in FIG. 37, in which schedule task 1 3710a is followed by schedule task 2 3710b, which is followed by schedule task 3 3710c. The order of performance may be assigned using a default sequence chosen by the scheduling engine (not depicted in FIG. 37). In an illustrative example, the order of performance may be determined using the order of the project tasks 3707a-3707c in the list 3706, resulting in the ordering depicted in FIG. 37, where schedule task 1 3710a is followed by schedule task 2 3710b, which is followed by schedule task 3 3710c.

In some embodiments, the phase product 3701 in FIG. 37 can include components or functionality of the phase products 108a-108b as described with respect to FIG. 1. In some embodiments, the product tasks 3707a-3707c in FIG. 37 can include components or functionality of the project tasks 109a-109c as described with respect to FIG. 1. In some embodiments, the schedule phase 3709 in FIG. 37 can include components or functionality of the schedule phases 113a-113b as described with respect to FIG. 1. In some embodiments, the schedule tasks 3710a-3710c in FIG. 37 can include components or functionality of the schedule tasks 114a-114c as described with respect to FIG. 1.

Figure 38A:
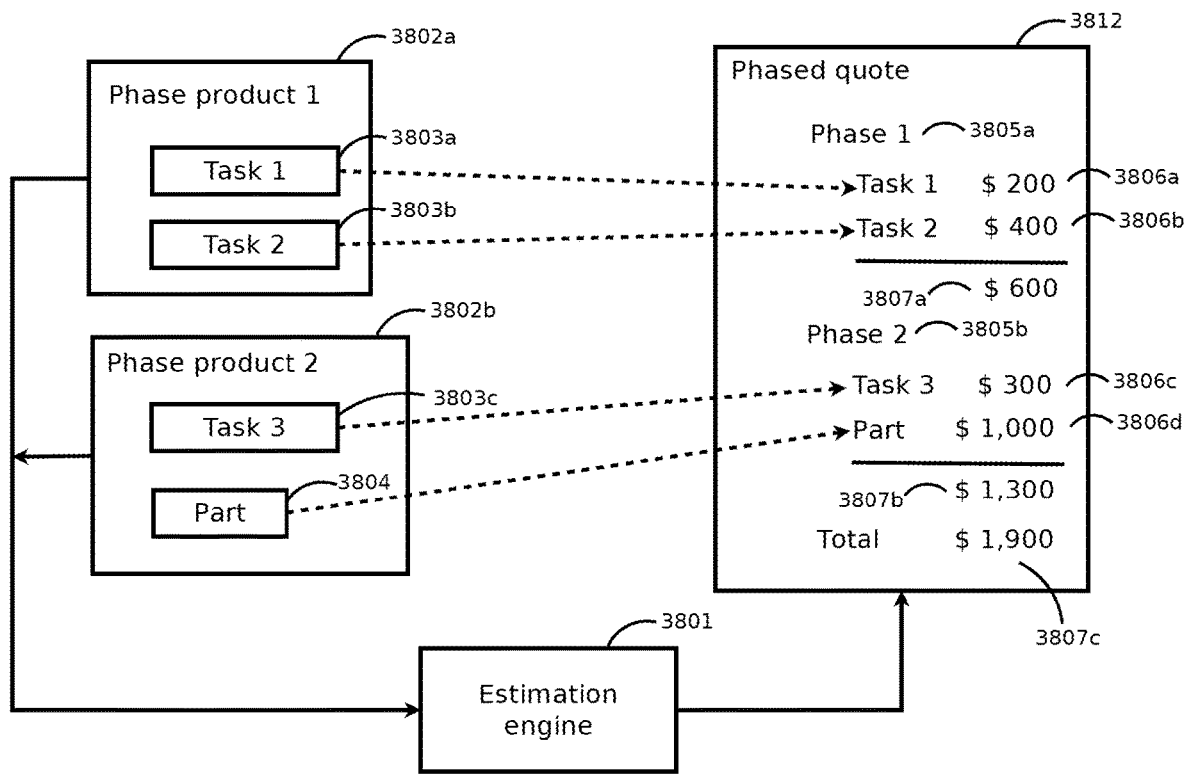
FIG. 38A is an illustrative block diagram of an example embodiment of generating a quote from phase products.

FIG. 38A is an illustrative block diagram of an example embodiment of generating a quote from phase products. A phase product 3802a can contain product tasks 3803a-3803b, and a phase product 3802b can contain product task 3803c and product 3804. An estimation engine 3801 can create a phased quote 3812 with a phase 3805a corresponding to phase product 3802a and a phase 3805b corresponding to phase product 3802b. The phased quote 3812 can have a column 3808a identifying an item and a column 3808b indicating the sale price of the item, phase labels 3805a-3805b, phase totals 3807a-3807b, and an overall total 3807c. The estimation engine 3801 can generate the itemization 3806a-3806b from the product tasks 3803a-3803b. In the example depicted in FIG. 38A, the estimation engine 3801 has calculated the sale price of performing product task 3803a to be $200, and has used $200 for the sale price 3808b for item 3806a. Similarly, the estimation engine 3801 has calculated the sale price of performing product task 3803b to be $400, and has used $400 for the sale price 3808b for item 3806b. The estimation engine 3801 has computed the phase total 3807a to be $600 as a result. The estimation engine 3801 can generate the itemization 3806c from the product task 3803c, and the itemization 3806d from the product 3804. In the example depicted in FIG. 38A, the estimation engine 3801 has calculated the sale price of performing product task 3803c to be $300, and has used $300 for the sale price 3808b for item 3806c. Similarly, the estimation engine 3801 has calculated the sale price of the product 3804 to be $1000, and has used $1000 for the sale price 3808b for item 3806d. The estimation engine 3801 has computed the phase total 3807b to be $1300 as a result, and has computed the overall total 3807c to be $1900.

In some embodiments, the phase products 3802a-3802b in FIG. 38A can include components or functionality of the phase products 108a-108b as described with respect to FIG. 1. In some embodiments, the product tasks 3803a-3803c in FIG. 38A can include components or functionality of the product tasks 109a-109c as described with respect to FIG. 1. In some embodiments, the product 3804 in FIG. 38A can include components or functionality of the product 110 as described with respect to FIG. 1. In some embodiments, the estimation engine 3801 in FIG. 38A can include components or functionality of the quoting module 303a as described with respect to FIG. 3. In some embodiments, the phased quote 3812 in FIG. 38A can include components or functionality of the quote 601a as described with respect to FIG. 6. In some embodiments, the itemizations 3806a-3806d in FIG. 38A can include components or functionality of the line items 1003a-1003c as described with respect to FIG. 10.

Figure 38B:
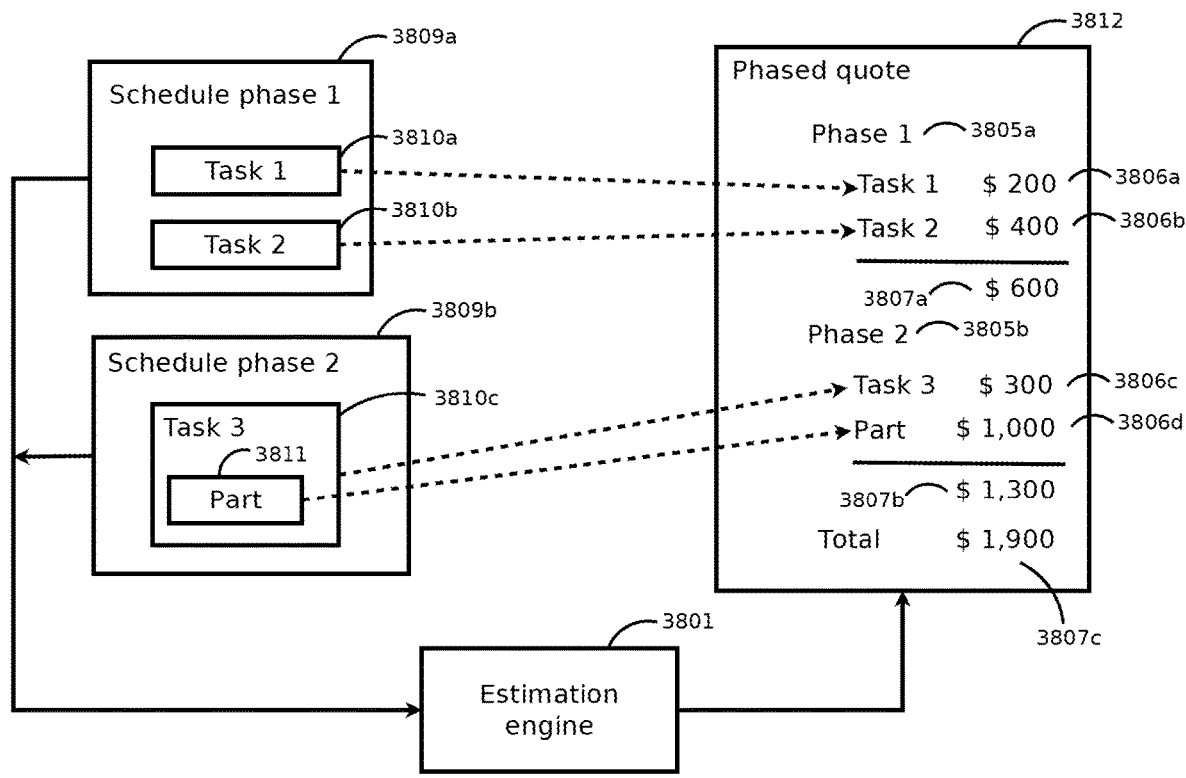
FIG. 38B is an illustrative block diagram of an example embodiment of generating a quote from schedule phases.

FIG. 38B is an illustrative block diagram of an example embodiment of generating a quote from schedule phases. A schedule phase 3809a can contain schedule tasks 3810a-3810b, and a schedule phase product 3802b can contain product task 3810c and product 3811. An estimation engine 3801 can create a phased quote 3812 with a phase 3805a corresponding to schedule phase 3809a and a phase 3805b corresponding to schedule phase 3809b. The phased quote 3812 can have a column 3808a identifying an item and a column 3808b indicating the sale price of the item, phase labels 3805a-3805b, phase totals 3807a-3807b, and an overall total 3807c. The estimation engine 3801 can generate the itemization 3806a-3806b from the schedule tasks 3810a-3810b. In the example depicted in FIG. 38B, the estimation engine 3801 has calculated the sale price of performing schedule task 3810a to be $200, and has used $200 for the sale price 3808b for item 3806a. Similarly, the estimation engine 3801 has calculated the sale price of performing schedule task 3810b to be $400, and has used $400 for the sale price 3808b for item 3806b. The estimation engine 3801 has computed the phase total 3807a to be $600 as a result. The estimation engine 3801 can generate the itemization 3806c from the schedule task 3810c, and the itemization 3806d from the product 3811. In the example depicted in FIG. 38B, the estimation engine 3801 has calculated the sale price of performing schedule task 3810c to be $300, and has used $300 for the sale price 3808b for item 3806c. Similarly, the estimation engine 3801 has calculated the sale price of the product 3811 to be $1000, and has used $1000 for the sale price 3808b for item 3806d. The estimation engine 3801 has computed the phase total 3807b to be $1300 as a result, and has computed the overall total 3807c to be $1900.

In some embodiments, the schedule phases 3809a-3809b in FIG. 38B can include components or functionality of the phase products 113a-113b as described with respect to FIG. 1. In some embodiments, the schedule tasks 3810a-3810c in FIG. 38B can include components or functionality of the schedule tasks 114a-114c as described with respect to FIG. 1. In some embodiments, the product 3811 in FIG. 38B can include components or functionality of the product 110 as described with respect to FIG. 1. In some embodiments, the estimation engine 3801 in FIG. 38B can include components or functionality of the quoting module 303a as described with respect to FIG. 3. In some embodiments, the phased quote 3812 in FIG. 38B can include components or functionality of the quote 601a as described with respect to FIG. 6. In some embodiments, the itemizations 3806a-3806d in FIG. 38B can include components or functionality of the line items 1003a-1003c as described with respect to FIG. 10.

Figure 39A:
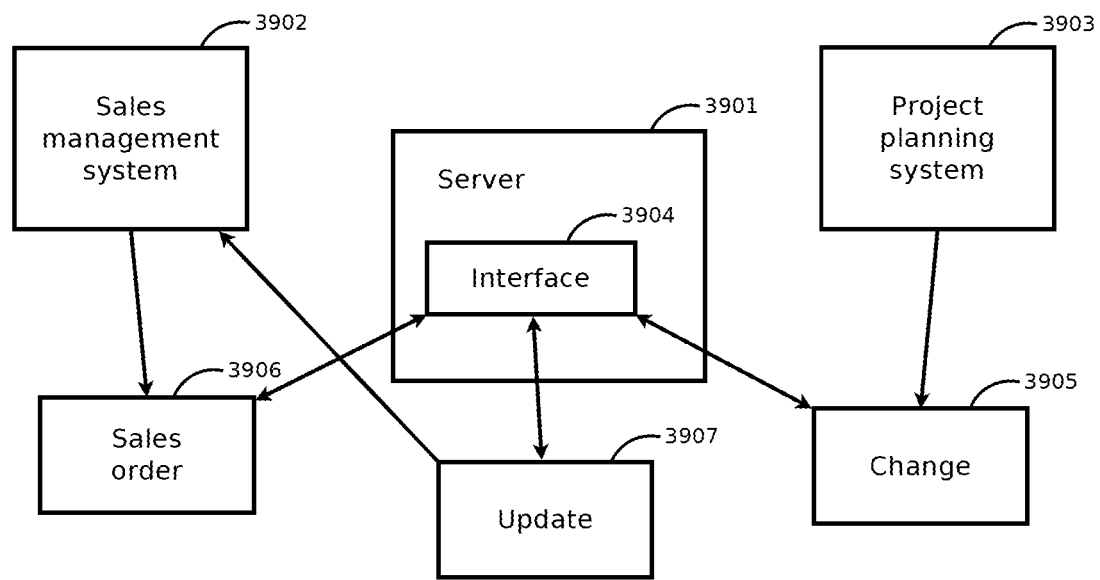
FIG. 39A is an illustrative block diagram of an example embodiment of updating a sales management system with a change from a project planning system.

FIG. 39A is an illustrative block diagram of an example embodiment of updating a sales management system with a change from a project planning system. A project planning system 3903 can generate a change 3905. The interface 3904 running on the server 3901 can use the change 3905 to generate an update 3907. The interface 3904 may be able to generate the update 3907 using information from the change 3905, or the interface 3904 may additionally use information from the sales order 3906 from a sales management system 3902 in order to compare with information from the change 3905 to generate the update 3907. The interface 3904 can transmit the update 3907 to the sales management system 3902. In an illustrative example, the change 3905 can contain an indication that a schedule task has completed, along with the time that was spent to complete the task. The interface 3904 can transmit an update 3907 to the sales management system 3902, which may update the sales order to indicate the completion of the task. This may, in turn, enable invoicing of the task, or update other areas of the sales management system 3902. In another illustrative example, the change 3905 can contain an updated schedule. The interface 3904 can compare the updated schedule to the schedule in the sales order 3906 and may discover that a new task has been added on the project planning system 3903. The interface may then put the new task, along with information about it, into the update 3907, and transmit the update 3907 to the sales management system 3902, which may then update the sales order information to include the new task.

In some embodiments, the server 3901 in FIG. 39A can include components or functionality of the server 101 as described with respect to FIG. 1. In some embodiments, the sales management system 3902 in FIG. 39A can include components or functionality of the sales management system 104 as described with respect to FIG. 1. In some embodiments, the project planning system 3903 in FIG. 39A can include components or functionality of the project planning system 105 as described with respect to FIG. 1. In some embodiments, the interface 3904 in FIG. 39A can include components or functionality of the interface 102 as described with respect to FIG. 1. In some embodiments, the sales order 3906 in FIG. 39A can include components or functionality of the sales order 107 as described with respect to FIG. 1.

Figure 39B:
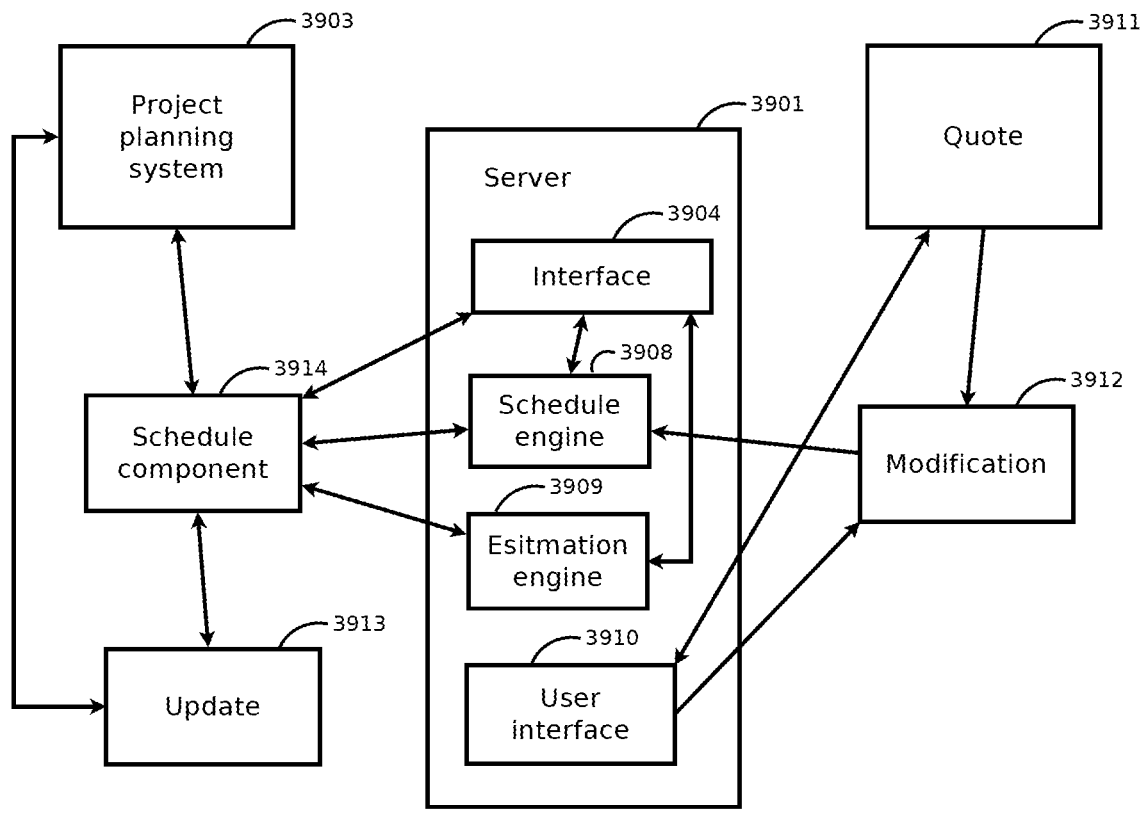
FIG. 39B is an illustrative block diagram of an example embodiment of updating a project management system with a change resulting from a modification of a quote.

FIG. 39B is an illustrative block diagram of an example embodiment of updating a project management system with a change resulting from a modification of a quote. An estimation engine 3909 running on the server 3901 can prepare a quote 3911 based on a schedule component 3914. An end user (not depicted in FIG. 39B) can use a user interface 3910 on the server 3901 to change the quote 3911, which can generate a modification 3912. The scheduling engine 3908 on the server 3901 can use the modification 3912 to generate an update 3913. The scheduling engine 3908 may be able to generate the update 3913 using information from the modification 3912, or the scheduling engine 3908 may additionally use information from the schedule component 3914 in order to compare with information from the modification 3912 to generate the update 3913. The interface 3904 can transmit the update 3913 to the sales management system 3902. In an illustrative example, the modification 3912 can contain an indication that a line item has been removed from the quote 3911. The scheduling engine 3908 can create an update 3913 indicating which project task corresponds to the line item that was removed from the quote, and an indication to remove that project task. The interface 3904 can transmit the update 3913 to the sales management system 3902, which may update the sales order to indicate the removal of the task. This may, in turn, affect the invoicing of the task, or update other areas of the sales management system 3902.

In some embodiments, the server 3901 in FIG. 39B can include components or functionality of the server 101 as described with respect to FIG. 1. In some embodiments, the project planning system 3903 in FIG. 39B can include components or functionality of the project planning system 105 as described with respect to FIG. 1. In some embodiments, the interface 3904 in FIG. 39B can include components or functionality of the interface 102 as described with respect to FIG. 1. In some embodiments, the schedule engine 3908 in FIG. 39B can include components or functionality of the schedule engine 103 as described with respect to FIG. 1. In some embodiments, the estimation engine 3909 in FIG. 39B can include components or functionality of the quoting module 303a as described with respect to FIG. 3. In some embodiments, the quote 3911 in FIG. 39B can include components or functionality of the quote 601a as described with respect to FIG. 6. In some embodiments, the schedule component 3914 in FIG. 39B can include components or functionality of the schedule component 112 as described with respect to FIG. 1.

Figure 40:
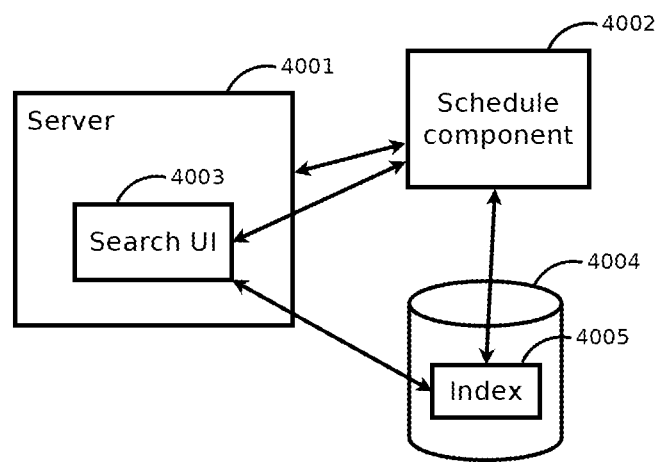
FIG. 40 is an illustrative block diagram of an example embodiment of configuring a schedule component for search capability.

FIG. 40 is an illustrative block diagram of an example embodiment of configuring a schedule component for search capability. The server 4001 can use the schedule component 4002 to generate a search index 4005 and store it in a memory 4004. An end user (not depicted in FIG. 40) can use a user interface 4003 on the server 4001 to search using the index 4005 and locate the schedule component 4002. In an illustrative example, a customer may call and ask about the status of a specific task, and the search index 4005 may facilitate locating the associate schedule component 4002, using keywords, quickly enough to be useful to the customer waiting on the telephone.

In some embodiments, the server 4001 in FIG. 40 can include components or functionality of the server 101 as described with respect to FIG. 1. In some embodiments, the schedule component 4002 in FIG. 40 can include components or functionality of the schedule component 112 as described with respect to FIG. 1.

Figure 41:
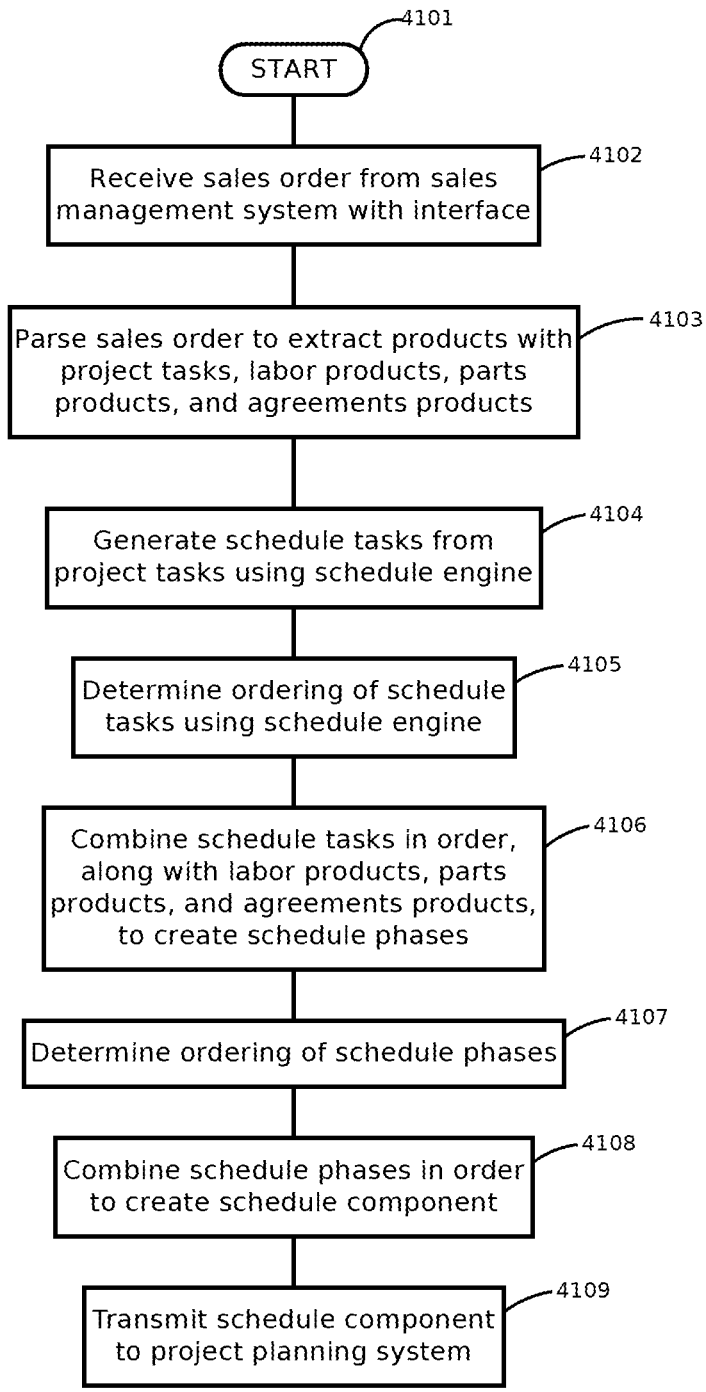
FIG. 41 is an illustrative flowchart depicting an example embodiment of a method for interfacing between a sales management system and a project planning system.

FIG. 41 is an illustrative flowchart depicting an example embodiment of a method for interfacing between a sales management system and a project planning system. The method 4101 can include receiving, by an interface executing on one or more processors of a server, from the sales management system, a first data record including a sales order (4102). The method 4101 can include parsing, by a schedule engine executing on the server, the first data record to identify a first product and a second product of the sales order. The first product can include a first project task and a second project task, and the second product can include a third project task, and at least one of a labor product, a parts product, and an agreements product (4103). The method 4101 can include generating, by the schedule engine, a first schedule task corresponding to the first project task, and a second schedule task corresponding to the second project task (4104). The method 4101 can include determining, by the schedule engine, a first order of performance between the first schedule task and the second schedule task (4105). The method 4101 can include combining, by the schedule engine, the first schedule task and the second schedule task based on the first order of performance to create a first schedule phase. The schedule engine can also generate a second schedule phase with a third schedule task corresponding to the third project task and the at least one of the labor product, the parts product, and the agreements product (4106). The method 4101 can include determining, by the schedule engine, a second order of performance between the first schedule phase and the second schedule phase (4107). The method 4101 can include combining, by the schedule engine, the first schedule phase and the second schedule phase based on the second order of performance to create a schedule component stored in a second data record (4108). The method 4101 can include transmitting, by the interface, the second data record storing the schedule component to the project planning system for execution (4109).

In some embodiments, receiving the first data record in step 4102 may be done using an application programming interface (API) on the sales management system, or using a shared data structure in a communications protocol, or using a shared data format transmitted on machine-readable media. In some embodiments, parsing the first data record in step 4103 may be done using a structured data format such as JSON, or a series of queries in a relational database, or a shared library designed to support the format of the first data record, or an ad-hoc parser designed specifically for the parsing. In some embodiments, generating the schedule tasks corresponding to project tasks in step 4104 may be done as more completely described with respect to FIG. 36, and may use shared libraries to extract components from the project task and populate a newly created data structure for the schedule task, or may use a grammar-driven translator. In some embodiments, determining the order of performance of schedule tasks in step 4105 may be done as more completely described with respect to FIG. 37, and may use sequences, dependencies, or resource constraints to control the order of performance, and may also use a default order to resolve ambiguities. In some embodiments, combining schedule tasks and products into schedule phases in step 4106 may be done by using shared libraries to create and populate the data structures associated with the schedule data, or using a structured data format such as JSON, or using ad-hoc data structures designed in a programming language. In some embodiments, determining the order of performance of schedule phases in step 4107 may use sequences, dependencies, or resource constraints to control the order of performance, and may also use a default order to resolve ambiguities. In some embodiments, combining schedule phases to create a schedule component in step 4108 may be done by using shared libraries to create and populate the data structures associated with the schedule data, or using a structured data format such as JSON, or using ad-hoc data structures designed in a programming language. In some embodiments, transmitting the data record to the project planning system in step 4109 may be done using an application programming interface (API) on the project planning system, or using a shared data structure in a communications protocol, or using a shared data format transmitted on machine-readable media.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of interfacing between a sales management system and a project planning system, comprising:
   parsing, by a schedule engine executing on one or more processors of a server, a first data record including a sales order to identify a first product and a second product of the sales order, the first data record received from a sales management system by an interface executing on the server, wherein:
     the first product includes a first project task and a second project task; and
     the second product includes a third project task, and at least one of a labor product, a parts product, and an agreements product;
   generating, by the schedule engine, a first schedule task corresponding to the first project task, and a second schedule task corresponding to the second project task;
   determining, by the schedule engine, a first order of performance between the first schedule task and the second schedule task;
   creating, by the schedule engine, a first schedule phase having the first schedule task and the second schedule task combined based on the first order of performance;
   generating, by the schedule engine, a second schedule phase with a third schedule task corresponding to the third project task, the second schedule phase including the at least one of the labor product, the parts product, and the agreements product;
   determining, by the schedule engine, a second order of performance between the first schedule phase and the second schedule phase;
   creating, by the schedule engine, a schedule component stored in a second data record having the first schedule phase and the second schedule phase based on the second order of performance; and
   transmitting, by the interface, the second data record storing the schedule component to the project planning system for delivery of the sales order.

2. The method of claim 1, further comprising:
configuring the schedule component stored in the second data record for search capability.

3. The method of claim 1, further comprising:
generating a search index for the schedule component stored in the second data record; and
storing the search index in a third data record.

4. The method of claim 1, further comprising:
receiving, by the interface executing on the server from the project planning system, an indication of a change to the schedule component; and
transmitting, by the interface to the sales management system, responsive to the indication, information about the change to the schedule component to initiate an update to the sales order.

5. The method of claim 1, further comprising:
receiving, by the interface executing on the server from the project planning system, an indication of a change to the schedule component;
comparing, by the server, the indication with the sales order received from the sales management system;
determining, by the server responsive to the comparing, to update the sales order based on the indication; and
transmitting, to the sales management system by the interface executing on the server,
responsive to the determining, information about the change to the schedule component to initiate an update to the sales order.

6. The method of claim 1, further comprising:
generating, by an estimation engine executing on the server, a first quote component based on the first project task and second project task associated with the first product, and a second quote component based on the third project task and the at least one of the labor product, the parts product, and the agreements product associated with the second product; and
combining, by the estimation engine, the first quote component and the second quote component to create a quote.

7. The method of claim 1, further comprising:
generating, by an estimation engine executing on the server, a first quote component based on the first schedule task and second schedule task associated with the first schedule phase, and a second quote component based on the third schedule task; and
combining, by the estimation engine, the first component and the second quote component to create a quote for the schedule component.

8. The method of claim 1, further comprising:
providing, via the server, a quote for the sales order;
receiving, by the interface executing on the server, an indication of a modification to the quote;
updating, by the schedule engine executing on the server, the schedule component responsive to the indication of the modification to the quote; and
transmitting, to the sales management system by the interface executing on the server, responsive to the updating, information about the updating of the schedule component to initiate an update to the sales order.

9. The method of claim 1, further comprising:
providing, via the interface executing on the server, a quote for the sales order;
receiving, by the interface, an indication to reduce the quote;
removing, by the schedule engine executing on the server, a portion of the schedule component responsive to the indication to reduce the quote; and
transmitting, to the sales management system by the interface executing on the server, responsive to the removing, information about the removing of the portion of the schedule component to initiate an update to the sales order.

10. The method of claim 1, further comprising:
establishing, by the schedule engine, a first duration for the first schedule phase and a second duration for the second schedule phase; and
appending the first duration and the second duration to the second data record storing the schedule component.

11. The method of claim 1, further comprising:
parsing, from the first project task, a description, a parts component, an estimated time, a billing method, and a resource assignment;
generating, based on the description, a name;
generating, based on the parts component, a resource reference;
generating, based on the estimated time, a schedule duration;
generating, based on the billing method, a schedule billing method;
selecting, based on the resource assignment, a personnel reference; and
associating the resource reference, the schedule duration, the schedule billing method, and the personnel reference with the first schedule task.

12. The method of claim 1, further comprising:
determining the first order of performance between the first schedule task and the second schedule task based on at least one of:
a manually assigned sequence included in the first data record;
a sequence included in a template associated with the first data record;
a dependency between the first schedule task and the second schedule task, the dependency included in the first data record;
a first resource assignment associated with the first schedule task and a second resource assignment, same as the first resource assignment, associated with the second schedule task, the first order of performance chosen to avoid simultaneous use of the first resource assignment and the second resource assignment; and
a default sequence determined by the scheduling engine.

13. The method of claim 1, further comprising:
parsing, by the schedule engine, the second product;
generating, by the schedule engine responsive to the second product including the labor product, a fourth schedule task based on the labor product;
determining, by the schedule engine, a third order of performance between the third schedule task and the fourth schedule task; and
combining, by the schedule engine, the third schedule task and the fourth schedule task based on the third order of performance to create the second schedule phase.

14. The method of claim 1, wherein the schedule component includes information for the project planning system to update an existing schedule.

15. The method of claim 1, further comprising:
converting, by an estimation engine executing on the server, the sales order into a quote by generating a first quote for the first product and a second quote for the second product.

16. A system for interfacing between a sales management system and a project planning system, comprising:
a server including one or more processors and memory configured to:
parse, by a schedule engine executing on one or more processors of a server, a first data record including a sales order to identify a first product and a second product of the sales order, the first data record received by an interface executing on the server and from the sales management system, wherein:
the first product includes a first project task and a second project task; and
the second product includes a third project task, and at least one of a labor product, a parts product, and an agreements product;
generate, by the schedule engine, a first schedule task corresponding to the first project task, and a second schedule task corresponding to the second project task;
determine, by the schedule engine, a first order of performance between the first schedule task and the second schedule task;
create, by the schedule engine, a first schedule phase having the first schedule task and the second schedule task combined based on the first order of performance;
generate, by the schedule engine, a second schedule phase with a third schedule task corresponding to the third project task and the at least one of the labor product, the parts product, and the agreements product;
determine, by the schedule engine, a second order of performance between the first schedule phase and the second schedule phase;
create, by the schedule engine, a schedule component stored in a second data record having the first schedule phase and the second schedule phase based on the second order of performance; and
transmit, by the interface, the second data record storing the schedule component to the project planning system for delivery of the sales order.

17. The system of claim 16, wherein the schedule component stored in the second data record is further configured for search capability.

18. The system of claim 16, wherein the server is further configured to:
generate a search index for the schedule component stored in the second data record; and
store the search index in a third data record.

19. The system of claim 16, wherein the interface is further configured to:
receive, from the project planning system, an indication of a change to the schedule component; and
transmit, to the sales management system responsive to the indication, information about the change to the schedule component to initiate an update to the sales order.

20. The system of claim 16, wherein the interface is further configured to:
receive, from the project planning system, an indication of a change to the schedule component;

the server is further configured to:
　compare the indication with the sales order received from the sales management system; and
　determine, responsive to the comparing, to update the sales order based on the indication; and the interface is further configured to:
　transmit, to the sales management system, responsive to the determining, information about the change to the schedule component to initiate an update to the sales order.

\* \* \* \* \*